(12) United States Patent
Giobbi

(10) Patent No.: US 11,120,449 B2
(45) Date of Patent: Sep. 14, 2021

(54) AUTOMATED SERVICE-BASED ORDER PROCESSING

(75) Inventor: John J. Giobbi, Bend, OR (US)

(73) Assignee: Proxense, LLC, Bend, OR (US)

(*) Notice: Subject to any disclaimer, the term of this patent is extended or adjusted under 35 U.S.C. 154(b) by 759 days.

(21) Appl. No.: 12/420,277

(22) Filed: Apr. 8, 2009

(65) Prior Publication Data

US 2009/0254448 A1 Oct. 8, 2009

Related U.S. Application Data

(60) Provisional application No. 61/043,326, filed on Apr. 8, 2008, provisional application No. 61/102,983, filed on Oct. 6, 2008.

(51) Int. Cl.
*G06Q 20/40* (2012.01)
*G06Q 20/42* (2012.01)
*G06Q 20/32* (2012.01)
*G06K 9/00* (2006.01)
(Continued)

(52) U.S. Cl.
CPC ... *G06Q 20/40145* (2013.01); *G06K 9/00885* (2013.01); *G06Q 20/322* (2013.01); *G06Q 20/409* (2013.01); *G06Q 20/42* (2013.01); *G06Q 30/02* (2013.01); *G06Q 30/0225* (2013.01); *G06Q 30/0601* (2013.01); *G06Q 30/0603* (2013.01)

(58) Field of Classification Search
CPC .................................................. G06Q 30/02
See application file for complete search history.

(56) References Cited

U.S. PATENT DOCUMENTS

| 3,665,313 A | 5/1972 | Trent |
| 3,739,329 A | 6/1973 | Lester |
| 3,761,883 A | 9/1973 | Alvarez et al. |

(Continued)

FOREIGN PATENT DOCUMENTS

| JP | H10-49604 | 2/1998 |
| WO | 00/62505 | 10/2000 |

(Continued)

OTHER PUBLICATIONS

White, "How Computers Work", Millennium Edition, 1999, Que Corporation, Indianapolis, IN, all pages.*

(Continued)

*Primary Examiner* — Jacob C. Coppola
(74) *Attorney, Agent, or Firm* — Patent Law Works LLP

(57) ABSTRACT

A system and method provide efficient, secure and fast automation of order processing. The method includes initiating an order by wirelessly receiving data from a personal digital key (PDK). The method also includes receiving a biometric input and confirming the initiation of the order by authenticating the biometric input. In response to authenticating the biometric input, the order is processed. In another embodiment, the method of further includes automatically initiating an order completion by wirelessly receiving data from a PDK. The method further includes receiving a biometric input and confirming the order completion by authenticating the biometric input. In response to authenticating the biometric input, the order is completed. In yet another embodiment, the method further includes processing rewards based on the order.

20 Claims, 27 Drawing Sheets

(51) Int. Cl.
G06Q 30/06 (2012.01)
G06Q 30/02 (2012.01)

(56) References Cited

U.S. PATENT DOCUMENTS

| | | | |
|---|---|---|---|
| 3,906,166 A | 9/1975 | Cooper et al. | |
| 4,101,873 A | 7/1978 | Anderson et al. | |
| 4,430,705 A | 2/1984 | Cannavino et al. | |
| 4,476,469 A | 10/1984 | Lander | |
| 4,598,272 A | 7/1986 | Cox | |
| 4,661,821 A | 4/1987 | Smith | |
| 4,759,060 A | 7/1988 | Hayashi et al. | |
| 4,814,742 A | 3/1989 | Morita et al. | |
| 4,871,997 A | 10/1989 | Adriaenssens et al. | |
| 4,993,068 A | 2/1991 | Piosenka et al. | |
| 5,043,702 A | 8/1991 | Kuo | |
| 5,187,352 A | 2/1993 | Blair et al. | |
| 5,224,164 A | 6/1993 | Elsner | |
| 5,296,641 A | 3/1994 | Stelzel | |
| 5,307,349 A | 4/1994 | Shloss et al. | |
| 5,317,572 A | 5/1994 | Satoh | |
| 5,325,285 A | 6/1994 | Araki | |
| 5,392,287 A | 2/1995 | Tiedemann, Jr. et al. | |
| 5,392,433 A | 2/1995 | Hammersley et al. | |
| 5,410,588 A | 4/1995 | Ito | |
| 5,416,780 A | 5/1995 | Patel | |
| 5,422,632 A | 6/1995 | Bucholtz et al. | |
| 5,428,684 A | 6/1995 | Akiyama et al. | |
| 5,450,489 A | 9/1995 | Ostrover et al. | |
| 5,473,690 A | 12/1995 | Grimonprez et al. | |
| 5,481,265 A | 1/1996 | Russell | |
| 5,506,863 A | 4/1996 | Meidan et al. | |
| 5,517,502 A | 5/1996 | Bestler et al. | |
| 5,541,583 A | 7/1996 | Mandelbaum | |
| 5,544,321 A | 8/1996 | Theimer et al. | |
| 5,552,776 A | 9/1996 | Wade et al. | |
| 5,563,947 A | 10/1996 | Kikinis | |
| 5,589,838 A | 12/1996 | McEwan | |
| 5,594,227 A | 1/1997 | Deo | |
| 5,598,474 A | 1/1997 | Johnson | |
| 5,611,050 A | 3/1997 | Theimer et al. | |
| 5,619,251 A | 4/1997 | Kuroiwa et al. | |
| 5,623,552 A | 4/1997 | Lane | |
| 5,629,980 A | 5/1997 | Stefik et al. | |
| 5,644,354 A | 7/1997 | Thompson et al. | |
| 5,666,412 A | 9/1997 | Handelman et al. | |
| 5,689,529 A | 11/1997 | Johnson | |
| 5,692,049 A | 11/1997 | Johnson et al. | |
| 5,719,387 A | 2/1998 | Fujioka | |
| 5,729,237 A | 3/1998 | Webb | |
| 5,760,705 A | 6/1998 | Glessner et al. | |
| 5,760,744 A | 6/1998 | Sauer | |
| 5,773,954 A | 6/1998 | VanHorn | |
| 5,784,464 A | 7/1998 | Akiyama et al. | |
| 5,799,085 A | 8/1998 | Shona | |
| 5,821,854 A | 10/1998 | Dorinski et al. | |
| 5,825,876 A | 10/1998 | Peterson, Jr. | |
| 5,835,595 A | 11/1998 | Fraser et al. | |
| 5,838,306 A | 11/1998 | O'Connor et al. | |
| 5,854,891 A | 12/1998 | Postlewaite et al. | |
| 5,857,020 A | 1/1999 | Peterson, Jr. | |
| 5,886,634 A | 3/1999 | Muhme | |
| 5,892,825 A | 4/1999 | Mages et al. | |
| 5,892,900 A | 4/1999 | Ginter et al. | |
| 5,894,551 A | 4/1999 | Huggins et al. | |
| 5,898,880 A | 4/1999 | Ryu | |
| 5,910,776 A | 6/1999 | Black | |
| 5,917,913 A | 6/1999 | Wang | |
| 5,923,757 A | 7/1999 | Hocker et al. | |
| 5,928,327 A | 7/1999 | Wang et al. | |
| 5,991,399 A | 11/1999 | Graunke et al. | |
| 5,991,749 A | 11/1999 | Morrill, Jr. | |
| 6,016,476 A | 1/2000 | Maes et al. | |
| 6,018,739 A | 1/2000 | McCoy et al. | |
| 6,025,780 A | 2/2000 | Bowers et al. | |
| 6,035,038 A | 3/2000 | Campinos et al. | |
| 6,035,329 A | 3/2000 | Mages et al. | |
| 6,038,334 A | 3/2000 | Hamid | |
| 6,038,666 A | 3/2000 | Hsu et al. | |
| 6,040,786 A | 3/2000 | Fujioka | |
| 6,041,410 A | 3/2000 | Hsu et al. | |
| 6,042,006 A | 3/2000 | Van Tilburg et al. | |
| 6,055,314 A | 4/2000 | Spies et al. | |
| 6,068,184 A | 5/2000 | Barnett | |
| 6,070,796 A | 6/2000 | Sirbu | |
| 6,076,164 A | 6/2000 | Tanaka et al. | |
| 6,088,450 A | 7/2000 | Davis et al. | |
| 6,088,730 A | 7/2000 | Kato et al. | |
| 6,104,290 A | 8/2000 | Naguleswaran | |
| 6,104,334 A | 8/2000 | Allport | |
| 6,110,041 A | 8/2000 | Walker et al. | |
| 6,121,544 A | 9/2000 | Petsinger | |
| 6,134,283 A | 10/2000 | Sands et al. | |
| 6,137,480 A | 10/2000 | Shintani | |
| 6,138,010 A | 10/2000 | Rabe et al. | |
| 6,148,142 A | 11/2000 | Anderson | |
| 6,148,210 A | 11/2000 | Elwin et al. | |
| 6,161,179 A | 12/2000 | Seidel | |
| 6,177,887 B1 | 1/2001 | Jerome | |
| 6,185,316 B1 | 2/2001 | Buffam | |
| 6,189,105 B1 | 2/2001 | Lopes | |
| 6,209,089 B1 | 3/2001 | Selitrennikoff et al. | |
| 6,219,109 B1 | 4/2001 | Raynesford et al. | |
| 6,219,439 B1 | 4/2001 | Burger | |
| 6,219,553 B1 | 4/2001 | Panasik | |
| 6,237,848 B1 | 5/2001 | Everett | |
| 6,240,076 B1 | 5/2001 | Kanerva et al. | |
| 6,247,130 B1 | 6/2001 | Fritsch | |
| 6,249,869 B1 | 6/2001 | Drupsteen et al. | |
| 6,256,737 B1 | 7/2001 | Bianco et al. | |
| 6,266,415 B1 | 7/2001 | Campinos et al. | |
| 6,270,011 B1 | 8/2001 | Gottfried | |
| 6,279,111 B1 | 8/2001 | Jensenworth et al. | |
| 6,279,146 B1 | 8/2001 | Evans et al. | |
| 6,295,057 B1 | 9/2001 | Rosin et al. | |
| 6,307,471 B1 | 10/2001 | Xydis | |
| 6,325,285 B1 | 12/2001 | Baratelli | |
| 6,336,121 B1 | 1/2002 | Lyson et al. | |
| 6,336,142 B1 | 1/2002 | Kato et al. | |
| 6,343,280 B2 | 1/2002 | Clark | |
| 6,345,347 B1 | 2/2002 | Biran | |
| 6,363,485 B1 | 3/2002 | Adams et al. | |
| 6,367,019 B1 | 4/2002 | Ansell et al. | |
| 6,369,693 B1 | 4/2002 | Gibson | |
| 6,370,376 B1 | 4/2002 | Sheath | |
| 6,381,029 B1 | 4/2002 | Tipirneni | |
| 6,381,747 B1 | 4/2002 | Wonfor et al. | |
| 6,385,596 B1 | 5/2002 | Wiser et al. | |
| 6,392,664 B1 | 5/2002 | White et al. | |
| 6,397,387 B1 | 5/2002 | Rosin et al. | |
| 6,401,059 B1 | 6/2002 | Shen et al. | |
| 6,411,307 B1 | 6/2002 | Rosin et al. | |
| 6,424,249 B1* | 7/2002 | Houvener | 340/5.82 |
| 6,424,715 B1 | 7/2002 | Saito | |
| 6,425,084 B1 | 7/2002 | Rallis et al. | |
| 6,434,403 B1 | 8/2002 | Ausems et al. | |
| 6,434,535 B1 | 8/2002 | Kupka et al. | |
| 6,446,004 B1 | 9/2002 | Cao et al. | |
| 6,446,130 B1 | 9/2002 | Grapes et al. | |
| 6,463,534 B1 | 10/2002 | Geiger et al. | |
| 6,480,101 B1 | 11/2002 | Kelly et al. | |
| 6,480,188 B1 | 11/2002 | Horsley | |
| 6,484,182 B1 | 11/2002 | Dunphy et al. | |
| 6,484,260 B1 | 11/2002 | Scott et al. | |
| 6,484,946 B2 | 11/2002 | Matsumoto et al. | |
| 6,487,663 B1 | 11/2002 | Jaisimha et al. | |
| 6,490,443 B1 | 12/2002 | Freeny, Jr. | |
| 6,510,350 B1 | 1/2003 | Steen, III et al. | |
| 6,522,253 B1 | 2/2003 | Saltus | |
| 6,523,113 B1 | 2/2003 | Wehrenberg | |
| 6,529,949 B1 | 3/2003 | Getsin et al. | |
| 6,546,418 B2 | 4/2003 | Schena et al. | |
| 6,550,011 B1 | 4/2003 | Sims, III | |
| 6,563,465 B2 | 5/2003 | Frecska | |

(56) References Cited

U.S. PATENT DOCUMENTS

| | | | |
|---|---|---|---|
| 6,563,805 B1 | 5/2003 | Ma et al. | |
| 6,564,380 B1 | 5/2003 | Murphy | |
| 6,577,238 B1 | 6/2003 | Whitesmith et al. | |
| 6,593,887 B2 | 7/2003 | Luk et al. | |
| 6,597,680 B1 | 7/2003 | Lindskog et al. | |
| 6,607,136 B1 | 8/2003 | Atsmon et al. | |
| 6,628,302 B2 | 9/2003 | White et al. | |
| 6,632,992 B2 | 10/2003 | Hasegawa | |
| 6,633,981 B1 | 10/2003 | Davis | |
| 6,645,077 B2 | 11/2003 | Rowe | |
| 6,647,417 B1 | 11/2003 | Hunter et al. | |
| 6,657,538 B1 | 12/2003 | Ritter | |
| 6,658,566 B1 | 12/2003 | Hazard | |
| 6,667,684 B1 | 12/2003 | Waggamon et al. | |
| 6,669,096 B1 | 12/2003 | Saphar et al. | |
| 6,671,808 B1 | 12/2003 | Abbott et al. | |
| 6,683,954 B1 | 1/2004 | Searle | |
| 6,697,944 B1 | 2/2004 | Jones et al. | |
| 6,709,333 B1 | 3/2004 | Bradford et al. | |
| 6,711,464 B1 | 3/2004 | Yap et al. | |
| 6,714,168 B2 | 3/2004 | Berenbaum | |
| 6,715,246 B1 | 4/2004 | Frecska et al. | |
| 6,728,397 B2 | 4/2004 | McNeal | |
| 6,737,955 B2 | 5/2004 | Ghabra et al. | |
| 6,758,394 B2 * | 7/2004 | Maskatiya et al. | 235/379 |
| 6,771,969 B1 | 8/2004 | Chinoy et al. | |
| 6,775,655 B1 | 8/2004 | Peinado et al. | |
| 6,785,474 B2 | 8/2004 | Hirt et al. | |
| 6,788,640 B2 | 9/2004 | Celeste | |
| 6,788,924 B1 | 9/2004 | Knutson et al. | |
| 6,795,425 B1 | 9/2004 | Raith | |
| 6,804,825 B1 | 10/2004 | White et al. | |
| 6,806,887 B2 | 10/2004 | Chernock et al. | |
| 6,839,542 B2 | 1/2005 | Sibecas et al. | |
| 6,850,147 B2 | 2/2005 | Prokoski et al. | |
| 6,853,988 B1 | 2/2005 | Dickinson et al. | |
| 6,859,812 B1 | 2/2005 | Poynor | |
| 6,861,980 B1 | 3/2005 | Rowitch et al. | |
| 6,873,975 B1 | 3/2005 | Hatakeyama et al. | |
| 6,879,567 B2 | 4/2005 | Callaway et al. | |
| 6,879,966 B1 | 4/2005 | Lapsley et al. | |
| 6,886,741 B1 | 5/2005 | Salveson | |
| 6,889,067 B2 | 5/2005 | Willey | |
| 6,891,822 B1 | 5/2005 | Gubbi et al. | |
| 6,892,307 B1 | 5/2005 | Wood et al. | |
| 6,930,643 B2 | 8/2005 | Byrne et al. | |
| 6,947,003 B2 | 9/2005 | Huor | |
| 6,950,941 B1 | 9/2005 | Lee et al. | |
| 6,957,086 B2 | 10/2005 | Bahl et al. | |
| 6,961,858 B2 | 11/2005 | Fransdonk | |
| 6,963,270 B1 | 11/2005 | Gallagher, III et al. | |
| 6,963,971 B1 | 11/2005 | Bush et al. | |
| 6,973,576 B2 | 12/2005 | Giobbi | |
| 6,975,202 B1 | 12/2005 | Rodriguez et al. | |
| 6,980,087 B2 | 12/2005 | Zukowksi | |
| 6,983,882 B2 | 1/2006 | Cassone | |
| 6,999,032 B2 | 2/2006 | Pakray et al. | |
| 7,012,503 B2 | 3/2006 | Nielsen | |
| 7,020,635 B2 | 3/2006 | Hamilton et al. | |
| 7,031,945 B1 | 4/2006 | Donner | |
| 7,049,963 B2 | 5/2006 | Waterhouse et al. | |
| 7,055,171 B1 | 5/2006 | Martin et al. | |
| 7,058,806 B2 | 6/2006 | Smeets et al. | |
| 7,061,380 B1 | 6/2006 | Orlando et al. | |
| 7,068,623 B1 | 6/2006 | Barany et al. | |
| 7,072,900 B2 | 7/2006 | Sweitzer et al. | |
| 7,079,079 B2 | 7/2006 | Jo et al. | |
| 7,080,049 B2 | 7/2006 | Truitt et al. | |
| 7,082,415 B1 | 7/2006 | Robinson et al. | |
| 7,090,126 B2 | 8/2006 | Kelly et al. | |
| 7,090,128 B2 | 8/2006 | Farley et al. | |
| 7,100,053 B1 * | 8/2006 | Brown et al. | 713/185 |
| 7,107,455 B1 | 9/2006 | Merkin | |
| 7,107,462 B2 | 9/2006 | Fransdonk | |
| 7,111,789 B2 | 9/2006 | Rajasekaran et al. | |
| 7,112,138 B2 | 9/2006 | Hedrick et al. | |
| 7,119,659 B2 | 10/2006 | Bonaile et al. | |
| 7,123,149 B2 | 10/2006 | Nowak et al. | |
| 7,130,668 B2 | 10/2006 | Chang et al. | |
| 7,131,139 B1 | 10/2006 | Meier | |
| 7,137,008 B1 | 11/2006 | Hamid et al. | |
| 7,137,012 B1 | 11/2006 | Kamibayashi et al. | |
| 7,139,914 B2 | 11/2006 | Arnouse | |
| 7,150,045 B2 | 12/2006 | Koelle et al. | |
| 7,155,416 B2 | 12/2006 | Shatford | |
| 7,159,114 B1 | 1/2007 | Zajkowksi et al. | |
| 7,159,765 B2 | 1/2007 | Frerking | |
| 7,167,987 B2 | 1/2007 | Angelo | |
| 7,168,089 B2 | 1/2007 | Nguyen et al. | |
| 7,176,797 B2 | 2/2007 | Zai et al. | |
| 7,191,466 B1 | 3/2007 | Hamid et al. | |
| 7,209,955 B1 | 4/2007 | Major et al. | |
| 7,218,944 B2 | 5/2007 | Cromer et al. | |
| 7,225,161 B2 | 5/2007 | Lam et al. | |
| 7,230,908 B2 | 6/2007 | Vanderaar et al. | |
| 7,231,068 B2 | 6/2007 | Tibor | |
| 7,231,451 B2 | 6/2007 | Law et al. | |
| 7,242,923 B2 | 7/2007 | Perera et al. | |
| 7,249,177 B1 | 7/2007 | Miller | |
| 7,272,723 B1 | 9/2007 | Abbott et al. | |
| 7,277,737 B1 | 10/2007 | Vollmer et al. | |
| 7,278,025 B2 | 10/2007 | Saito et al. | |
| 7,283,650 B1 | 10/2007 | Sharma et al. | |
| 7,295,119 B2 | 11/2007 | Rappaport et al. | |
| 7,305,560 B2 | 12/2007 | Giobbi | |
| 7,310,042 B2 | 12/2007 | Seifert | |
| 7,314,164 B2 | 1/2008 | Bonalle et al. | |
| 7,317,799 B2 | 1/2008 | Hammersmith et al. | |
| 7,319,395 B2 | 1/2008 | Puzio et al. | |
| 7,330,108 B2 | 2/2008 | Thomas | |
| 7,333,002 B2 | 2/2008 | Bixler et al. | |
| 7,333,615 B1 | 2/2008 | Jarboe et al. | |
| 7,336,181 B2 | 2/2008 | Nowak et al. | |
| 7,336,182 B1 | 2/2008 | Baranowski et al. | |
| 7,337,326 B2 | 2/2008 | Palmer et al. | |
| 7,341,181 B2 | 3/2008 | Bonalle et al. | |
| 7,342,503 B1 | 3/2008 | Light et al. | |
| 7,349,557 B2 | 3/2008 | Tibor | |
| 7,356,393 B1 | 4/2008 | Schlatre et al. | |
| 7,356,706 B2 | 4/2008 | Scheurich | |
| 7,361,919 B2 | 4/2008 | Setlak | |
| 7,363,494 B2 | 4/2008 | Brainard et al. | |
| 7,370,366 B2 | 5/2008 | Lacan et al. | |
| 7,378,939 B2 | 5/2008 | Sengupta et al. | |
| 7,380,202 B1 | 5/2008 | Lindhorst et al. | |
| 7,382,799 B1 | 6/2008 | Young et al. | |
| 7,387,235 B2 | 6/2008 | Gilbert et al. | |
| 7,401,731 B1 | 7/2008 | Pletz et al. | |
| 7,424,134 B2 | 9/2008 | Chou | |
| 7,437,330 B1 | 10/2008 | Robinson et al. | |
| 7,447,911 B2 | 11/2008 | Chou et al. | |
| 7,448,087 B2 | 11/2008 | Ohmori et al. | |
| 7,458,510 B1 | 12/2008 | Zhou | |
| 7,460,836 B2 | 12/2008 | Smith et al. | |
| 7,461,444 B2 | 12/2008 | Deaett et al. | |
| 7,464,053 B1 | 12/2008 | Pylant | |
| 7,464,059 B1 | 12/2008 | Robinson et al. | |
| 7,466,232 B2 | 12/2008 | Neuwirth | |
| 7,472,280 B2 | 12/2008 | Giobbi | |
| 7,512,806 B2 | 3/2009 | Lemke | |
| 7,525,413 B2 | 4/2009 | Jung et al. | |
| 7,529,944 B2 | 5/2009 | Hamid | |
| 7,533,809 B1 | 5/2009 | Robinson et al. | |
| 7,545,312 B2 | 6/2009 | Kiang et al. | |
| 7,565,329 B2 | 7/2009 | Lapsley et al. | |
| 7,573,382 B2 | 8/2009 | Choubey et al. | |
| 7,573,841 B2 | 8/2009 | Lee et al. | |
| 7,574,734 B2 | 8/2009 | Fedronic et al. | |
| 7,583,238 B2 | 9/2009 | Cassen et al. | |
| 7,583,643 B2 | 9/2009 | Smith et al. | |
| 7,587,502 B2 | 9/2009 | Crawford et al. | |
| 7,587,611 B2 | 9/2009 | Johnson et al. | |
| 7,594,611 B1 | 9/2009 | Arrington, III | |
| 7,595,765 B1 | 9/2009 | Hirsch et al. | |

(56) References Cited

U.S. PATENT DOCUMENTS

| | | |
|---|---|---|
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,073 B1 | 11/2009 | Robinson et al. |
| 7,624,417 B2 | 11/2009 | Dua |
| 7,640,273 B2 | 12/2009 | Wallmeier et al. |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,676,380 B2 | 3/2010 | Graves et al. |
| 7,689,005 B2 | 3/2010 | Wang et al. |
| 7,706,896 B2 | 4/2010 | Music et al. |
| 7,711,152 B1 | 5/2010 | Davida et al. |
| 7,711,586 B2 | 5/2010 | Aggarwal et al. |
| 7,715,593 B1 | 5/2010 | Adams et al. |
| 7,724,713 B2 | 5/2010 | Del Prado Pavon et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,164 B1 | 7/2010 | Robinson et al. |
| 7,765,181 B2 | 7/2010 | Thomas et al. |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,865,937 B1 | 1/2011 | White et al. |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,077,041 B2 | 12/2011 | Stern et al. |
| 8,081,215 B2 | 12/2011 | Kuo et al. |
| 8,082,160 B2 | 12/2011 | Collins, Jr. et al. |
| 8,089,354 B2 | 1/2012 | Perkins |
| 8,112,066 B2 | 2/2012 | Ben Ayed |
| 8,125,624 B2 | 2/2012 | Jones et al. |
| 8,135,624 B1 | 3/2012 | Ramalingam et al. |
| 8,171,528 B1 | 5/2012 | Brown |
| 8,193,923 B2 | 6/2012 | Rork et al. |
| 8,200,980 B1 | 6/2012 | Robinson et al. |
| 8,215,552 B1 | 7/2012 | Rambadt |
| 8,248,263 B2 | 8/2012 | Shervey et al. |
| 8,258,942 B1 | 9/2012 | Lanzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,378,925 B2 | 2/2013 | Chiaki |
| 8,387,124 B2 | 2/2013 | Smetters |
| 8,390,456 B2 | 3/2013 | Puleston et al. |
| 8,395,484 B2 | 3/2013 | Fullerton |
| 8,410,906 B1 | 4/2013 | Dacus et al. |
| 8,421,606 B2 | 4/2013 | Collins, Jr. et al. |
| 8,424,079 B2 | 4/2013 | Adams et al. |
| 8,432,262 B2 | 4/2013 | Talty et al. |
| 8,433,919 B2 * | 4/2013 | Giobbi et al. ............... 713/186 |
| 8,448,858 B1 | 5/2013 | Kundu et al. |
| 8,473,748 B2 | 6/2013 | Sampas |
| 8,484,696 B2 | 7/2013 | Gatto et al. |
| 8,494,576 B1 | 7/2013 | Bye et al. |
| 8,508,336 B2 | 8/2013 | Giobbi et al. |
| 8,511,555 B2 | 8/2013 | Babcock et al. |
| 8,519,823 B2 | 8/2013 | Rinkes |
| 8,522,019 B2 | 8/2013 | Michaelis |
| 8,558,699 B2 | 10/2013 | Butler et al. |
| 8,572,391 B2 | 10/2013 | Golan et al. |
| 8,577,091 B2 | 11/2013 | Ivanov et al. |
| 8,646,042 B1 | 2/2014 | Brown |
| 8,678,273 B2 | 3/2014 | McNeal |
| 8,717,346 B2 | 5/2014 | Claessen |
| 8,738,925 B1 | 5/2014 | Park et al. |
| 8,799,574 B2 | 8/2014 | Corda |
| 8,856,539 B2 | 10/2014 | Weiss |
| 8,914,477 B2 | 12/2014 | Gammon |
| 8,918,854 B1 | 12/2014 | Giobbi |
| 8,931,698 B2 | 1/2015 | Ishikawa et al. |
| 8,979,646 B2 | 3/2015 | Moser et al. |
| 9,037,140 B1 | 5/2015 | Brown |
| 9,049,188 B1 | 6/2015 | Brown |
| 9,165,233 B2 | 10/2015 | Testanero |
| 9,189,788 B1 | 11/2015 | Robinson et al. |
| 9,230,399 B2 | 1/2016 | Yacenda |
| 9,235,700 B1 | 1/2016 | Brown |
| 9,276,914 B2 | 3/2016 | Woodward et al. |
| 9,305,312 B2 | 4/2016 | Kountotsis et al. |
| 9,405,898 B2 | 8/2016 | Giobbi |
| 9,418,205 B2 | 8/2016 | Giobbi |
| 9,542,542 B2 | 1/2017 | Giobbi et al. |
| 9,679,289 B1 | 6/2017 | Brown |
| 9,830,504 B2 | 11/2017 | Masood et al. |
| 9,892,250 B2 | 2/2018 | Giobbi |
| 10,073,960 B1 | 9/2018 | Brown |
| 10,110,385 B1 | 10/2018 | Rush et al. |
| 10,455,533 B2 | 10/2019 | Brown |
| 10,817,964 B2 | 10/2020 | Guillama et al. |
| 2001/0021950 A1 | 9/2001 | Hawley et al. |
| 2001/0024428 A1 | 9/2001 | Onouchi |
| 2001/0026619 A1 | 10/2001 | Howard, Jr. et al. |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson et al. |
| 2002/0023217 A1 | 2/2002 | Wheeler et al. |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0059114 A1 | 5/2002 | Cockrill et al. |
| 2002/0062249 A1* | 5/2002 | Iannacci ................... 705/14 |
| 2002/0068605 A1 | 6/2002 | Stanley |
| 2002/0069364 A1 | 6/2002 | Dosch |
| 2002/0071559 A1 | 6/2002 | Christensen et al. |
| 2002/0073042 A1 | 6/2002 | Maritzen et al. |
| 2002/0080969 A1 | 6/2002 | Giobbi |
| 2002/0083178 A1 | 6/2002 | Brothers |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake et al. |
| 2002/0095586 A1 | 7/2002 | Doyle et al. |
| 2002/0095587 A1 | 7/2002 | Doyle et al. |
| 2002/0097876 A1 | 7/2002 | Harrison |
| 2002/0098888 A1 | 7/2002 | Rowe et al. |
| 2002/0100798 A1 | 8/2002 | Farrugia et al. |
| 2002/0103027 A1 | 8/2002 | Rowe et al. |
| 2002/0103881 A1 | 8/2002 | Granade et al. |
| 2002/0104006 A1 | 8/2002 | Boate et al. |
| 2002/0104019 A1 | 8/2002 | Chatani et al. |
| 2002/0105918 A1 | 8/2002 | Yamada et al. |
| 2002/0108049 A1 | 8/2002 | Xu et al. |
| 2002/0109580 A1 | 8/2002 | Shreve et al. |
| 2002/0111919 A1 | 8/2002 | Weller et al. |
| 2002/0112183 A1 | 8/2002 | Baird et al. |
| 2002/0116615 A1 | 8/2002 | Nguyen et al. |

(56) References Cited

U.S. PATENT DOCUMENTS

| | | |
|---|---|---|
| 2002/0124251 A1 | 9/2002 | Hunter et al. |
| 2002/0128017 A1 | 9/2002 | Virtanen |
| 2002/0129262 A1 | 9/2002 | Kutaragi et al. |
| 2002/0138438 A1 | 9/2002 | Bardwell |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1* | 10/2002 | Dayley .............. G06Q 30/02 705/14.25 |
| 2002/0143655 A1* | 10/2002 | Elston ................ G06Q 20/02 705/26.81 |
| 2002/0144116 A1 | 10/2002 | Giobbi |
| 2002/0144117 A1 | 10/2002 | Faigle |
| 2002/0147653 A1 | 10/2002 | Shmueli et al. |
| 2002/0148892 A1 | 10/2002 | Bardwell |
| 2002/0150282 A1 | 10/2002 | Kinsella |
| 2002/0152391 A1 | 10/2002 | Willins et al. |
| 2002/0153996 A1 | 10/2002 | Chan et al. |
| 2002/0158121 A1 | 10/2002 | Stanford-Clark |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0184208 A1 | 12/2002 | Kato |
| 2002/0187746 A1 | 12/2002 | Cheng et al. |
| 2002/0191816 A1 | 12/2002 | Matzen et al. |
| 2002/0196963 A1 | 12/2002 | Bardwell |
| 2002/0199120 A1 | 12/2002 | Schmidt |
| 2003/0022701 A1 | 1/2003 | Gupta |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046237 A1 | 3/2003 | Uberti |
| 2003/0046552 A1 | 3/2003 | Hamid |
| 2003/0048174 A1 | 3/2003 | Stevens et al. |
| 2003/0051173 A1 | 3/2003 | Krueger |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0061172 A1 | 3/2003 | Robinson |
| 2003/0063619 A1 | 4/2003 | Montano et al. |
| 2003/0079133 A1 | 4/2003 | Breiter |
| 2003/0087601 A1 | 5/2003 | Agam et al. |
| 2003/0088441 A1 | 5/2003 | McNerney |
| 2003/0105719 A1 | 6/2003 | Berger et al. |
| 2003/0109274 A1 | 6/2003 | Budka et al. |
| 2003/0115351 A1 | 6/2003 | Giobbi |
| 2003/0115474 A1 | 6/2003 | Khan et al. |
| 2003/0117969 A1 | 6/2003 | Koo et al. |
| 2003/0117980 A1 | 6/2003 | Kim et al. |
| 2003/0120934 A1 | 6/2003 | Ortiz |
| 2003/0127511 A1 | 7/2003 | Kelly et al. |
| 2003/0128866 A1 | 7/2003 | McNeal |
| 2003/0137404 A1 | 7/2003 | Bonneau, Jr. et al. |
| 2003/0139190 A1 | 7/2003 | Steelberg et al. |
| 2003/0146835 A1 | 8/2003 | Carter |
| 2003/0149744 A1 | 8/2003 | Bierre et al. |
| 2003/0156742 A1 | 8/2003 | Witt et al. |
| 2003/0159040 A1 | 8/2003 | Hashimoto et al. |
| 2003/0163388 A1* | 8/2003 | Beane ................ G06Q 20/04 705/26.1 |
| 2003/0167207 A1* | 9/2003 | Berardi et al. ................... 705/16 |
| 2003/0169697 A1 | 9/2003 | Suzuki et al. |
| 2003/0172028 A1 | 9/2003 | Abell et al. |
| 2003/0172037 A1 | 9/2003 | Jung et al. |
| 2003/0174839 A1 | 9/2003 | Yamagata et al. |
| 2003/0176218 A1 | 9/2003 | LeMay et al. |
| 2003/0177102 A1 | 9/2003 | Robinson |
| 2003/0186739 A1 | 10/2003 | Paulsen et al. |
| 2003/0195842 A1 | 10/2003 | Reece |
| 2003/0199267 A1 | 10/2003 | Iwasa et al. |
| 2003/0204526 A1 | 10/2003 | Salehi-Had |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1* | 12/2003 | Kwon et al. .................. 709/227 |
| 2004/0002347 A1 | 1/2004 | Hoctor et al. |
| 2004/0015403 A1* | 1/2004 | Moskowitz .......... G06Q 30/06 705/26.1 |
| 2004/0022384 A1 | 2/2004 | Flores et al. |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1* | 2/2004 | Ford .................... G06Q 10/087 186/41 |
| 2004/0039909 A1 | 2/2004 | Cheng |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1 | 4/2004 | Scheurich |
| 2004/0068656 A1 | 4/2004 | Lu |
| 2004/0073792 A1 | 4/2004 | Noble et al. |
| 2004/0081127 A1 | 4/2004 | Gardner et al. |
| 2004/0082385 A1 | 4/2004 | Silva et al. |
| 2004/0090345 A1 | 5/2004 | Hitt |
| 2004/0098597 A1 | 5/2004 | Giobbi |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher et al. |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0128519 A1 | 7/2004 | Klinger et al. |
| 2004/0129787 A1 | 7/2004 | Saito et al. |
| 2004/0132432 A1 | 7/2004 | Moores et al. |
| 2004/0137912 A1 | 7/2004 | Lin |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0181695 A1 | 9/2004 | Walker |
| 2004/0193925 A1 | 9/2004 | Safriel |
| 2004/0194133 A1 | 9/2004 | Ikeda et al. |
| 2004/0203566 A1 | 10/2004 | Leung |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0230809 A1 | 11/2004 | Lowensohn et al. |
| 2004/0234117 A1 | 11/2004 | Tibor |
| 2004/0243519 A1 | 12/2004 | Perttila et al. |
| 2004/0246103 A1 | 12/2004 | Zukowski |
| 2004/0246950 A1 | 12/2004 | Parker et al. |
| 2004/0250074 A1 | 12/2004 | Kilian-Kehr |
| 2004/0252012 A1 | 12/2004 | Beenau et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1 | 12/2004 | Giobbi |
| 2004/0255145 A1 | 12/2004 | Chow |
| 2005/0001028 A1 | 1/2005 | Zuili |
| 2005/0002028 A1 | 1/2005 | Kasapi et al. |
| 2005/0005136 A1 | 1/2005 | Chen et al. |
| 2005/0006452 A1 | 1/2005 | Aupperle et al. |
| 2005/0009517 A1 | 1/2005 | Maes |
| 2005/0021561 A1 | 1/2005 | Noonan |
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1 | 2/2005 | Shapiro |

(56) References Cited

U.S. PATENT DOCUMENTS

| | | |
|---|---|---|
| 2005/0040961 A1 | 2/2005 | Tuttle |
| 2005/0044372 A1 | 2/2005 | Aull et al. |
| 2005/0044387 A1 | 2/2005 | Ozolins |
| 2005/0047386 A1 | 3/2005 | Yi |
| 2005/0049013 A1 | 3/2005 | Chang et al. |
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1 | 4/2005 | Stanko |
| 2005/0076242 A1 | 4/2005 | Breuer |
| 2005/0081040 A1 | 4/2005 | Johnson et al. |
| 2005/0084137 A1 | 4/2005 | Kim et al. |
| 2005/0086115 A1* | 4/2005 | Pearson ............... G06Q 20/18 705/16 |
| 2005/0086515 A1 | 4/2005 | Paris |
| 2005/0089000 A1 | 4/2005 | Bae et al. |
| 2005/0090200 A1 | 4/2005 | Karaoguz et al. |
| 2005/0091338 A1 | 4/2005 | de la Huerga |
| 2005/0091553 A1 | 4/2005 | Chien et al. |
| 2005/0094657 A1 | 5/2005 | Sung et al. |
| 2005/0097037 A1 | 5/2005 | Tibor |
| 2005/0105600 A1 | 5/2005 | Culum et al. |
| 2005/0105734 A1 | 5/2005 | Buer et al. |
| 2005/0108164 A1 | 5/2005 | Salafia, III et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1* | 5/2005 | Rodriguez et al. .......... 705/1 |
| 2005/0114150 A1* | 5/2005 | Franklin ..................... 705/1 |
| 2005/0116020 A1 | 6/2005 | Smolucha et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |
| 2005/0137977 A1 | 6/2005 | Wankmueller |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |
| 2005/0154897 A1 | 7/2005 | Holloway et al. |
| 2005/0161503 A1 | 7/2005 | Remery et al. |
| 2005/0165684 A1 | 7/2005 | Jensen et al. |
| 2005/0166063 A1 | 7/2005 | Zyh-Ming |
| 2005/0167482 A1 | 8/2005 | Ramachandran et al. |
| 2005/0169292 A1 | 8/2005 | Young |
| 2005/0177716 A1 | 8/2005 | Ginter et al. |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0192748 A1 | 9/2005 | Andric et al. |
| 2005/0195975 A1 | 9/2005 | Kawakita |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1 | 9/2005 | Ferguson et al. |
| 2005/0210270 A1 | 9/2005 | Rohatgi et al. |
| 2005/0212657 A1 | 9/2005 | Simon |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0218215 A1 | 10/2005 | Lauden |
| 2005/0220046 A1 | 10/2005 | Falck et al. |
| 2005/0221869 A1 | 10/2005 | Liu et al. |
| 2005/0229007 A1 | 10/2005 | Bolle et al. |
| 2005/0229240 A1 | 10/2005 | Nanba |
| 2005/0242921 A1 | 11/2005 | Zimmerman et al. |
| 2005/0243787 A1 | 11/2005 | Hong et al. |
| 2005/0249385 A1 | 11/2005 | Kondo et al. |
| 2005/0251688 A1 | 11/2005 | Nanvati et al. |
| 2005/0253683 A1 | 11/2005 | Lowe |
| 2005/0257102 A1 | 11/2005 | Moyer et al. |
| 2005/0264416 A1 | 12/2005 | Maurer |
| 2005/0268111 A1 | 12/2005 | Markham |
| 2005/0269401 A1 | 12/2005 | Spitzer et al. |
| 2005/0272403 A1 | 12/2005 | Ryu et al. |
| 2005/0281320 A1 | 12/2005 | Neugebauer |
| 2005/0282558 A1 | 12/2005 | Choi et al. |
| 2005/0284932 A1* | 12/2005 | Sukeda et al. .................. 705/14 |
| 2005/0287985 A1 | 12/2005 | Balfanz et al. |
| 2005/0288069 A1 | 12/2005 | Arunan et al. |
| 2005/0289473 A1 | 12/2005 | Gustafson et al. |
| 2006/0001525 A1 | 1/2006 | Nitzan et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030279 A1 | 2/2006 | Leabman |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0046664 A1 | 3/2006 | Paradiso et al. |
| 2006/0058102 A1 | 3/2006 | Nguyen et al. |
| 2006/0063575 A1 | 3/2006 | Gatto et al. |
| 2006/0069814 A1 | 3/2006 | Abraham et al. |
| 2006/0072586 A1 | 4/2006 | Callaway, Jr. et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0097949 A1 | 5/2006 | Luebke et al. |
| 2006/0110012 A1 | 5/2006 | Ritter |
| 2006/0111955 A1 | 5/2006 | Winter et al. |
| 2006/0113381 A1 | 6/2006 | Hochstein et al. |
| 2006/0116935 A1 | 6/2006 | Evans |
| 2006/0117013 A1 | 6/2006 | Wada |
| 2006/0120287 A1 | 6/2006 | Foti et al. |
| 2006/0129838 A1 | 6/2006 | Chen et al. |
| 2006/0136728 A1 | 6/2006 | Gentry et al. |
| 2006/0136742 A1* | 6/2006 | Giobbi ............... 713/185 |
| 2006/0143441 A1* | 6/2006 | Giobbi ............... 713/155 |
| 2006/0144943 A1 | 7/2006 | Kim |
| 2006/0156027 A1 | 7/2006 | Blake |
| 2006/0158308 A1 | 7/2006 | McMullen et al. |
| 2006/0163349 A1 | 7/2006 | Neugebauer |
| 2006/0165060 A1 | 7/2006 | Dua |
| 2006/0169771 A1 | 8/2006 | Brookner |
| 2006/0170530 A1 | 8/2006 | Nwosu et al. |
| 2006/0170565 A1 | 8/2006 | Husak et al. |
| 2006/0172700 A1 | 8/2006 | Wu |
| 2006/0173846 A1 | 8/2006 | Omae et al. |
| 2006/0173991 A1 | 8/2006 | Piikivi |
| 2006/0183426 A1 | 8/2006 | Graves et al. |
| 2006/0183462 A1 | 8/2006 | Kolehmainen |
| 2006/0184795 A1 | 8/2006 | Doradla et al. |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1* | 8/2006 | Harper ............... 705/65 |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0200467 A1 | 9/2006 | Ohmori et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0226950 A1 | 10/2006 | Kanou et al. |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |
| 2006/0273176 A1 | 12/2006 | Audebert et al. |
| 2006/0274711 A1 | 12/2006 | Nelson, Jr. et al. |
| 2006/0279412 A1 | 12/2006 | Holland et al. |
| 2006/0286969 A1 | 12/2006 | Talmor et al. |

(56) References Cited

U.S. PATENT DOCUMENTS

| | | |
|---|---|---|
| 2006/0288095 A1 | 12/2006 | Torok et al. |
| 2006/0288233 A1 | 12/2006 | Kozlay |
| 2006/0290580 A1 | 12/2006 | Noro et al. |
| 2006/0293925 A1 | 12/2006 | Flom |
| 2006/0294388 A1 | 12/2006 | Abraham et al. |
| 2007/0003111 A1 | 1/2007 | Awatsu et al. |
| 2007/0005403 A1 | 1/2007 | Kennedy et al. |
| 2007/0007331 A1* | 1/2007 | Jasper .................... G06Q 20/20 235/379 |
| 2007/0008070 A1 | 1/2007 | Friedrich |
| 2007/0008916 A1 | 1/2007 | Haugli et al. |
| 2007/0011724 A1 | 1/2007 | Gonzalez et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032225 A1 | 2/2007 | Konicek et al. |
| 2007/0032288 A1 | 2/2007 | Nelson et al. |
| 2007/0033072 A1 | 2/2007 | Bildirici |
| 2007/0033150 A1 | 2/2007 | Nwosu |
| 2007/0036396 A1 | 2/2007 | Sugita et al. |
| 2007/0038751 A1 | 2/2007 | Jorgensen |
| 2007/0043594 A1 | 2/2007 | Lavergne |
| 2007/0050259 A1* | 3/2007 | Wesley ............................ 705/16 |
| 2007/0050398 A1 | 3/2007 | Mochizuki |
| 2007/0051794 A1 | 3/2007 | Glanz et al. |
| 2007/0051798 A1 | 3/2007 | Kawai et al. |
| 2007/0055630 A1 | 3/2007 | Gauthier et al. |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0070040 A1 | 3/2007 | Chen et al. |
| 2007/0072636 A1 | 3/2007 | Worfolk et al. |
| 2007/0073553 A1* | 3/2007 | Flinn et al. ........................ 705/1 |
| 2007/0084523 A1 | 4/2007 | McLean et al. |
| 2007/0084913 A1 | 4/2007 | Weston |
| 2007/0087682 A1 | 4/2007 | DaCosta |
| 2007/0087834 A1 | 4/2007 | Moser et al. |
| 2007/0100507 A1 | 5/2007 | Simon |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0120643 A1 | 5/2007 | Jiunn-Chung |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0142032 A1 | 6/2007 | Balsillie |
| 2007/0152826 A1 | 7/2007 | August et al. |
| 2007/0156850 A1 | 7/2007 | Corrion |
| 2007/0157249 A1 | 7/2007 | Cordray et al. |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0164847 A1 | 7/2007 | Crawford et al. |
| 2007/0169121 A1 | 7/2007 | Hunt et al. |
| 2007/0174809 A1 | 7/2007 | Brown et al. |
| 2007/0176756 A1 | 8/2007 | Friedrich |
| 2007/0176778 A1 | 8/2007 | Ando et al. |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0198436 A1 | 8/2007 | Weiss |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1* | 10/2007 | Giobbi et al. ............... 713/186 |
| 2007/0245158 A1* | 10/2007 | Giobbi .................... G06F 21/31 713/186 |
| 2007/0247366 A1 | 10/2007 | Smith et al. |
| 2007/0258626 A1 | 11/2007 | Reiner |
| 2007/0260883 A1* | 11/2007 | Giobbi .................. G06Q 20/341 713/168 |
| 2007/0260888 A1 | 11/2007 | Giobbi et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028227 A1 | 1/2008 | Sakurai |
| 2008/0028453 A1 | 1/2008 | Nguyen et al. |
| 2008/0040609 A1 | 2/2008 | Giobbi |
| 2008/0046366 A1 | 2/2008 | Bemmel et al. |
| 2008/0046715 A1 | 2/2008 | Balazs et al. |
| 2008/0049700 A1 | 2/2008 | Shah et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0107089 A1 | 5/2008 | Larsson et al. |
| 2008/0109895 A1 | 5/2008 | Janevski |
| 2008/0111752 A1 | 5/2008 | Lindackers et al. |
| 2008/0127176 A1 | 5/2008 | Lee et al. |
| 2008/0129450 A1 | 6/2008 | Riegebauer |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1 | 7/2008 | Park et al. |
| 2008/0186166 A1 | 8/2008 | Zhou et al. |
| 2008/0188308 A1 | 8/2008 | Shepherd et al. |
| 2008/0195863 A1 | 8/2008 | Kennedy |
| 2008/0201768 A1 | 8/2008 | Koo et al. |
| 2008/0203107 A1 | 8/2008 | Conley et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0223918 A1 | 9/2008 | Williams et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0289030 A1 | 11/2008 | Poplett |
| 2008/0289032 A1 | 11/2008 | Aoki et al. |
| 2008/0303637 A1 | 12/2008 | Gelbman et al. |
| 2008/0313728 A1 | 12/2008 | Pandrangi et al. |
| 2008/0314971 A1 | 12/2008 | Faith et al. |
| 2008/0316045 A1 | 12/2008 | Sriharto et al. |
| 2009/0002134 A1 | 1/2009 | McAllister |
| 2009/0013191 A1 | 1/2009 | Popowski |
| 2009/0016573 A1 | 1/2009 | McAfee, II et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |

(56) References Cited

U.S. PATENT DOCUMENTS

| | | |
|---|---|---|
| 2009/0041309 A1 | 2/2009 | Kim et al. |
| 2009/0045916 A1 | 2/2009 | Nitzan et al. |
| 2009/0052389 A1 | 2/2009 | Qin et al. |
| 2009/0070146 A1 | 3/2009 | Haider et al. |
| 2009/0076849 A1 | 3/2009 | Diller |
| 2009/0081996 A1 | 3/2009 | Duggal et al. |
| 2009/0096580 A1 | 4/2009 | Paananen |
| 2009/0125401 A1* | 5/2009 | Beenau ............... G06Q 20/32 705/14.26 |
| 2009/0140045 A1 | 6/2009 | Evans |
| 2009/0157512 A1* | 6/2009 | King ............................. 705/14 |
| 2009/0176566 A1 | 7/2009 | Kelly |
| 2009/0177495 A1 | 7/2009 | Abousy et al. |
| 2009/0199206 A1 | 8/2009 | Finkenzeller et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0253516 A1 | 10/2009 | Hartmann et al. |
| 2009/0254971 A1 | 10/2009 | Herz et al. |
| 2009/0264712 A1 | 10/2009 | Baldus et al. |
| 2009/0310514 A1 | 12/2009 | Jeon et al. |
| 2009/0313689 A1 | 12/2009 | Nystrom et al. |
| 2009/0319788 A1 | 12/2009 | Zick et al. |
| 2009/0320118 A1 | 12/2009 | Muller et al. |
| 2009/0322510 A1 | 12/2009 | Berger et al. |
| 2009/0328182 A1 | 12/2009 | Malakapalli et al. |
| 2010/0005526 A1 | 1/2010 | Tsuji et al. |
| 2010/0007498 A1 | 1/2010 | Jackson |
| 2010/0022308 A1 | 1/2010 | Hartmann et al. |
| 2010/0023074 A1 | 1/2010 | Powers et al. |
| 2010/0037255 A1 | 2/2010 | Sheehan et al. |
| 2010/0062743 A1 | 3/2010 | Jonsson |
| 2010/0077214 A1 | 3/2010 | Jogand-Coulomb et al. |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0172567 A1 | 7/2010 | Prokoski |
| 2010/0174911 A1 | 7/2010 | Isshiki |
| 2010/0188226 A1 | 7/2010 | Seder et al. |
| 2010/0214100 A1 | 8/2010 | Page |
| 2010/0277283 A1 | 11/2010 | Burkart et al. |
| 2010/0277286 A1 | 11/2010 | Burkart et al. |
| 2010/0291896 A1 | 11/2010 | Corda |
| 2010/0305843 A1 | 12/2010 | Yan et al. |
| 2010/0328033 A1 | 12/2010 | Kamei |
| 2011/0072034 A1 | 3/2011 | Sly et al. |
| 2011/0072132 A1 | 3/2011 | Shafer et al. |
| 2011/0082735 A1* | 4/2011 | Kannan et al. ............ 705/14.23 |
| 2011/0085287 A1 | 4/2011 | Ebrom et al. |
| 2011/0091136 A1 | 4/2011 | Danch et al. |
| 2011/0116358 A9 | 5/2011 | Li et al. |
| 2011/0126188 A1 | 5/2011 | Bernstein et al. |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0028609 A1 | 2/2012 | Hruska |
| 2012/0030006 A1 | 2/2012 | Yoder et al. |
| 2012/0069776 A1 | 3/2012 | Caldwell et al. |
| 2012/0086571 A1 | 4/2012 | Scalisi et al. |
| 2012/0182123 A1 | 7/2012 | Butler et al. |
| 2012/0212322 A1 | 8/2012 | Idsoe |
| 2012/0226451 A1 | 9/2012 | Bacot et al. |
| 2012/0226565 A1 | 9/2012 | Drozd |
| 2012/0226907 A1 | 9/2012 | Hohberger et al. |
| 2012/0226990 A1 | 9/2012 | Hohberger et al. |
| 2012/0238271 A1 | 9/2012 | Scherzer |
| 2012/0278188 A1 | 11/2012 | Attar et al. |
| 2012/0310720 A1 | 12/2012 | Balsan et al. |
| 2013/0019295 A1 | 1/2013 | Park et al. |
| 2013/0019323 A1 | 1/2013 | Arvidsson et al. |
| 2013/0044111 A1 | 2/2013 | VanGilder et al. |
| 2013/0111543 A1 | 5/2013 | Brown et al. |
| 2013/0135082 A1 | 5/2013 | Xian et al. |
| 2013/0179201 A1 | 7/2013 | Fuerstenberg et al. |
| 2013/0276140 A1 | 10/2013 | Coffing et al. |
| 2013/0331063 A1 | 12/2013 | Cormier et al. |
| 2014/0074696 A1 | 3/2014 | Glaser |
| 2014/0147018 A1 | 5/2014 | Argue et al. |
| 2014/0266604 A1 | 9/2014 | Masood et al. |
| 2014/0266713 A1 | 9/2014 | Sehgal et al. |
| 2015/0039451 A1 | 2/2015 | Bonfiglio |
| 2015/0294293 A1 | 10/2015 | Signarsson |
| 2015/0310385 A1 | 10/2015 | King et al. |
| 2015/0310440 A1 | 10/2015 | Hynes et al. |
| 2016/0210614 A1 | 7/2016 | Hall |
| 2016/0300236 A1 | 10/2016 | Wiley et al. |
| 2017/0085564 A1 | 3/2017 | Giobbi et al. |
| 2017/0091548 A1 | 3/2017 | Agrawal et al. |
| 2018/0322718 A1 | 11/2018 | Qian et al. |
| 2018/0357475 A1 | 12/2018 | Honda et al. |
| 2019/0172281 A1 | 6/2019 | Einberg et al. |
| 2019/0260724 A1 | 8/2019 | Hefetz et al. |

FOREIGN PATENT DOCUMENTS

| | | |
|---|---|---|
| WO | 01/22724 | 3/2001 |
| WO | 01/35334 | 5/2001 |
| WO | 01/75876 | 10/2001 |
| WO | 01/77790 | 10/2001 |
| WO | 2004/010774 A1 | 2/2004 |
| WO | 2004/038563 | 5/2004 |
| WO | 2005/031663 A2 | 4/2005 |
| WO | 2005/050450 | 6/2005 |
| WO | 2005/086802 | 9/2005 |
| WO | 2007/087558 | 8/2007 |

OTHER PUBLICATIONS

Derfler, "How Networks Work," Bestseller Edition, 1996, Ziff-Davis Press, Emeryville, CA, all pages.*

Gralla, "How the Internet Works," Millennium Edition, 1999, Que Corporation, Indianapolis, IN, all pages.*

Muller, "Desktop Encyclopedia of the Internet," 1999, Artech House Inc., Norwood, MA, all pages.*

Giobbi, John, Specification of U.S. Appl. No. 60/824,758, all pages.*

PCT International Search Report and Written Opinion, PCT/US2009/039943, dated Jun. 1, 2009, 9 pages.

Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.

Noore, "Highly Robust Biometric Smart Card Design." IEEE Transactions on Consumer Electronics, vol. 46, No. 4, Nov. 2000, pp. 1059-1063.

Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.

Paget, "The Security Behind Secure Extranets," Enterprise Systems Journal, vol. 14, No. 12, Dec. 1999, 4 pgs.

Pash, "Automate proximity and location-based computer actions," Jun. 5, 2007, retrieved from http://lifehacker.com/265822/automate-proximity-and-location+based-computer-actions on or before Oct. 11, 2011, 3 pgs.

Pope et al., "Oasis Digital Signature Services: Digital Signing without the Headaches," IEEE Internet Computing, vol. 10, Sep./Oct. 2006, pp. 81-84.

Saflink Corporation, "SAFModule™: A Look Into Strong Authentication," white paper, retrieved from www.ibia.org/membersadmin/whitepapers/pdf/6/SAFmod_WP.pdf on Jan. 7, 2007, 8 pgs.

Sapsford, "E-Business: Sound Waves Could Help Ease Web-Fraud Woes," Wall Street Journal, Aug. 14, 2000, p. B1.

Singh et al. "A Constraint-Based Biometric Scheme on ATM and Swiping Machine." 2016 International Conference on Computa-

(56) References Cited

OTHER PUBLICATIONS tional Techniques in Information and Communication Technologies (ICCTICT), Mar. 11, 2016, pp. 74-79.
Smart Card Alliance, "Contactless Technology for Secure Physical Access: Technology and Standards Choices," Smart Card Alliance, Oct. 2002, pp. 1-48.
Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.
SplashID, "SplashID—Secure Password Manager for PDAs and Smartphones," Mar. 8, 2007, retrieved from http://www.splashdata.com/splashid/ via http://www.archive.org/ on or before Oct. 11, 2011, 2 pgs.
Srivastava, "Is internet security a major issue with respect to the slow acceptance rate of digital signatures," Jan. 2, 2005, Computer Law & Security Report, pp. 392-404.
Thomson Multimedia, "Thomson multimedia unveils copy protection proposal designed to provide additional layer of digital content security," retrieved from www.thompson-multimedia.com/gb/06/c01/010530.htm on Mar. 4, 2002, May 30, 2001, 2 pgs.
Unixhelp, "What is a file?" Apr. 30, 1998, retrieved from unixhelp.ed.ac.uk/editors/whatisafile.html.accessed Mar. 11, 2010 via http://waybackmachine.org/19980615000000*/http://unixhelp.ed.ac.uk/editors/whatisafile.html on Mar. 11, 2011, 1 pg.
Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
Yoshida, "Content protection plan targets wireless home networks," EE Times, Jan. 11, 2002, retrieved from www.eetimes.com/story/OEG20020111S0060 on Mar. 4, 2002, 2 pgs.
Anonymous, "Applying Biometrics to Door Access," Security Magazine, Sep. 26, 2002, retrieved from http://www. securitymagazine.com/CDA/Articles/Technologies/3ae610eaa34d8010VgnVCM100000f932a8c0_ on Jan. 7, 2007, 5 pgs.
Anonymous, "Firecrest Shows How Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
Biopay, LLC, "Frequently Asked Questions (FAQs) About BioPay," retrieved from http://www.biopay.com/faqs-lowes.asp on Jan. 7, 2007, 5 pgs.
BlueProximity, "BlueProximity—Leave it—it's locked, come back, it's back too . . . " Aug. 26, 2007, retrieved from http://blueproximity.sourceforge.net/ via http://www.archive.org/ on or before Oct. 11, 2011, 1 pg.

Bluetooth Sig, Inc. "Bluetooth," www.bluetoothcom, Jun. 1, 2000, 8 pgs.
Bluetooth Sig, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Chen et al. "On Enhancing Biometric Authentication with Data Protection." KES2000. Fourth International Conference on Knowledge-Based Intelligent Engineering Systems and Allied Technologies. Proceedings (Cat. No. 00TH8516), vol. 1, Aug. 1, 2000, pp. 249-252.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (PoE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance", 2017, Journal of Information Systems, pp. 5-21.
Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
International Search Report and Written Opinion for International Application No. PCT/US04/38124, dated Apr. 7, 2005, 10 pgs.
International Search Report and Written Opinion for International Application No. PCT/US05/07535, dated Dec. 6, 2005, 6 pgs.
International Search Report and Written Opinion for International Application No. PCT/US05/43447, dated Feb. 22, 2007, 7 pgs.
International Search Report and Written Opinion for International Application No. PCT/US05/46843, dated Mar. 1, 2007, 10 pgs.
International Search Report and Written Opinion for International Application No. PCT/US07/00349, dated Mar. 19, 2008, 10 pgs.
International Search Report and Written Opinion for International Application No. PCT/US07/11102, dated Oct. 3, 2008, 11 pgs.
International Search Report and Written Opinion for International Application No. PCT/US07/11103, dated Apr. 23, 2008, 9 pgs.
International Search Report and Written Opinion for International Application No. PCT/US07/11104, dated Jun. 26, 2008, 9 pgs.
International Search Report and Written Opinion for International Application No. PCT/US07/11105, dated Oct. 20, 2008, 10 pgs.
International Search Report and Written Opinion for International Application No. PCT/US08/83060, dated Dec. 29, 2008, 9 pgs.
International Search Report and Written Opinion for International Application No. PCT/US08/87835, dated Feb. 11, 2009, 8 pgs.
International Search Report and Written Opinion for International Application No. PCT/US09/34095, dated Mar. 25, 2009, 11 pgs.
International Search Report and Written Opinion for International Application No. PCT/US2014/037609, dated Dec. 9, 2014, 13 pgs.
Jeyaprakash et al. "Secured Smart Card Using Palm Vein Biometric On-Card-Process." 2008 International Conference on Convergence and Hybrid Information Technology, 2008, pp. 548-551.

(56) References Cited

OTHER PUBLICATIONS

Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," InformationWeek, Jun. 7, 2001, retrieved from www.informationweek.com/story/IWK2001060730013 on Mar. 4, 2002, 1 pg.
Lake, "Downloading for Dollars: Who said buying music off the Net would be easy?," Sound & Vision, Nov. 2000, pp. 137-138.
Lee et al., "Effects of dielectric superstrates on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.
Lewis, "Sony and Visa in On-Line Entertainment Venture," New York Times, vol. 145, Thurs. Ed., Nov. 16, 1995, 1 pg.
Liu et al., "A Practical Guide to Biometric Security Technology, " IT Pro, vol. 3, No. 1, Jan./Feb. 2001, pp. 27-32.
McIver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.
Micronas, "Micronas and Thomson Multimedia Showcase a New Copy Protection System that Will Drive the Future of Digital Television," Jan. 8, 2002, retrieved from www.micronas.com/press/pressreleases/printer.php?ID=192 on Mar. 4, 2002, 3 pgs.
National Criminal Justice Reference Service, "Antenna Types," Dec. 11, 2006, online at http://ncjrs.gov/pdfffiles1/nij/185030b.pdf, retrieved from http://web.archive.org/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vittles, "magicJack: Could It Be the Asterisk Killer?" Aug. 1, 2007, retrieved from http://nerdvittles.com/index.php?p=187 on or before Oct. 11, 2011, 2 pgs.
IEEE Computer Society, "IEEE Std 802.15.4™—Part 15.4: Wireless Medium Access Control (MAC) and Physical Layer (PHY) Specifications for Low-Rate Wireless Personal Area Networks (LR-WPANs)," The Institute of Electrical and Electronics Engineers, Inc., New York, NY, Oct. 1, 2003, 679 pgs.
International Search Report received for PCT Patent Application No. PCT/US2001/049916, dated Apr. 25, 2002, 1 page.
Smart Cards and Biometrics White Paper: Smart Card Alliance, May 2002, [online] [Retrieved on Jan. 7, 2007] Retrieved from the Internet<URL:http://www.securitymanagement.com/librarylsmartcard_faqte- ch0802.pdf>, 7 pages.

\* cited by examiner

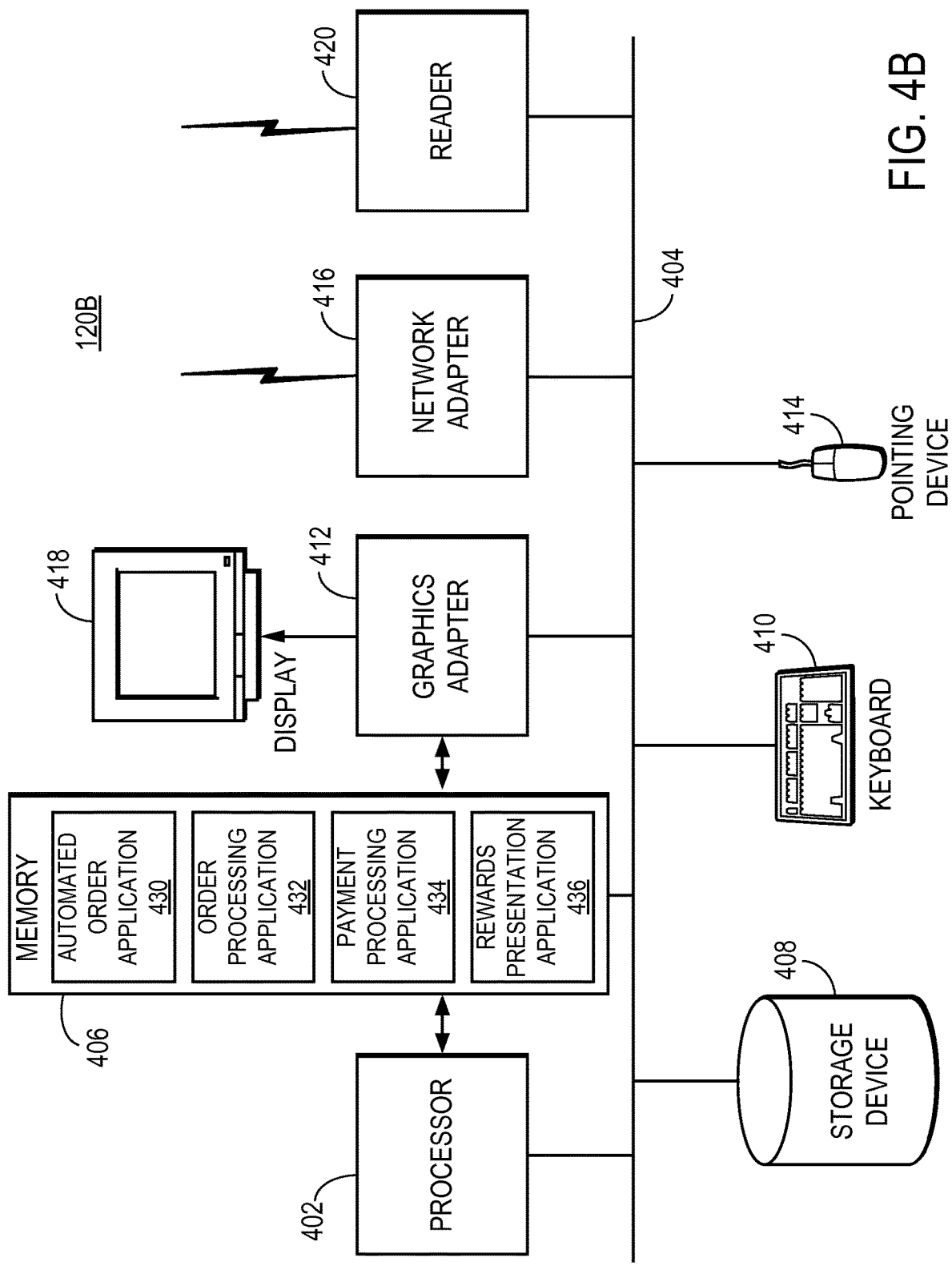

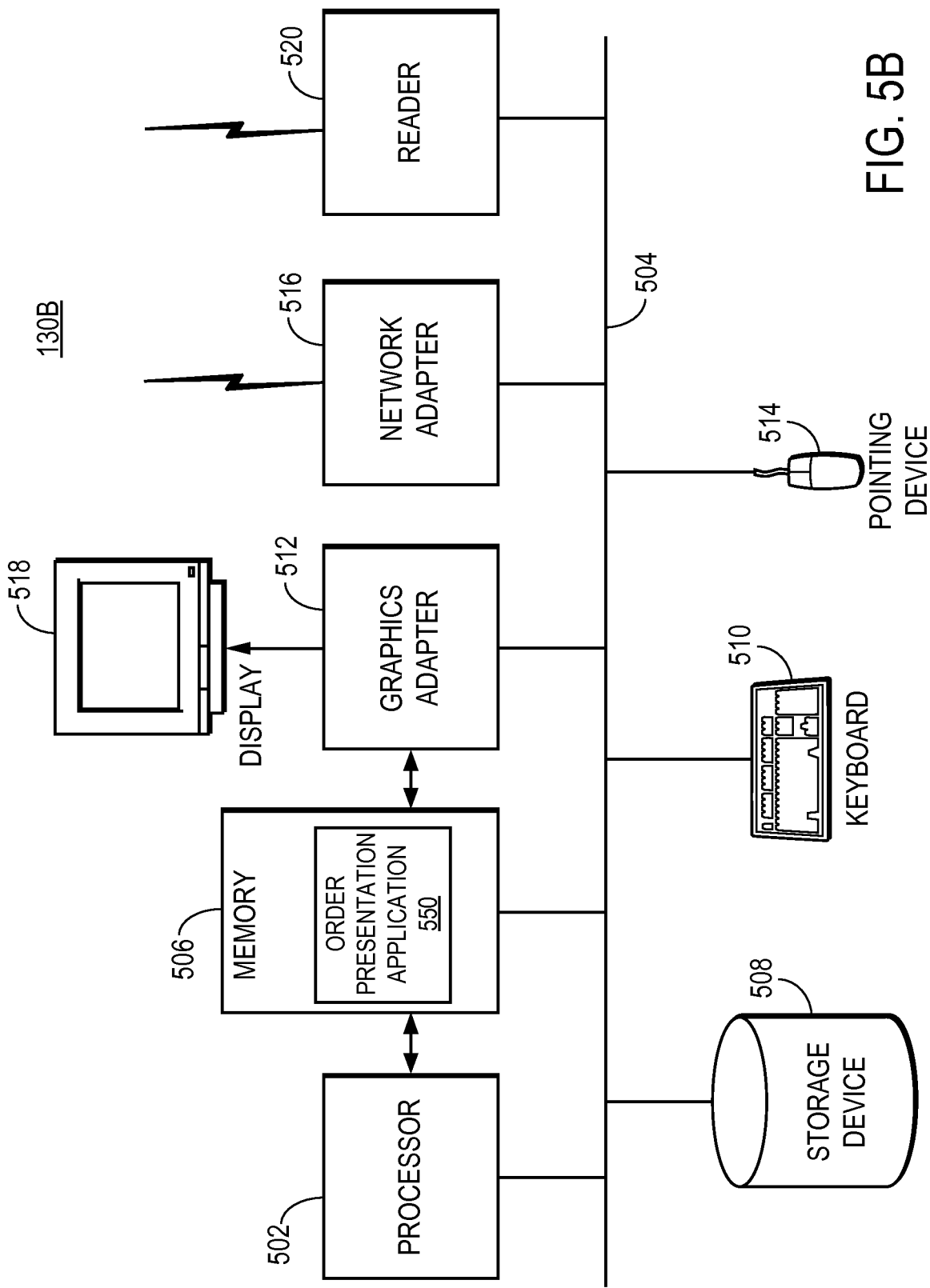

AUTOMATED SERVICE-BASED ORDER PROCESSING

CROSS REFERENCE TO RELATED APPLICATIONS

This application claims the benefit of U.S. Patent Application No. 61/043,326, entitled "Automated Service-Based Order Processing (Prox Order)" filed Apr. 8, 2008 and U.S. Patent Application No. 61/102,983, entitled "Automated Service-Based Order Processing (Prox Order)" filed Oct. 6, 2008, the entire contents of which are all herein incorporated by reference.

BACKGROUND OF THE INVENTION

1. Field of Art

The disclosure generally relates to the field of electronic order processing, and more specifically, to automated order processing using biometric verification.

2. Description of the Related Art

Optimizing sales transactions is one of the many challenges faced by various merchants. Ensuring these processes are secure, efficient and simple is important to merchants, providers, users and consumers alike. Conventionally, technologies such as magnetic cards (e.g., credit cards, debit cards, ATM cards, and employee badges) have been used in attempt to address these needs. More recently, various contactless cards or tokens requiring placement near compatible readers have been used.

Further, in serviced-based transactions, such as those that would occur at STARBUCKS™, MCDONALDS™, or QUIZNOS™, the transaction may be further delayed during the ordering process due to the various steps involved in processing and completing the transaction. The transaction may be even further delayed due to the fact that, oftentimes, customers customize or change their orders from what is regularly offered. Also, many of these merchants have increased in popularity over the years, leading to increasing number of customers visiting such merchants. The combination of the currently technologies for completing and processing these service-based transactions, coupled with the increase in number of customers frequenting the merchants' establishments leads to longer wait times for a transaction to process and complete. A new technology is needed that provides highly reliable, safe, efficient automation for order processing.

BRIEF SUMMARY OF THE INVENTION

A system and method provide efficient, secure and fast automation of order processing. A system for automated electronic order processing, including a customer interface device for wirelessly receiving data from a personal digital key (PDK) and a transactions server, adapted for communication with the customer interface device for initiating an order in response to wirelessly receiving the data from the PDK and processing the order. In one embodiment, the system also includes a merchant interface device, adapted to communicate with the transactions server, for wirelessly receiving data from a personal digital key (PDK). The transactions server is adapted for communication with the merchant interface device and for initiating an order completion. In one embodiment, the system also includes a reader, adapted to communicate with the transaction server, for automatically uploading data from the PDK and receiving biometric input from a user.

The method includes initiating an order by wirelessly receiving data from a personal digital key (PDK). The method also includes receiving a biometric input and confirming the initiation of the order by authenticating the biometric input. In response to authenticating the biometric input, the order is processed. In another embodiment, the method of further includes automatically initiating an order completion by wirelessly receiving data from a PDK. The method further includes receiving a biometric input and confirming the order completion by authenticating the biometric input. In response to authenticating the biometric input, the order is completed. In yet another embodiment, the method further includes processing rewards based on the order.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG.) 1 is a high level block diagram illustrating a system for automated service-based order processing according to one embodiment of the invention.

FIG. 4B is a block diagram illustrating a customer interface device according to another embodiment of the invention.

FIG. 5B is a block diagram illustrating a merchant interface device according to another embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
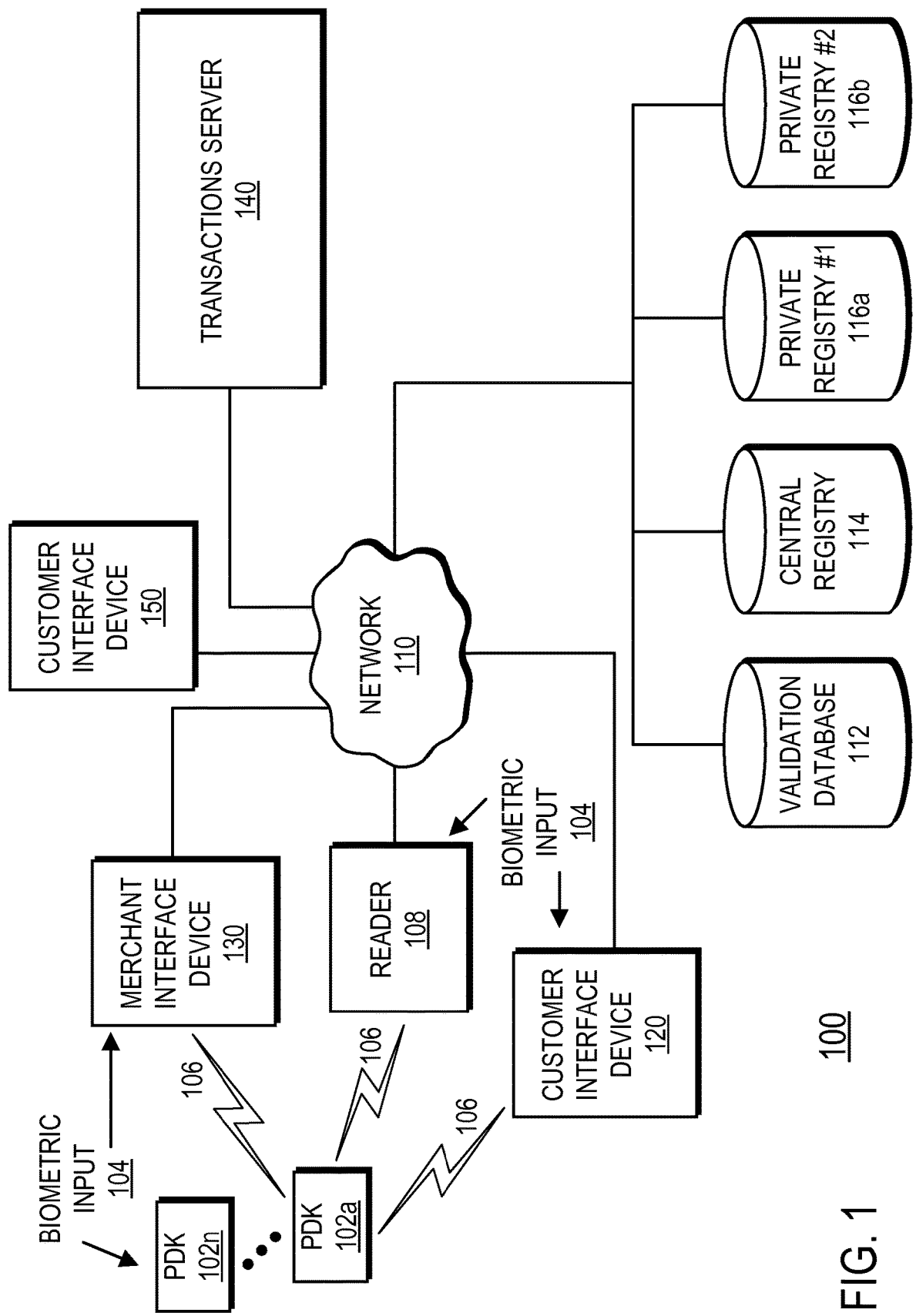

FIG. 1 is a high level block diagram illustrating a system 100 for automated service-based order processing according to one embodiment of the invention. The system 100 comprises a Personal Digital Key (PDK) 102, a reader 108, a network 110, a customer interface device 120, a merchant interface device 130, a transactions server 140 and one or more external databases including a validation database 112, a central registry 114 and one or more private registries 116. The reader 108, customer interface device 120 and merchant interface device 130 are coupled to the PDK 102 by a wireless link 106 and coupled to a network 110 by either a wired or wireless link. The reader 108, customer interface device 120, merchant interface device 130 are also adapted to receive a biometric input 104 from a user and is capable of displaying status to a user. Similarly, in one embodiment, the PDK 102 is also adapted to receive a biometric input 104 from a user. The network 110 couples the validation database 112, the central registry 114 and two private registries 116 to the reader 108, customer interface device 120, merchant interface device 130 and transactions server 140. In alternative embodiments, different or additional external registries or databases may be coupled to the network 110.

The system 100 addresses applications where it is important to ensure a specific individual is authorized to perform a given transaction. A transaction as used herein can include executing a purchase or financial dealing, enabling access to physical and/or digital items, verifying identification or personal information or executing other tasks where it is important to authenticate an individual for use. Generally, the reader 108 wirelessly receives information stored in the PDK 102 that uniquely identifies the PDK 102 and the individual carrying the PDK 102. The reader 108 can also receive a biometric input 104 from the individual. Based on the received information, the reader 108 determines if the transaction should be authorized. Beneficially, the system 100 provides comprehensive authentication without the need for PINs or passwords. Moreover, personal biometric information need not be stored in any local or remote storage database and is only stored on the user's own PDK. Furthermore, in one embodiment, purchase transactions can be efficiently completed without requiring the use of physical credit cards, tokens or other user action beyond initiating the transaction.

The credibility of the system 100 is ensured by the use of the PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330 entitled "Personal Digital Key And Receiver/Decoder Circuit System And Method;" U.S. patent application Ser. No. 11/620,581 entitled "Wireless Network Synchronization Of Cells And Client Devices On A Network;" and U.S. patent application Ser. No. 11/620,577 entitled "Dynamic Real-Time Tiered Client Access", the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in U.S. patent application Ser. No. 11/744,832 (Attorney Docket No. 25000-12784), entitled "Personal Digital Key Initialization and Registration For Secure Transaction", the entire contents of which are incorporated herein by reference.

The reader 108 wirelessly communicates with the PDK 102 when the PDK 102 is within a proximity zone of the reader 108. The proximity zone can be, for example, several meters in radius and can be adjusted dynamically by the reader 108. Example embodiments of a reader with a dynamically adjustable proximity zone are described in U.S. patent application No. 11/620,600 (Attorney Docket No. 25000-12199), filed Jan. 5, 2007, entitled "Dynamic Cell Size Variation Via Wireless Link Parameter Adjustment", the entire contents of which are incorporated herein by reference. Thus, in contrast to many conventional RF ID devices, the reader 108 can detect and communicate with the PDK 102 without requiring the owner to remove the PDK 102 from his/her pocket, wallet, purse, etc. Also, in contrast to many conventional RFID devices, the reader 108 and PDK 102 are designed to operate in a dense client environment - not on a one-by-one reader to client-held device basis. Example embodiments of a reader that provides dense, coordinated system operation is described in U.S. patent application Ser. No. 11/620,581 (Attorney Docket No. 25000-12194), filed Jan. 5, 2007, entitled "Wireless Network Synchronization Of Cells And Client Devices On A Network", the entire contents of which are incorporated herein by reference. Generally, the reader 108 receives uniquely identifying information from the PDK 102 and initiates an authentication process for the individual carrying the PDK 102. In one embodiment, the reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The reader 108 compares the biometric input 104 to information received from the PDK 102 to determine if a transaction should be authorized. Alternatively, the biometric input 104 can be obtained by a biometric reader on the PDK 102 and transmitted to the reader 108 for authentication. In an additional alternative embodiment, some or all of the authentication process can be performed by the PDK 102 instead of the reader 108.

The reader 108 is further communicatively coupled to the network 110 in order to receive and/or transmit information to remote databases for remote authentication. In an alternative embodiment, the reader 108 includes a non-volatile data storage that can be synchronized with one or more remote databases 112 or registries 114-116. Such an embodiment relaxes the requirement for a continuous connection to the network 110 and allows the reader 108 to operate in a standalone mode and for the local data storage to be updated when a connection is available. For example, a standalone reader 108 can periodically download updated registry entries and perform authentication locally without any remote lookup.

The customer interface devices 120 facilitate in the process of automated order processing. In one embodiment, the customer interface device 120 allows a customer to initiate an order by simply providing a biometric sample. In one embodiment, a customer can initiate an order via the customer interface device 120 with a simple finger swipe. In another embodiment, the customer can initiate, complete and pay for the order by simply providing a biometric sample, such as a finger swipe. In yet another embodiment, the customer need only confirm and/or select his or her order by providing a biometric sample, such as a finger swipe. More details describing the components and functionality of the customer interface device 120 is provided below with reference to FIGS. 4A and 4B.

The merchant interface device 130 allows customers to automatically and securely complete order transactions with a simple step of providing a biometric sample. In one embodiment, the merchant interface device 130 allows customers to automatically and securely complete order transactions with a simple swipe of the finger. In another embodiment, the merchant interface device 130 displays customers' orders to be prepared by the merchant. In one embodiment, the customers' orders are displayed in a list in order of when the order what placed. More details describing the components and functionality of the merchant interface device 130 is provided below with reference to FIGS. 5A and 5B.

The transactions server 140 includes software or routines for automating the process of entering and fulfilling an order. The transactions server 140 facilitates automatic order processing and payment procedures. The transactions server 140 is coupled to and adapted to communicate with the customer interface device 120, the merchant interface device 130 and the reader 108 via the network 110. The transaction server 140 is also coupled to the registries 114-116 for payment information and verification. More details describing the components and functionality of the transactions server 140 is provided below with reference to FIG. 14.

The network 110 provides communication between the reader 108, customer interface device 120, merchant interface device 130, transactions server 140 and the validation database 112, central registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed at the reader 108. For example, in purchase transactions, the validation database 112 is a credit card validation database that is separate from the merchant providing the sale. Alternatively, a different database may be used to validate different types of purchasing means such as a debit card, ATM card or bank account number.

The registries 114-116 are securely-accessible databases coupled to the network 110 that store, among other items, PDK, Notary, and reader information. In one embodiment, the registries 114-116 do not store biometric information. Information stored in the registries can be accessed by the reader 108 via the network 110 for use in the authentication process. There are two basic types of registries illustrated: private registries 116 and the central registry 114. Private registries 116 are generally established and administered by their controlling entities (e.g., a merchant, business authority, or other entity administering authentication). Private registries 116 can be custom configured to meet the specialized and independent needs of each controlling entity. The central registry 114 is a single highly-secured, centrally-located database administered by a trusted third-party organization. In one embodiment, all PDKs 102 are registered with the central registry 114 and may be optionally registered with one or more selected private registries 116. In some embodiments, these registries 114-116 are financial databases for payment processing. In such embodiments, registries 114-116 are financial databases of credit card companies such as AMERICAN EXPRESS™, VISA™ or MASTERCARD™. In alternative embodiments, a different number or different types of registries may be coupled to the network 110.

Figure 2A:
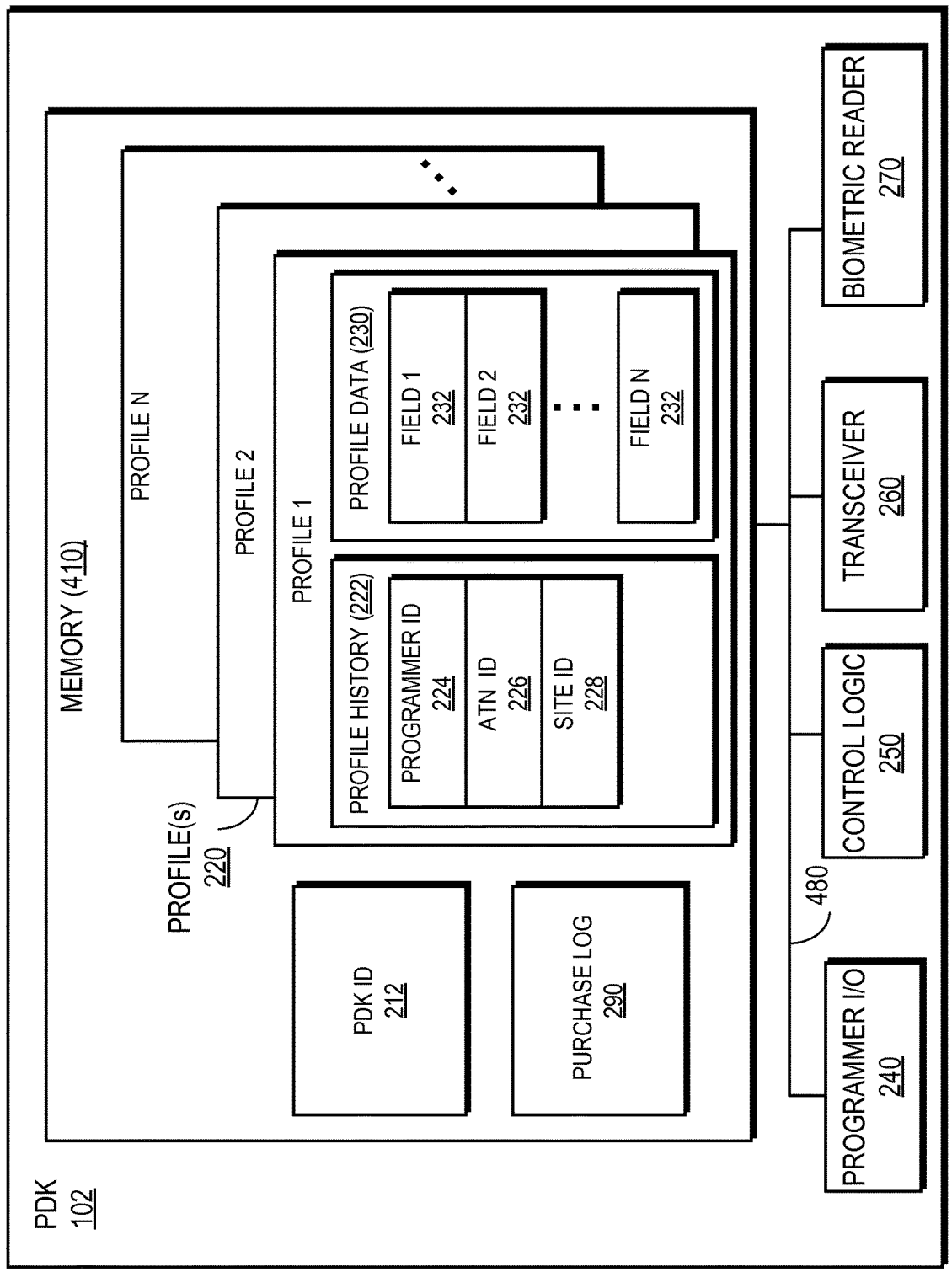
FIG. 2A is a block diagram illustrating a Personal Digital Key (PDK) according to one embodiment of the invention.

Turning now to FIG. 2A, an example embodiment of a PDK 102 is illustrated. The PDK 102 comprises a memory 210, a programmer I/O 240, control logic 250, and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, a key fob, or jewelry items such as watches, rings, necklaces or bracelets.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. The PDK ID 212 can also be used in basic PDK authentication to ensure that the PDK 102 is a valid device. In one embodiment, the memory 210 also stores a purchase log 290. The purchase log 290 keeps track of the customer's purchases for at a particular merchant's establishment. The data contained in the purchase log 290 can later be used to determine rewards.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with a reduced level of encryption while the full biometric profiles are only transmitted over secure channels. In the case of fingerprint authentication, for example, the biometric profile sample may represent only a small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used along with other personal identification information, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

In another embodiment, the PDK 102 stores purchase information for participating merchants. The PDK 102 also stores regularly ordered items for a particular merchant. In some embodiments, the regularly ordered items are stored as the customer's favorites.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information, or membership information. This information can be useful for certain types of transactions. For example, with purchases that require delivery, a PDK 102 can automatically transmit address information to the reader 108 at the point of transaction. In one embodiment, a profile can store multiple addresses. At the point of transaction, the reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information is also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add additional profiles, credit cards, personal information, etc. to the PDK 102. In another embodiment, the user can make copies of the PDK 102 or move profiles from one PDK 102 to another once the PDK 102 is unlocked.

The profile history 222 includes a programmer ID field 224, a Notary ID 226, and a site ID field 228. The profile history 222 relates to the specific hardware, Notary, and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in U.S. patent application Ser. No. 11/744,832 (Attorney Docket No. 25000-12784) entitled "Personal Digital Key Initialization and Registration For Secure Transaction", the entire contents of which are incorporated herein by reference. The programmer I/O 240 can be, for example, a USB interface, serial interface, parallel interface, or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 6-9D.

The transceiver 260 is a wireless transmitter and receiver for wirelessly communicating with a reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates, or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 2B:
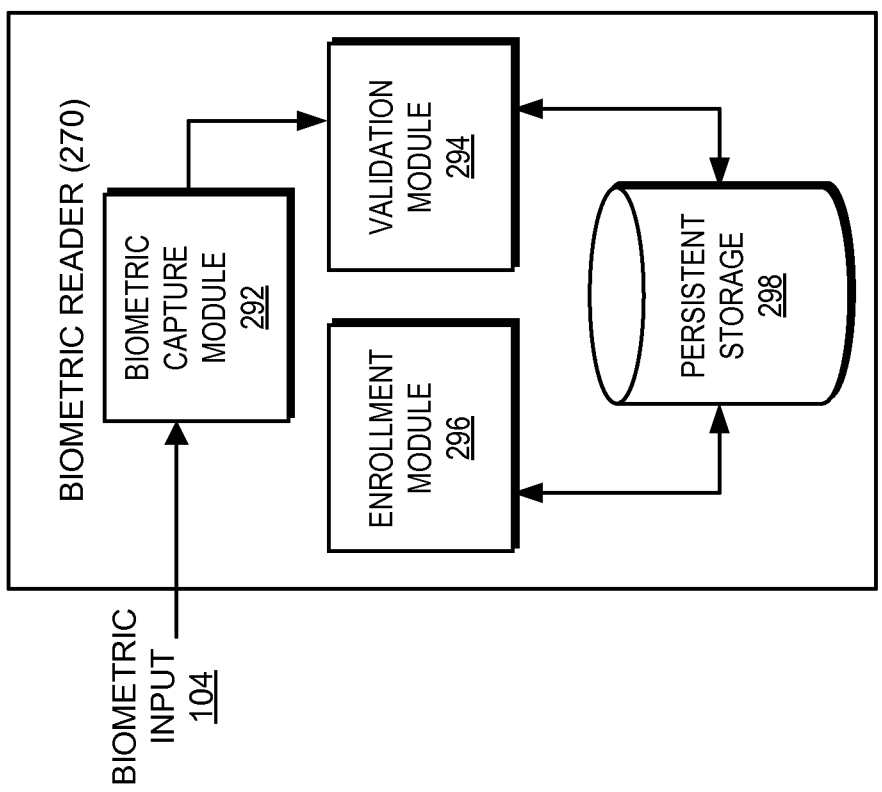
FIG. 2B is a block diagram illustrating a biometric reader of a PDK according to one embodiment of the invention.

FIG. 2B is a block diagram illustrating a biometric reader 270 of a PDK 102 according to one embodiment of the invention. The biometric reader 270 includes a biometric capture module 292, a validation module 294, an enrollment module 296 and persistent storage 298. In one embodiment, the enrollment module 296 registers a user with a PDK 102 by persistently storing biometric data associated with the user. Further, enrollment module 296 registers PDK 102 with a trusted authority by providing the code (e.g., device ID) to the trusted authority. Or conversely, the trusted authority can provide the code to PDK 102 to be stored therein.

The biometric capture module 292 comprises a scan pad to capture scan data from a user's fingerprint (e.g., a digital or analog representation of the fingerprint). Other embodiments of the biometric capture module 292 includes retinal scanners, iris scanners, facial scanner, palm scanners, DNA/RNA analyzers, signature analyzers, cameras, microphones, and voice analyzers to capture other identifying biometric data. Using the biometric data, validation module 294 determines whether the user's fingerprint, or other biometric data, matches the stored biometric data from enrollment. Conventional techniques for comparing fingerprints can be used. For example, the unique pattern of ridges and valleys of the fingerprints can be compared. A statistical model can be used to determine comparison results. Validation module 294 can send comparison results to control logic 250 of the PDK 102.

In other embodiments, validation module 294 is configured to capture biometric data for other human characteristics. For example, a digital image of a retina, iris, and/or handwriting sample can be captured. In another example, a microphone captures a voice sample.

Persistent storage 298 persistently stores biometric data from one or more users which can be provided according to specific implementations. In one embodiment, at least some of persistent storage 298 is a memory element that can be written to once but cannot subsequently be altered. Persistent storage 298 can include, for example, a ROM element, a flash memory element, or any other type of non-volatile storage element. Persistent storage 298 is itself, and stores data in, a tamper-proof format to prevent any changes to the stored data. Tamper-proofing increases reliability of authentication because it does not allow any changes to biometric data (i.e., allows reads of stored data, but not writes to store new data or modify existing data). Furthermore, data can be stored in an encrypted form.

In one embodiment, persistent storage 298 also stores the code that is provided by the PDK 102 responsive to successful verification of the user. Further, in some embodiments persistent storage 298 stores other data utilized during the operation of PDK 102. For example, persistent storage 298 can store encryption/decryption keys utilized to establish secure communications links.

An example embodiment of PDK with a biometric reader is described in U.S. patent application Ser. No. 11/314,199 (Attorney Docket No. 25000-11062) to John Giobbi, et al., entitled "Biometric Personal Data Key (PDK) Authentication", the entire contents of which are incorporated herein by reference.

Figure 3:
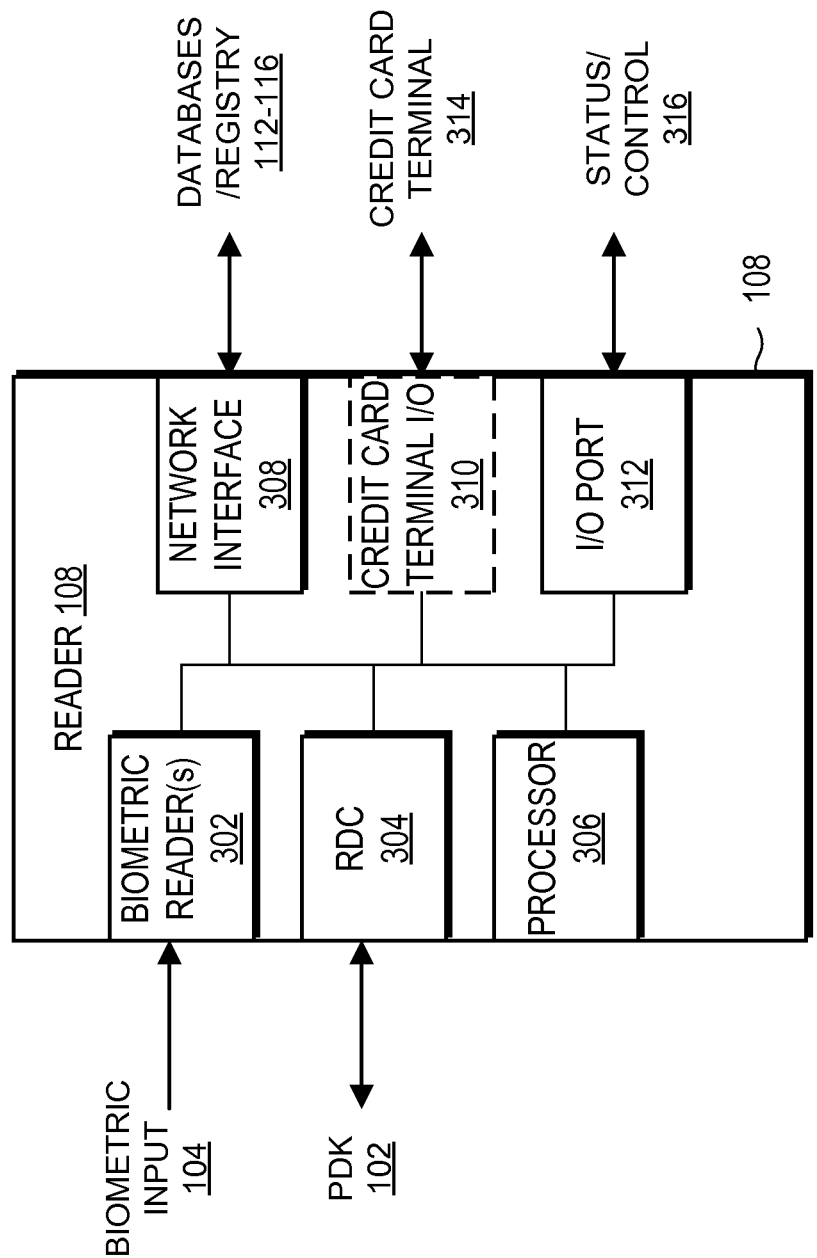
FIG. 3 is a block diagram illustrating a reader according to one embodiment of the invention.

Turning now to FIG. 3, an example embodiment of a Reader 108 is illustrated. The embodiment includes one or more biometric readers 302, a receiver-decoder circuit (RDC) 304, a processor 306, a network interface 308, an I/O port 312 and optionally a credit card terminal I/O 310. In alternative embodiments, different or additional modules can be included in the Reader 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones, and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 6-9D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306, and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

In one embodiment, a Reader 108 is adapted to detect and prevent fraudulent use of PDKs that are lost, stolen, revoked, expired or otherwise invalid. For example, the Reader 108 can download lists of invalid PDKs 102 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDKs. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send beacon signals indicating that the PDK 102 is a stolen device. Here, a stolen PDK 102 can be tracked, located and recovered by monitoring the beacon signals. In one embodiment, the Reader 108 stores biometric or other identifying information from an individual that attempts to fraudulently use a PDK 102 so that the individual's identity can be determined.

Generally, the Reader 108 is configured to implement at least one type of authentication prior to enabling a transaction. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is required to initiate the transaction. For example, a Reader 108 may be configured to use only device authentication for low cost purchases under a predefined amount (e.g., $25). The configuration is also useful in other types of low risk transactions where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4A:
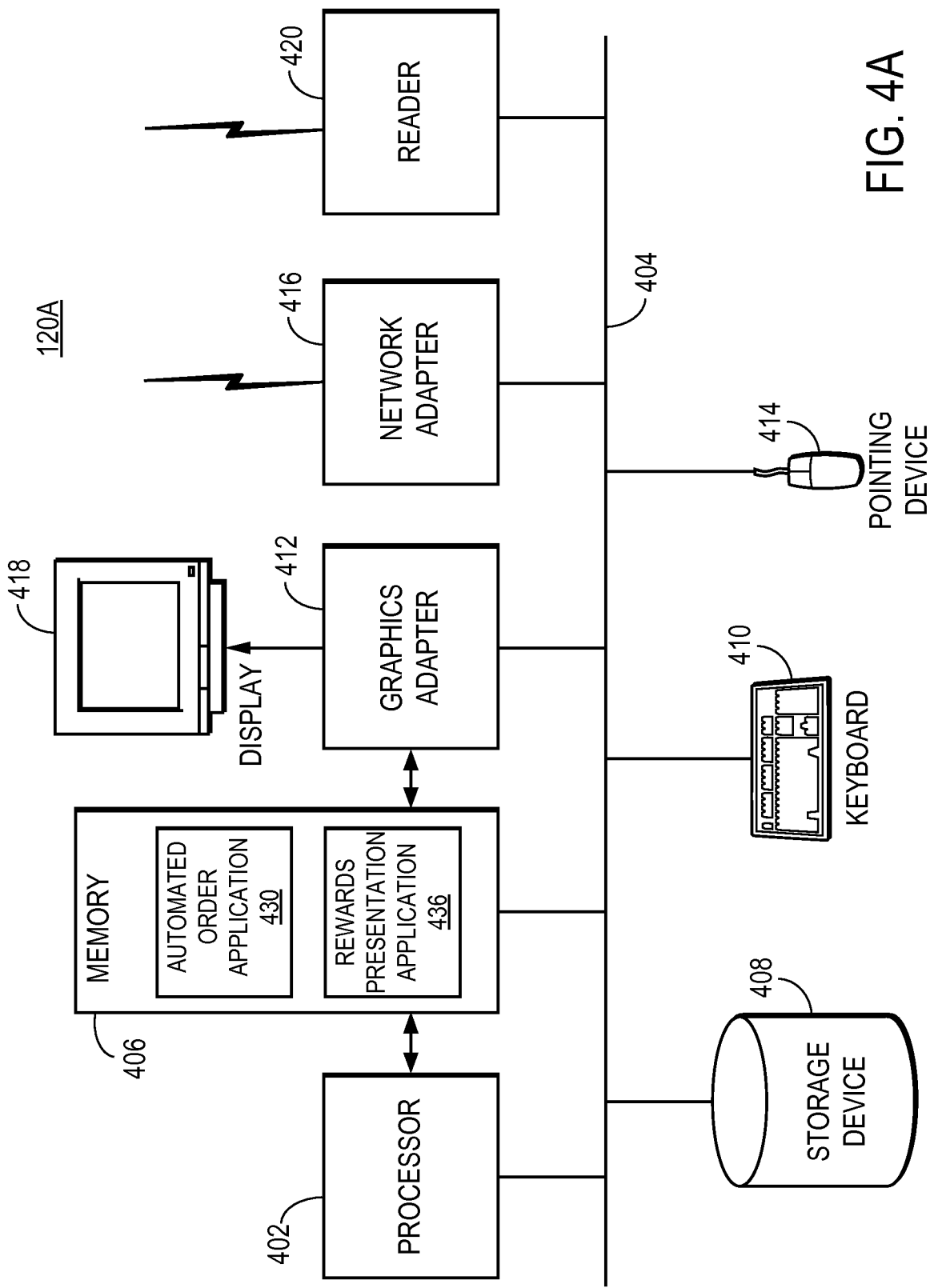
FIG. 4A is a block diagram illustrating a customer interface device according to one embodiment of the invention.

FIG. 4A is a block diagram illustrating a customer interface device 120A according to one embodiment of the invention. In one embodiment, the customer interface device 120A is a personal computer. In another embodiment, the customer interface device 120A is a smart phone or other mobile computing and communication device. Illustrated are at least one processor 402 coupled to a bus 404. Also coupled to the bus 404 are a memory 406, a storage device 408, a keyboard 410, a graphics adapter 412, a pointing device 414, a network adapter 416 and a reader 420. In one embodiment, the functionality of the bus 404 is provided by an interconnecting chipset. A display 418 is coupled to the graphics adapter 412. In one embodiment, the display 418 is a touch screen display adapted to receive inputs via the screen of the display 418.

The memory 406 includes an automated order application 430 and a rewards presentation application 436. In one embodiment, the automated order application 430 enables the customer interface device 120A to communicate with the transactions server 140. In another embodiment, the automated order application 430 processes information and data received from the readers 420 and various modules and servers of the transactions server 140. The rewards presentation application 436 is adapted to communicate with the rewards processing module 1412 of the transactions server 140 to display the status of the customer's rewards on the display 418 of the customer interface device 120A. More details describing the functionality of these applications 430, 436 is provided below with reference to FIGS. 18 and 19.

The storage device 408 is any device capable of holding data, like a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the customer interface device 120A. The graphics adapter 412 displays images and other information on the display 418. The network adapter 416 couples the customer interface device 120A to a local or wide area network.

As is known in the art, a customer interface device 120A can have different and/or other components than those shown in FIG. 4. In addition, the customer interface device 120A can lack certain illustrated components. In one embodiment, a customer interface device 120A lacks a keyboard 410, pointing device 414, graphics adapter 412, and/or display 418. Moreover, the storage device 408 can be local and/or remote from customer interface device 120A (such as embodied within a storage area network (SAN)). The reader 420 includes all or some of the same components as the Reader 108 as shown in FIG. 3.

As is known in the art, the customer interface device 120A is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

FIG. 4B is a block diagram illustrating a customer interface device 120B according to another embodiment of the invention. As shown in FIG. 4B, the customer interface device 120B of FIG. 4B includes all or some of the same components as the customer interface device 120B of FIG. 4A. However, memory 406 of the customer interface device 120A of FIG. 4B includes additional applications for order entry, order processing and payment processing.

The memory 406 in FIG. 4B includes an automated order application 430, an order processing application 432 and a payment processing application 434. The applications 430, 432, 434 enable the customer interface device 120B to communicate with the modules 1406, 1408, 1412 of the transactions server 140 and the validation database 112 and registries 114, 116a, 116b of the system 100. The applications 430, 432, 434 enable a customer to place their order and pay for their order in one transaction. The automated order application 430 allows a customer to initiate an order by simply possessing a PDK. In one embodiment, automated order application 430 allows a customer to initiate an order by simply possessing a PDK and providing a biometric sample. The order processing application 432 processes the customer's order by communicating with the order processing module 1406 and order completion module 1408. The payment processing application 434 allows a customer to pay for their order after entering the order by simply providing a biometric sample, such as a finger swipe, or some other form of authentication. The rewards presentation application 436 is adapted to communicate with the rewards processing module 1412 of the transactions server 140 to display the status of the customer's rewards on the display 418 of the customer interface device 120B. More details describing the functionality of this application 430 is provided below with reference to FIGS. 18 and 19.

Figure 4C:
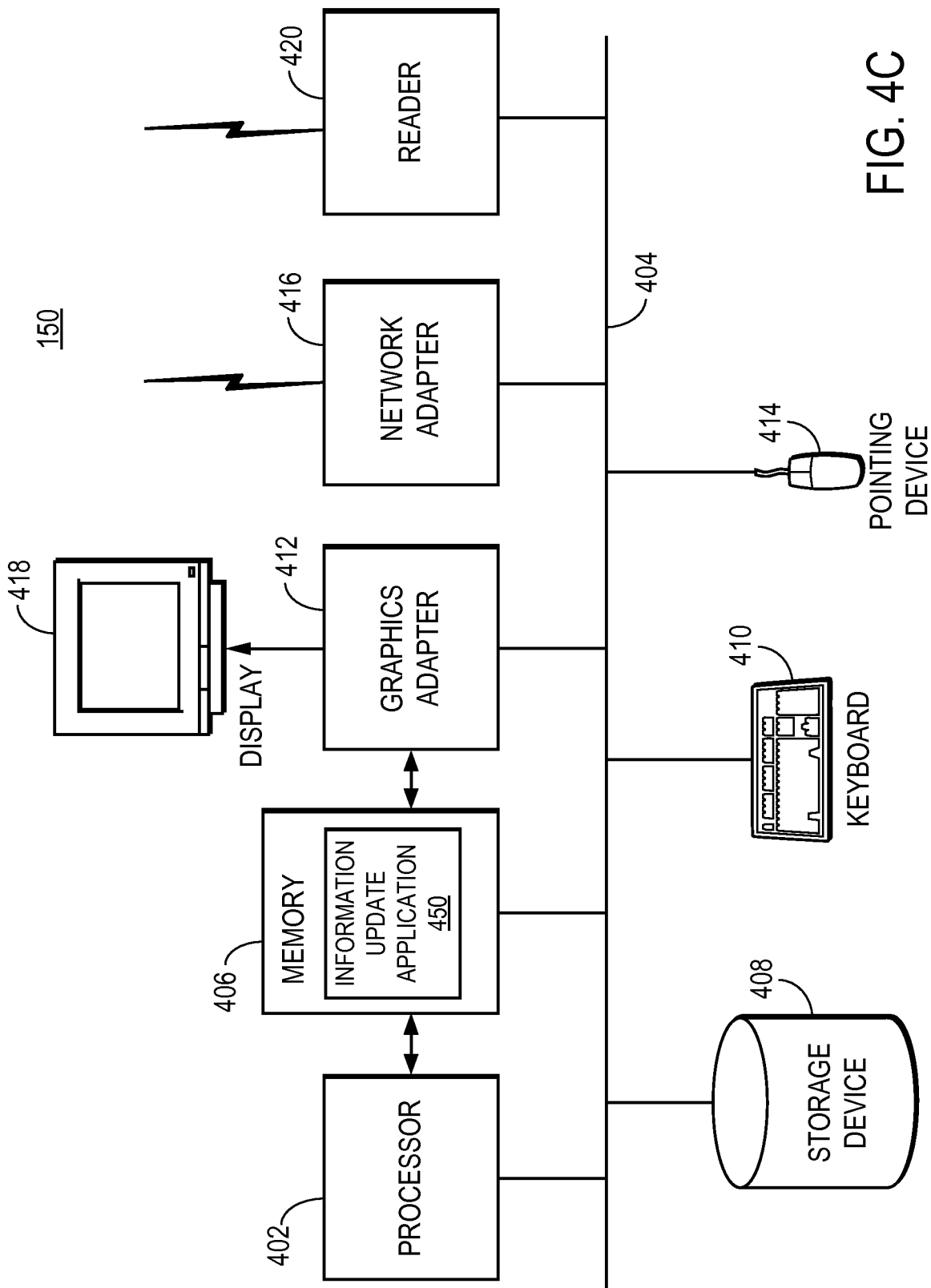
FIG. 4C is a block diagram illustrating a customer interface device according to yet another embodiment of the invention.

FIG. 4C is a block diagram illustrating a customer interface device 150 according to yet another embodiment of the invention. As shown in FIG. 4C, the customer interface device 150 of FIG. 4C includes all or some of the same components as the customer interface devices 120A of FIG. 4A and 120B of FIG. 4B. However, memory 406 of the customer interface device 150 of FIG. 4C includes an application for initializing and updating customer data.

As shown in FIG. 4C, customer interface device 150 includes an information update application 450. The information update application 450 enables the customer interface device 150 to communicate with the transactions server 140 via the network 110. Specifically, the information update application 450 enables the customer interface device 150 to communicate with the PDK initialization module 1402 and customer database 1410 of the transactions server 140. The information update application 450 allows a customer to initialize a PDK by entering their identifying information, including payment information, via the customer interface device 150. The information update application 450 also allows a customer to update information, including payment information, on the customer's PDK. More details describing the functionality of the customer interface device 150 is provided below with reference to FIG. 16.

Figure 5A:
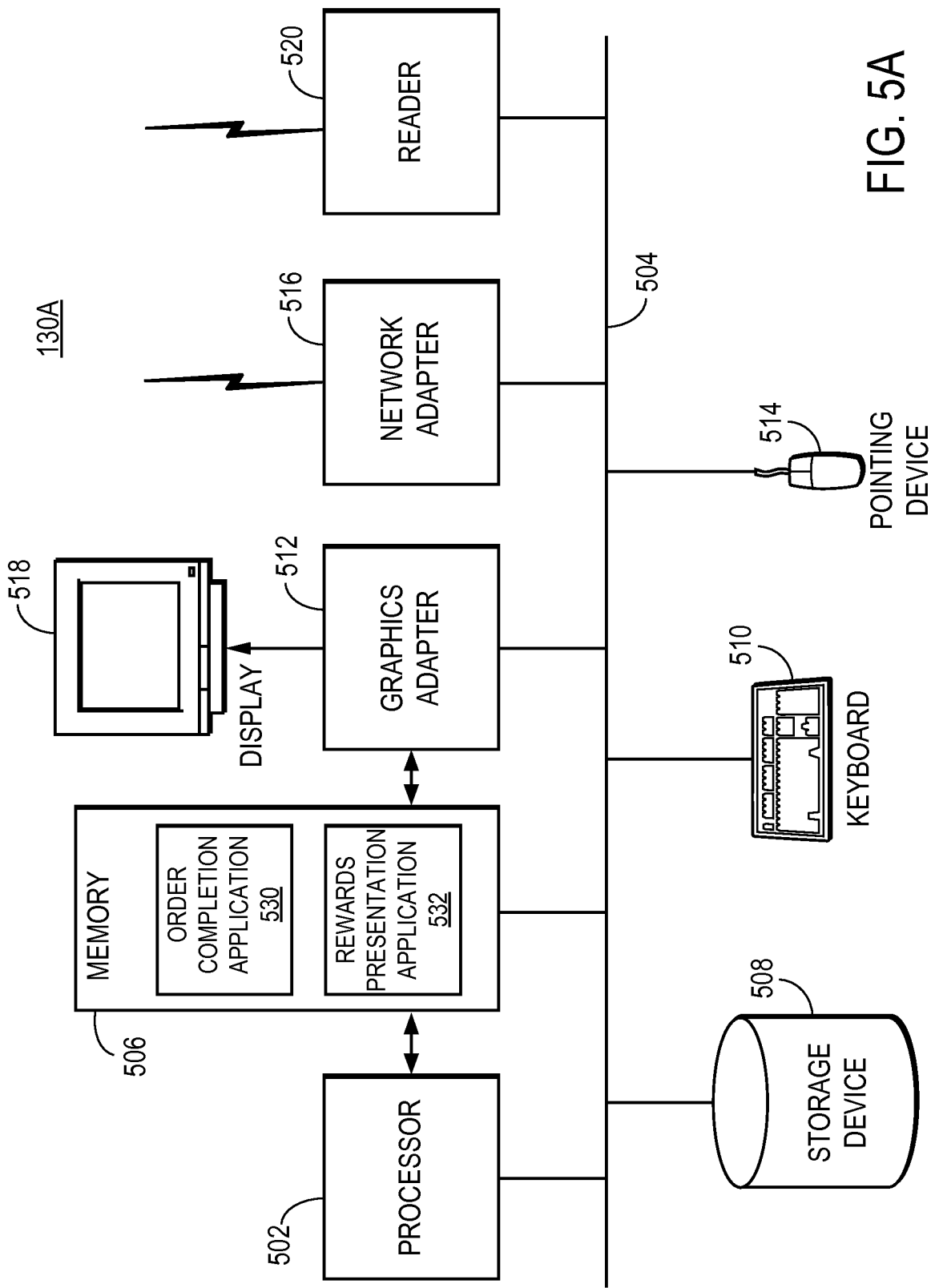
FIG. 5A is a block diagram illustrating a merchant interface device according to one embodiment of the invention.

FIG. 5A is a block diagram illustrating a merchant interface device 130A according to one embodiment of the invention. In one embodiment, the merchant interface device 130A is a personal computer. In another embodiment, the merchant interface device 130A is a smart phone or other mobile computing and communication device. Illustrated are at least one processor 502 coupled to a bus 504. Also coupled to the bus 504 are a memory 506, a storage device 508, a keyboard 510, a graphics adapter 512, a pointing device 514, a network adapter 516 and a reader 520. In one embodiment, the functionality of the bus 504 is provided by an interconnecting chipset. A display 518 is coupled to the graphics adapter 512. In one embodiment, the display 518 is a touch screen display adapted to receive inputs via the screen of the display 518.

The memory 506 includes an order completion application 530 and a rewards presentation application 532. In one embodiment, the order completion application 530 enables the merchant interface device 130A to communicate with the transactions server 140. In another embodiment, the order completion application 530 processes information and data received from the readers 520 and various modules and servers transactions server 140. The rewards presentation application 532 is adapted to communicate with the rewards processing module 1412 of the transaction server 140 in order to present the status of a customer's rewards on the display 518 of the merchant interface device 130A. More details describing the functionality of these applications 530, 532 is provided below with reference to FIGS. 20 and 21.

The storage device 508 is any device capable of holding data, like a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the merchant interface device 130A. The graphics adapter 512 displays images and other information on the display 518. The network adapter 516 couples the merchant interface device 130A to a local or wide area network.

As is known in the art, a merchant interface device 130A can have different and/or other components than those shown in FIG. 5A. In addition, the merchant interface device 130A can lack certain illustrated components. In one embodiment, a merchant interface device 130A lacks a keyboard 510, pointing device 514, graphics adapter 512, and/or display 518. Moreover, the storage device 508 can be local and/or remote from merchant interface device 130A (such as embodied within a storage area network (SAN)). The reader 520 includes all or some of the same components as the Reader 108 as shown in FIG. 3.

As is known in the art, the merchant interface device 130A is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

FIG. 5B is a block diagram illustrating a merchant interface device 130B according to another embodiment of the invention. The merchant interface device 130B of FIG. 5B includes all or some of the same components as the merchant interface device 130A of FIG. 5A. However, memory 506 of the merchant interface device 130B includes different applications for order presentations.

As shown in FIG. 5B, memory 506 of merchant interface device 130B includes an order presentation application 550. The order presentation application 550 is adapted to communication with the order processing module 1406 and order completion module 1408 of the transaction server 140 to display customers' orders. In one embodiment, the order presentation application 550 displays a list of customers' order. In another embodiment, the order presentation application 550 displays the list of customers' orders in the order that they were entered. The order presentation application 550 allows a merchant to visually see the orders that need to be prepared. In one embodiment, the order presentation application 550 allows the merchant to select an order to prepare and delete that order once the order has been prepared. More details describing the functionality of this application 550 and this embodiment of the merchant interface device 130B is provided below with reference to FIGS. 20 and 21B.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 6:
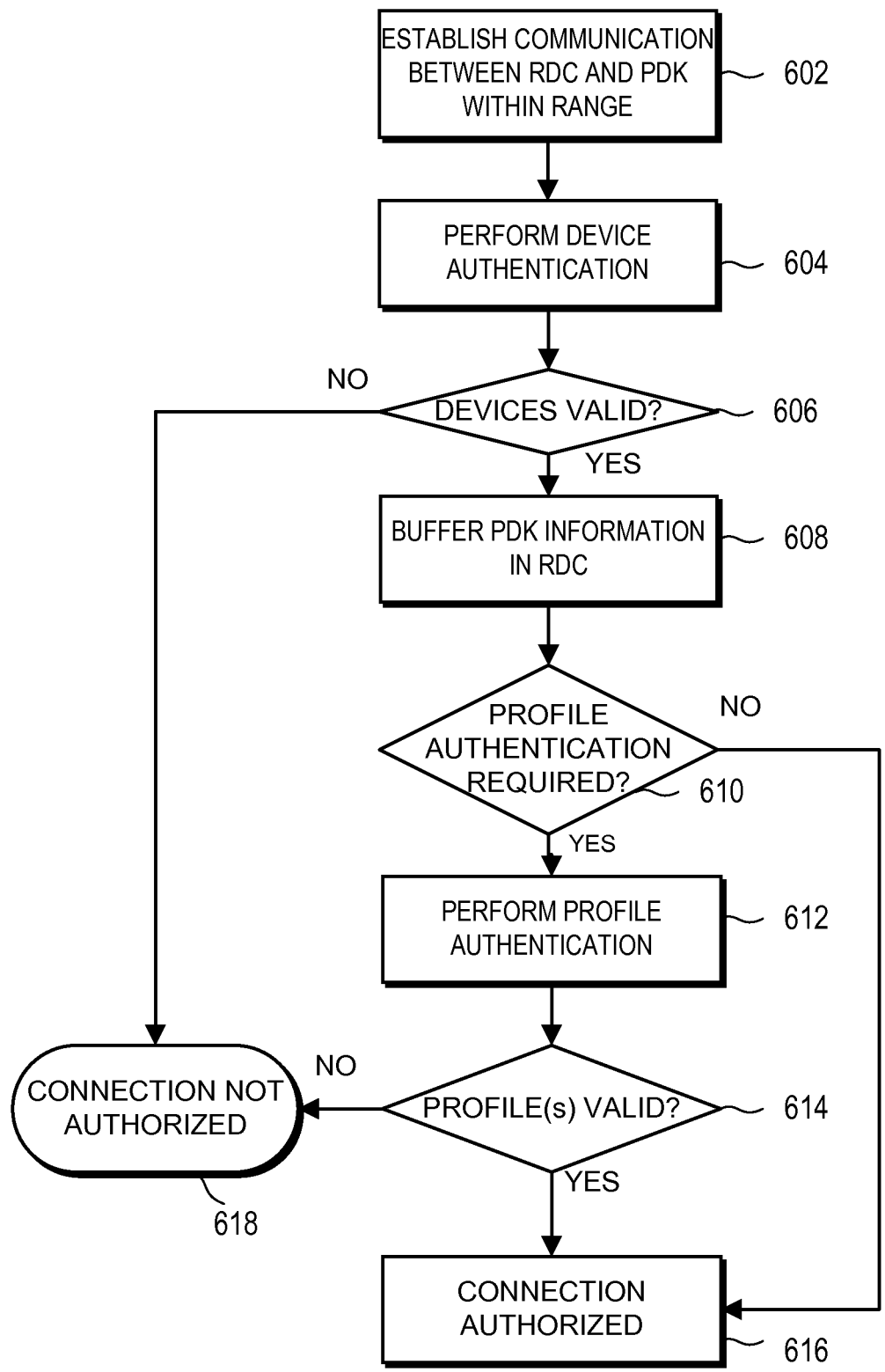
FIG. 6 is a flowchart illustrating one embodiment of a process for authorizing a communication connection using secure authentication.

FIG. 6 is a flowchart illustrating one embodiment of a process for authorizing a communication connection using secure authentication. When a PDK 102 comes within range of a Reader 108, communication is automatically established 602 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 604, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 7:
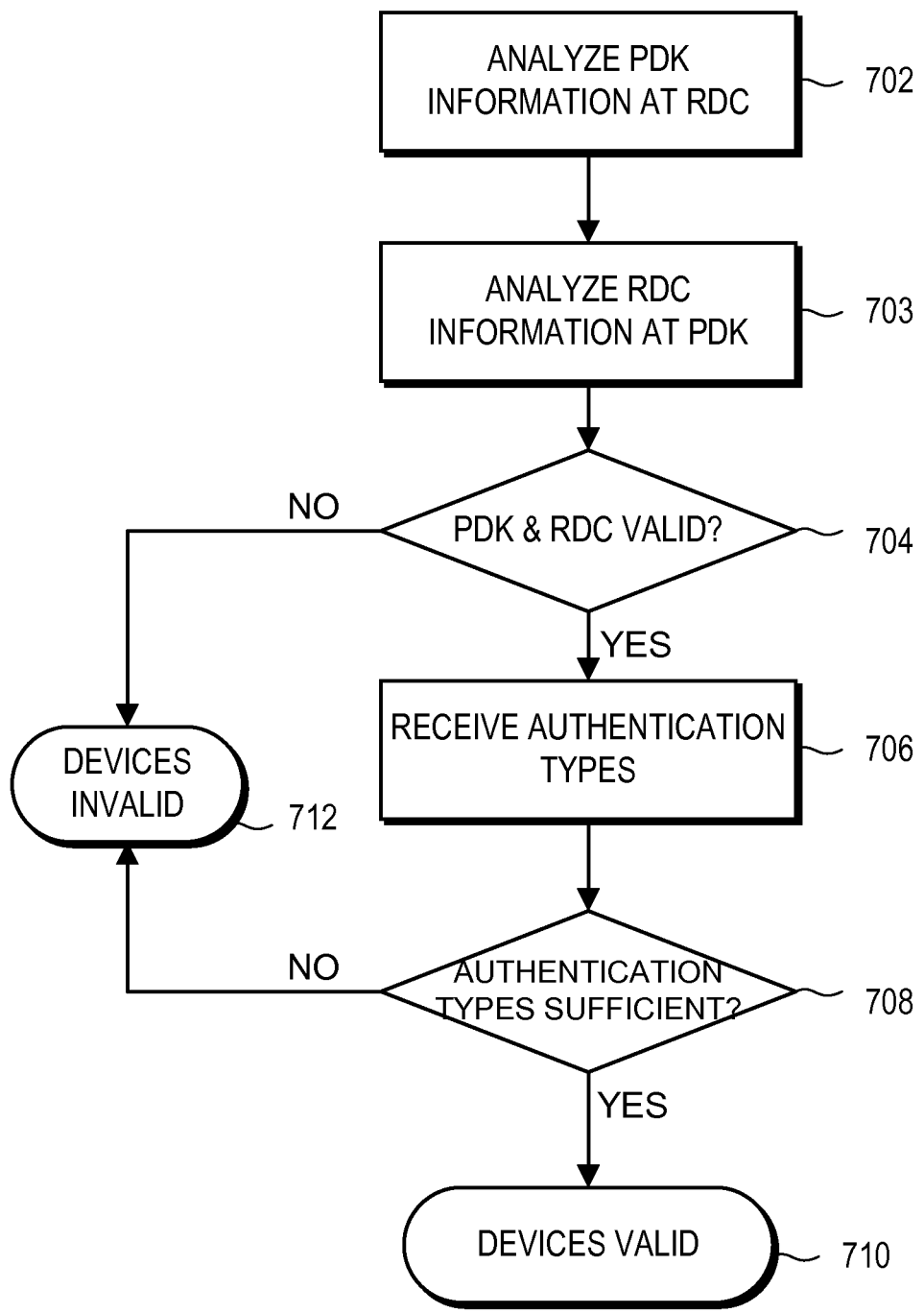
FIG. 7 is a flowchart illustrating one embodiment of a process for device authentication by a reader.

An example embodiment of a method for performing 604 device authentication is illustrated in FIG. 7. The RDC 304 receives and analyzes 702 information from the PDK 102; and the PDK 102 receives and analyzes 702 information received from the RDC 304. Generally, this initial information is transmitted over a public communication channel in an unencrypted format. Based on the received information, each device 102, 304 determines 704 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 712, the process ends. If both the PDK 102 and the RDC 304 are determined by the other to be valid, the Reader 108 requests and receives 706 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 708 whether the PDK 102 has one or more profiles sufficient for authentication. If the PDK 102 does not have one or more profiles sufficient for authentication with the Reader 108, the devices 102, 304 are determined to be invalid 712 because they cannot be used with each other. If the PDK 102 does have one or more sufficient types of profiles, the devices are valid 710.

Turning back to FIG. 6, if either the PDK 102 or RDC 304 is not found valid during device authentication 604, the transaction is not authorized 618 and the process ends. If the devices are valid, the RDC 304 temporarily buffers 608 the received PDK information. It is noted that in one embodiment, steps 602-608 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 610 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 612 as will be described below with references to FIGS. 8-9D. If a required profile is determined 614 to be valid, the Reader 108 completes 616 the transaction. Otherwise, the Reader 108 indicates that the transaction is not authorized 618. In one embodiment, completing 616 the transaction includes enabling access to secure physical or digital assets (e.g., unlocking a door, opening a vault, providing access to a secured hard drive, etc.). In another embodiment, completing 416 the transaction includes charging a credit card for a purchase. Alternatively, bank information, debit/check/ATM card information, coupon codes, or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 8:
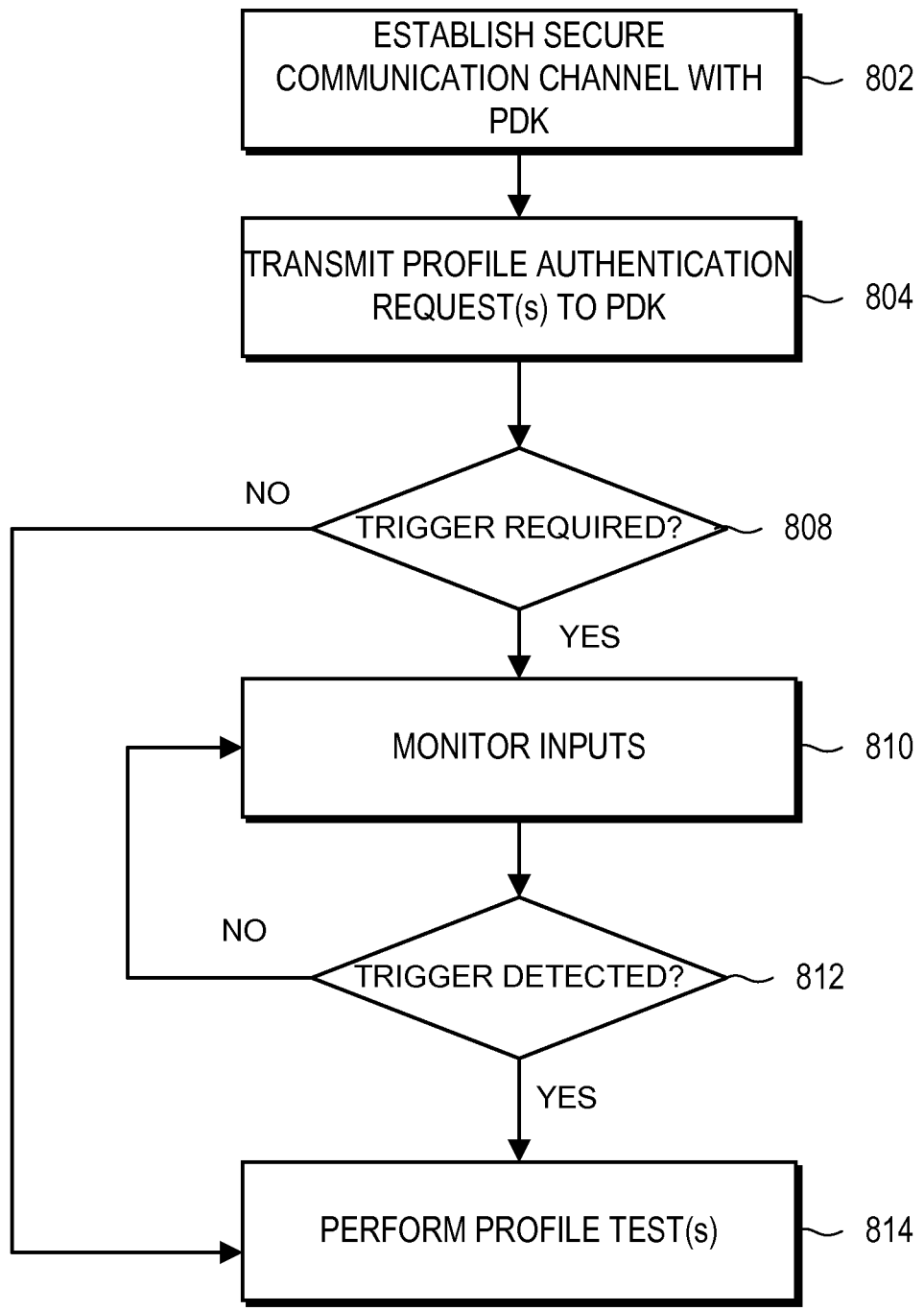
FIG. 8 is a flowchart illustrating one embodiment of a process for profile authentication by a reader.

Turning now to FIG. 8, an embodiment of a process for profile authentication is illustrated. In step 802, a secure communication channel is established between the RDC 304 and the PDK 102. Information sent and received over the secure channel is in an encrypted format that cannot be practically decoded, retransmitted, reused, or replayed to achieve valid responses by an eavesdropping device. The Reader 108 transmits 804 profile authentication requests to the PDK 102 requesting transmission of one or more stored profiles over the secure channel. At 808, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample, or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert, or a movie). When a PDK owner walks through the entrance, the Reader 108 detects the PDK 102 within range, authenticates the user, and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room, or accessing secure facilities or other assets. Thus, if no trigger is required, the process next performs 814 the requested profile authentication tests.

If a trigger is required, the Reader monitors 810 its inputs (e.g., a biometric reader, key pad, etc.) and checks for the detection 812 of a trigger. If the required trigger is detected, the process continues to perform 814 one or more profile authentication test. FIGS. 9A-9D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 9B:
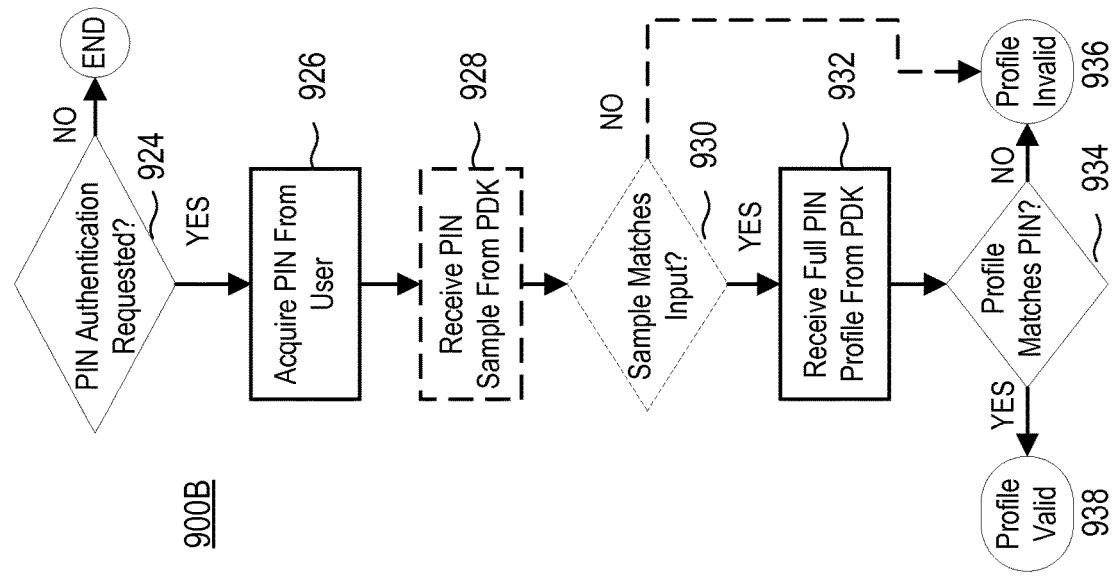
FIG. 9B is a flowchart illustrating one embodiment of a process for profile testing using a personal identification number.
Figure 9A:
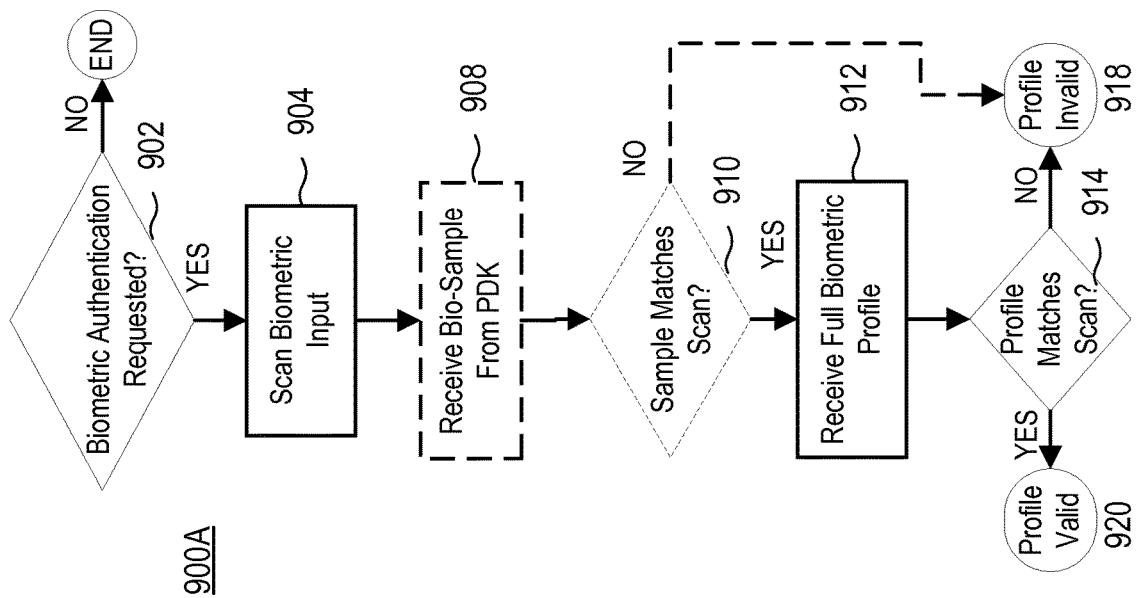
FIG. 9A is a flowchart illustrating one embodiment of a process for profile testing using a biometric input.

Referring first to FIG. 9A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 902 biometric authentication is requested, the Reader 108 scans 904 the biometric input 104 supplied by the user. In one embodiment, scanning 904 includes computing a mathematical representation or hash of the biometric input 104 that can be directly compared to the biometric profile.

Furthermore, in one embodiment, scanning 904 also includes obtaining a biometric input sample from the biometric input according to the same function used to compute the biometric profile sample stored in the PDK 102. Optionally, the Reader 108 receives 908 a biometric profile sample from the PDK 102 and determines 910 if the biometric profile sample matches the biometric input sample. If the biometric profile sample does not match the input sample computed from the scan, the profile is determined to be invalid 918. If the biometric profile sample matches, the full biometric profile 912 is received from the PDK 102 to determine 914 if the full biometric profile 912 matches the complete biometric input 104. If the profile 912 matches the scan, the profile 912 is determined to be valid 920, otherwise the profile 912 is invalid 918. It is noted that in one embodiment, steps 908 and 910 are skipped and only a full comparison is performed.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 904 using a biometric reader built into the PDK 102. Furthermore, in one embodiment, the steps of computing the mathematical representation or hash of the biometric input 104 and/or the steps of comparing the biometric input 104 to the biometric profile can be performed by the PDK 102, by the Reader 108, by an external system coupled to the Reader 108, or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108, and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 9B illustrates a process for PIN authentication. If PIN authentication is requested 924, a PIN is acquired 926 from the user through a keypad, mouse, touch screen or other input mechanism. Optionally, the Reader 108 receives 928 a PIN sample from the PDK 102 comprising a subset of data from the full PIN. For example, the PIN sample can comprise the first and last digits of the PIN. If the Reader 108 determines 930 that the PIN sample does not match the input, the profile is immediately determined to be invalid 936. If the PIN sample matches, the full PIN profile is received 932 from the PDK and compared to the input. If the Reader 108 determines 934 that the profile matches the input, the profile is determined to be valid and is otherwise invalid 936. It is noted that in one embodiment, steps 928 and 930 are skipped.

Figure 9D:
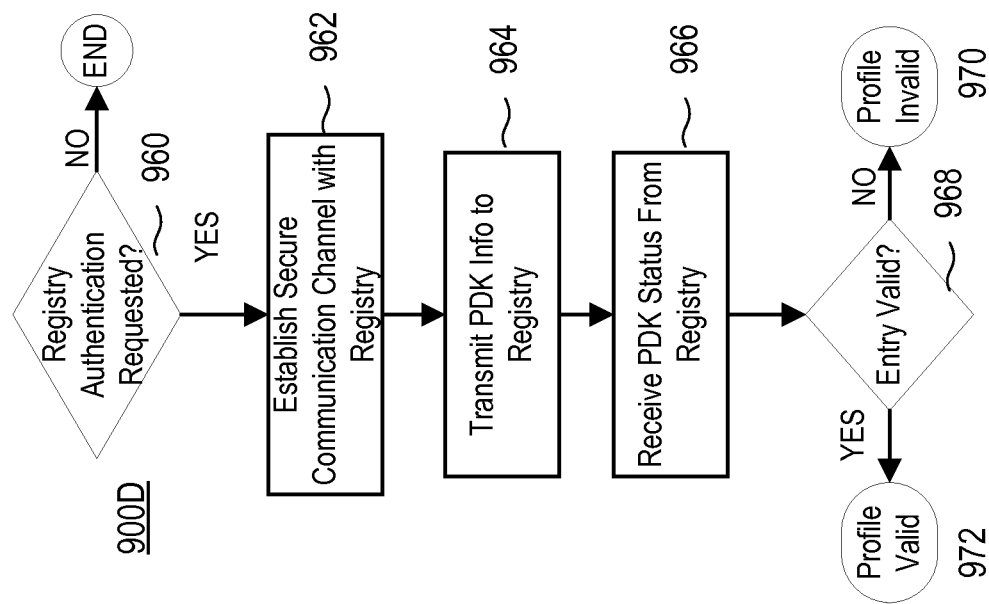
FIG. 9D is a flowchart illustrating one embodiment of a process for profile testing using a private or central registry.
Figure 9C:
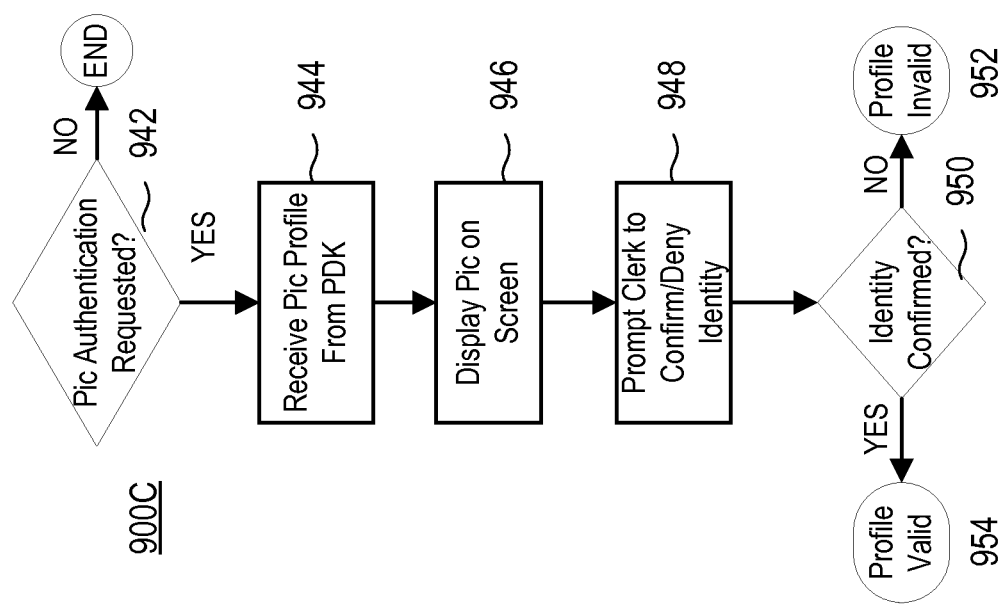
FIG. 9C is a flowchart illustrating one embodiment of a process for profile testing using a picture profile.

FIG. 9C illustrates a process for a picture authentication. If the Reader 108 determines 924 that picture authentication is requested, a picture profile is received 944 from the PDK 102 by the Reader 108 and displayed 946 on a screen. An administrator (e.g., a clerk, security guard, etc.) is prompted 948 to compare the displayed picture to the individual and confirms or denies if the identities match. If the administrator confirms that the identities match, the picture profile is determined to be valid 964 and is otherwise invalid 952. In an alternative embodiment, the process is automated and the administrator input is replaced with a process similar to that described above with reference to FIG. 9A. Here, an image of the user is captured and face recognition is performed by comparing picture profile information received from the PDK 102 to the captured image.

FIG. 9D illustrates a process for authentication with a private registry 114 or the Central Registry 116. If the Reader 108 determines that registry authentication is requested, a secure communication channel is established 962 over the network 110 between the Reader 108 and one or more registries (e.g., the Central Registry 114, any private registry 116, or other validation database 112). If any additional information is needed to process the registry authentication (e.g., a credit card number), the Reader 108 requests and receives the additional information from the PDK 102. Identification information is transmitted 964 from the Reader 108 to the registry 114-116 through the network interface 308. The PDK status is received 966 from the registry to determine 968 if the status is valid 972 or invalid 970. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 10:
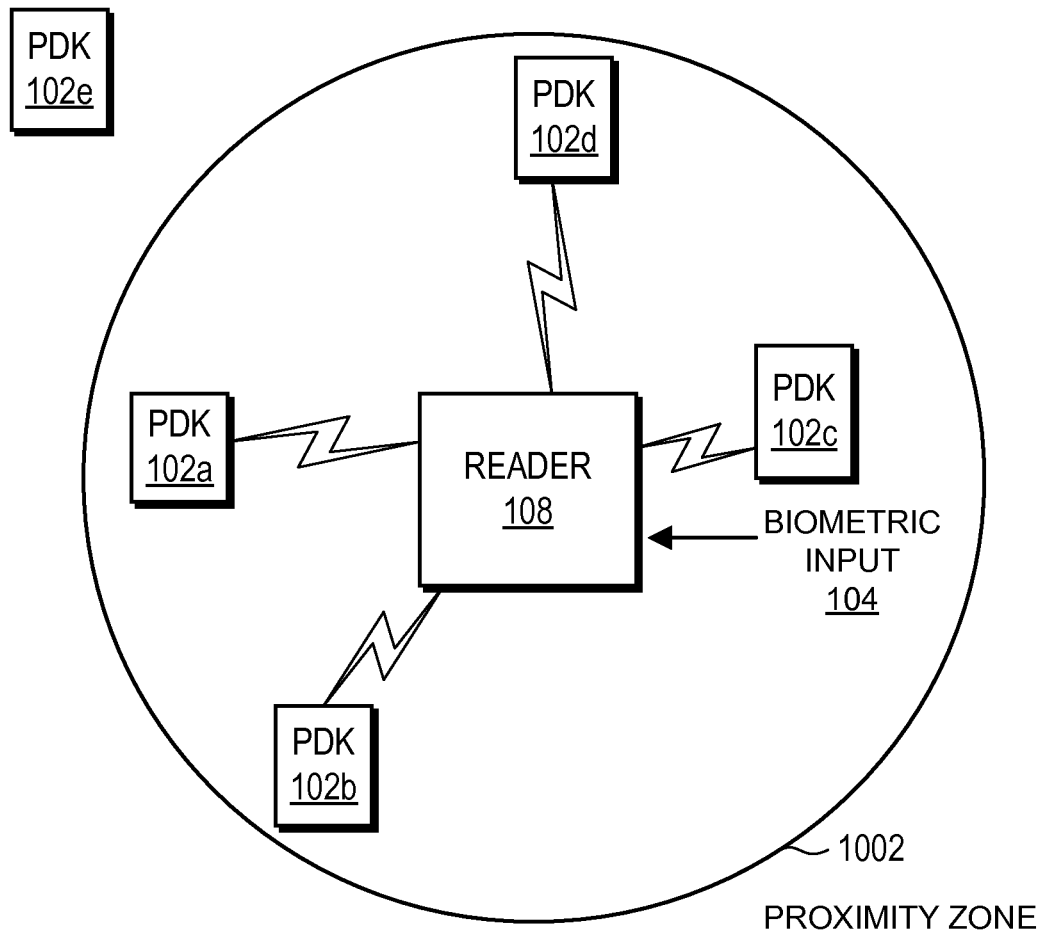
FIG. 10 illustrates an example scenario of a reader operating in a congested area with multiple PDKs within its proximity zone.

FIG. 10 illustrates an example scenario of a reader operating in a congested area with multiple PDKs within its proximity zone. In this figure, a scenario is illustrated where multiple PDKs 102a-e are present near a Reader 108. This scenario is common when a Reader 108 is located in a high occupancy area such as, for example, a hospital lobby or waiting area. Here, the Reader 108 can communicate with PDKs 102a-d within the proximity zone 1002 and does not communicate with PDKs 102e-f outside the proximity zone 1002. In one embodiment, the Reader 108 receives the unique PDK ID from a PDK 102 when it enters the proximity zone 1002 and records its time of arrival. In one embodiment, the Reader 108 further initiates a device authentication of the PDK 102 after a predefined period of time (e.g., 5 seconds) that the PDK 102 is within the proximity zone 1002. For profile authentication, the Reader 108 automatically determines which PDK 102 should be associated with an authentication test and the transaction. For example, if the Reader 108 receives a biometric input 102 from an individual, the Reader 108 automatically determines which PDK 102a-d is associated with the individual supplying the biometric input 122. In another embodiment, a different trigger is detected (e.g., a PIN input) to initiate the differentiation decision. In yet another embodiment, the differentiation decision is initiated without any trigger. It is noted that in some embodiments, where no trigger is required (such as a registry authentication), no differentiation decision is made and authentications are instead performed for each PDK 102 within the proximity zone 1002.

Figure 11:
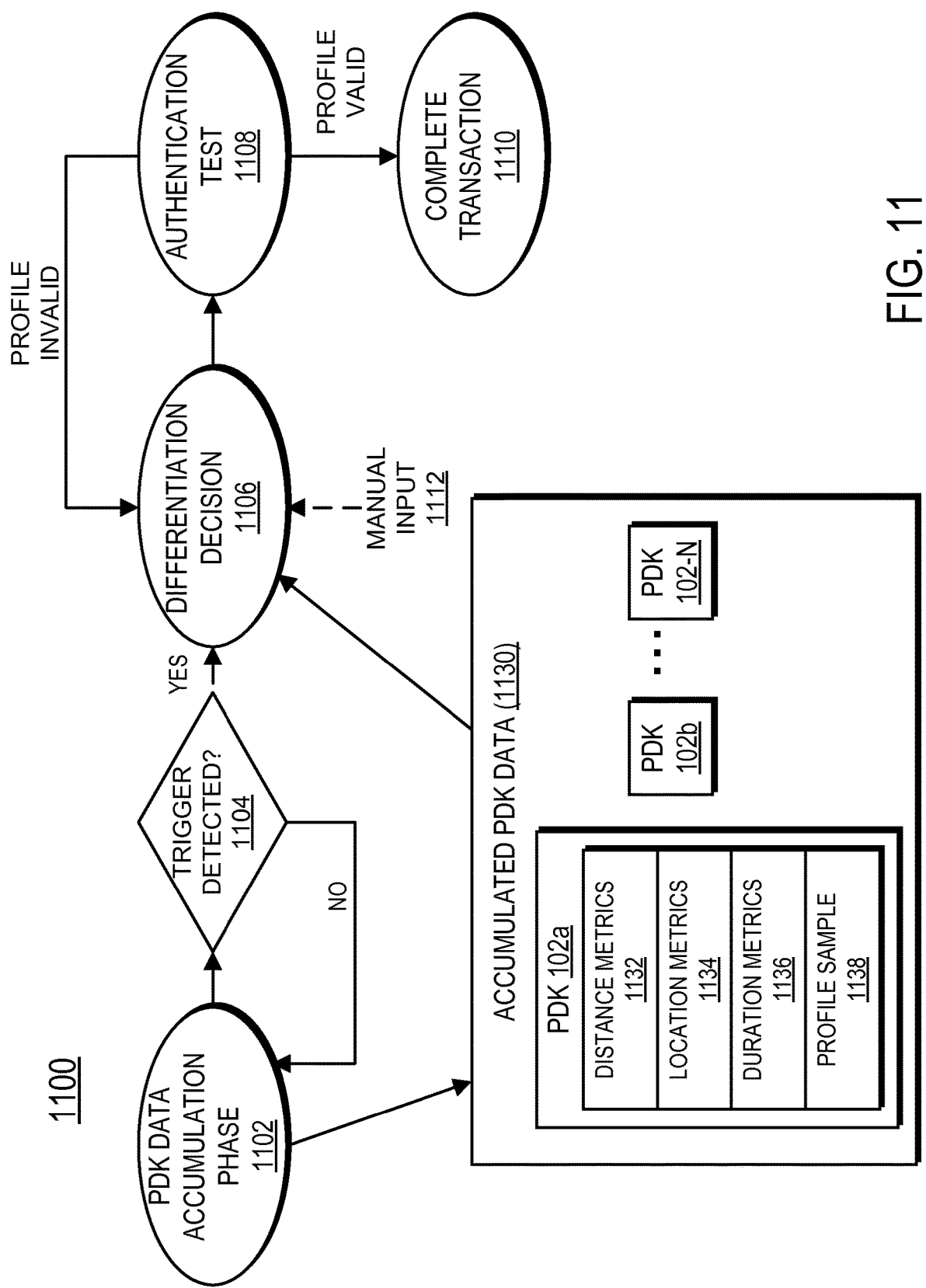
FIG. 11 is a flowchart illustrating one embodiment of a process for differentiating between multiple PDKs in completing a secure authentication process.

FIG. 11 illustrates an embodiment of an authentication process 1100 for the scenario where multiple PDKs 102 are present within the proximity zone 1002 of the Reader 108. In a PDK data accumulation phase 1102, PDK data 1130 is accumulated and buffered in the Reader 108 for any valid PDKs 102 that enter the proximity zone 1002. In one embodiment, the accumulation phase 1102 begins for a PDK 102 after it has been within the proximity zone 1002 for a predetermined period of time. In one embodiment, the PDK data accumulation phase 1102 is similar to the steps 802-808 described above in detail with reference to FIG. 8 for each PDK 102a-d in the proximity zone 1002.

As illustrated, the accumulated PDK data 1130 includes one or more differentiation metrics from each valid PDK 102 within range of the Reader 108. The differentiation metrics can include any information that can be used by the Reader 108 to determine which PDK 102 should be associated with the authentication and/or transaction request. According to various embodiments, differentiation metrics can include one or more of distance metrics 1132, location metrics 1134 and duration metrics 1136.

In one embodiment, a distance metric 1132 indicates the relative distance of a PDK 102 to the Reader 108. This information is useful given that a PDK 102 having the shortest distance to the Reader 108 is generally more likely to be associated with a received authentication trigger (e.g., a biometric input, a PIN input or a transaction request). The distance metrics 1132 can include, for example, bit error rates, packet error rates and/or signal strength of the PDKs 102. These communication measurements can be obtained using a number of conventional techniques that will be apparent to those of ordinary skill in the art. Generally, lower error rates and high signal strength indicate the PDK 102 is closer to the Reader 108.

Location metrics 1134 can be used to determine a location of a PDK 102 and to track movement of a PDK 102 throughout an area. This information can be useful in determining the intent of the PDK holder to execute a transaction. For example, a PDK holder that moves in a direct path towards a cashier and then stops in the vicinity of the cashier is likely ready to make a purchase (or may be waiting in line to make a purchase). On the other hand, if the PDK moves back and forth from the vicinity of a cashier, that PDK holder is likely to be browsing and not ready to make a purchase. Examples of systems for determining location metrics are described in more detail below with reference to FIGS. 14-15.

The differentiation metrics can also include duration metrics 1136 that tracks the relative duration a PDK 102 remains within the proximity zone 1002. Generally, the PDK 102 with the longest time duration within the proximity zone 1002 is most likely to be associated with the authentication request. For example, if the Reader 108 is busy processing a purchasing transaction at a cashier and another PDK 102 has a long duration within the proximity zone 1002, it is likely that the user is waiting in line to make a purchase. In one embodiment, the Reader 108 tracks duration 1136 by starting a timer associated with a PDK 102 when the PDK 102 enters the proximity zone 1002 and resetting the time to zero when the PDK exists. As another example, the Reader 108 tracks the duration when a PDK of a doctor enters the proximity zone of a patient's room. A long duration of the doctor's PDK within the proximity zone can provide evidence that the doctor is spending an adequate amount of time examining the patient. On the other hand, a short duration of the doctor's PDK within the proximity zone can provide evidence that the doctor just merely stopped by and did not perform any thorough examination. This information is useful in monitoring patient treatment and provider performance to help ensure quality patient care.

In one embodiment, the Reader 108 can also receive and buffer profile samples 1138 prior to the start of a profile authentication instead of during the authentication process as described in FIG. 11A-11B. In one embodiment, the Reader 108 determines which types of biometric profile samples 1138 to request based on, for example, the configuration of the Reader 108, the type of transactions performed by the Reader 108, or manual requests from a clerk, security guard, etc. In one embodiment, the PDK 102 transmits one or more of the requested sample types based on profiles available in the PDK 102 and/or user preferences. In another embodiment, the PDK 102 transmits one or more samples 1138 it has available and only samples that match the authentication types configured for the Reader 108 are buffered. For example, if a Reader 108 is configured for fingerprint authentication, a PDK 102 may transmit samples 1138 for several different fingerprint profiles (each corresponding to a different finger, for example). It will be apparent to one of ordinary skill in the art that other variations are possible to provide flexibility in both the configuration of the Reader 108 for various types of authentication and flexibility for the PDK owner to determine which types of authentication to use.

Because profile samples 1138 only comprise a subset of the profile information, in one embodiment, the samples can be safely transmitted over a public channel without needing any encryption. In another embodiment, the profile samples 1138 are transmitted with at least some level of encryption. In yet another embodiment, some of the data is transmitted over a public communication channel and additional data is transmitted over a secure communication channel. In different configurations, other types of profile information can be accumulated in advance. For example, in one embodiment, a photograph from a picture profile can be obtained by the Reader 102 during the data accumulation phase 1102. By accumulating the profile sample 1138 or other additional information in advance, the Reader 108 can complete the authentication process more quickly because it does not wait to receive the information during authentication. This efficiency becomes increasingly important as the number of PDKs 102 within the proximity zone 1002 at the time of the transaction becomes larger.

The PDK accumulation phase 1102 continues until a trigger (e.g., detection of a biometric input) is detected 1104 to initiate a profile authentication process. If a biometric input is received, for example, the Reader 108 computes a mathematical representation or hash of the input that can be compared to a biometric profile and computes one or more input samples from the biometric input. It is noted that in alternative embodiments, the process can continue without any trigger. For example, in one embodiment, the transaction can be initiated when a PDK 102 reaches a predefined distance from the Reader 108 or when the PDK 102 remains within the proximity zone 1002 for a predetermined length of time.

The process then computes a differentiation decision 1106 to determine which PDK 102a-d should be associated with the authentication. In one embodiment, the Reader 108 computes a differentiation result for each PDK using one or more of the accumulated data fields 1130. For example, in one embodiment, the differentiation result is computed as a linear combination of weighted values representing one or more of the differentiation metrics. In another embodiment, a more complex function is used. The differentiation results of each PDK 102 are compared and a PDK 102 is selected that is most likely to be associated with the transaction.

In another embodiment, for example, in a photo authentication, the differentiation decision can be made manually by a clerk, security guard, or other administrator that provides a manual input 1112. In such an embodiment, a photograph from one or more PDKs 102 within the proximity zone 1002 can be presented to the clerk, security guard, or other administrator on a display and he/she can select which individual to associate with the transaction. In yet another configuration, the decision is made automatically by the Reader 108 but the clerk is given the option to override the decision.

An authentication test 1108 is initiated for the selected PDK 102. The authentication test 908 can include one or more of the processes illustrated in FIGS. 11A-11D. Note that if profile samples 1138 are acquired in advance, they need not be acquired again in the authentication steps of FIGS. 11A-11B. It is additionally noted that in one embodiment, the Reader 108 compares the profile samples 1138 of the PDKs 102 to the computed input sample until a match is found before performing a full profile comparison. In one embodiment, the Reader first compares samples from the selected PDK 102 until a match is found. For example, a Reader 108 may have accumulated multiple fingerprint profiles samples 1138 (e.g., corresponding to different fingers) for the selected PDK 102. The Reader 108 receives a fingerprint input from, for example, the left index finger, computes the input sample, and does a quick comparison against the accumulated samples 1138 for the selected PDK 102 to efficiently determine a matching profile. The Reader 108 then performs the full comparison using the matching profile. In an alternative embodiment, the Reader 108 performs a comparison of a first sample from each PDK 102 and if no match is found, performs comparisons of second samples from each PDK 102. It will be apparent to one of ordinary skill in the art that samples can be compared in a variety of other orders without departing from the scope of the invention.

If the authentication test 1108 indicates a valid profile, the transaction is completed 1110 for the matching PDK 102. If the authentication test 1108 determines the profile is invalid, a new differentiation decision 1106 is made to determine the next mostly likely PDK 102 to be associated with the transaction. The process repeats until a valid profile is found or all the PDKs 102 are determined to be invalid.

Figure 12:
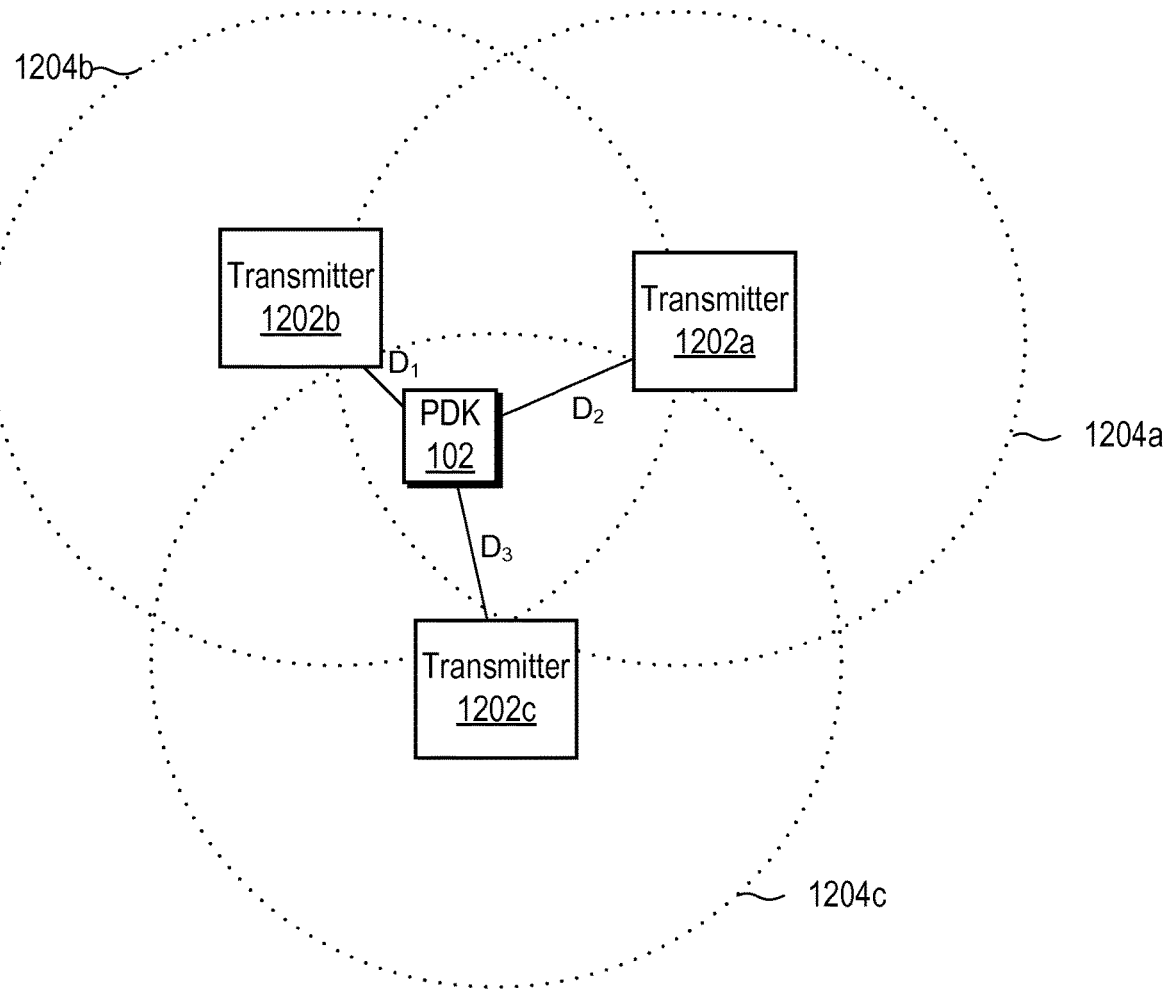
FIG. 12 is a block diagram illustrating an embodiment of a system for estimating location of a PDK using coordinate triangulation.

Turning now to FIG. 12, an example system is illustrated for determining a location metric 1134 of a PDK 102 using a coordinate triangulation technique. In one embodiment of coordinate triangulation, multiple transmitting devices (e.g., Readers 108a-c) are spaced throughout an area. In one embodiment, the Readers 108a-c are coupled by a network. Each Reader 108a-c has a range 1204 and the ranges 1204 overlap. Each Reader 108a-c determines a distance D1-D3 between the Reader108 and the PDK 102. Distance may be estimated, for example, by monitoring signal strength and/or bit error rate as previously described. Then using conventional trigonometry, an approximate location of the PDK 102 can be calculated from D1-D3. Although only three transmitters are illustrated, it will be apparent that any number of transmitters can be used to sufficiently cover a desired area. Location information can be computed at predetermined time intervals to track the movement of PDKs throughout a facility.

Figure 13:
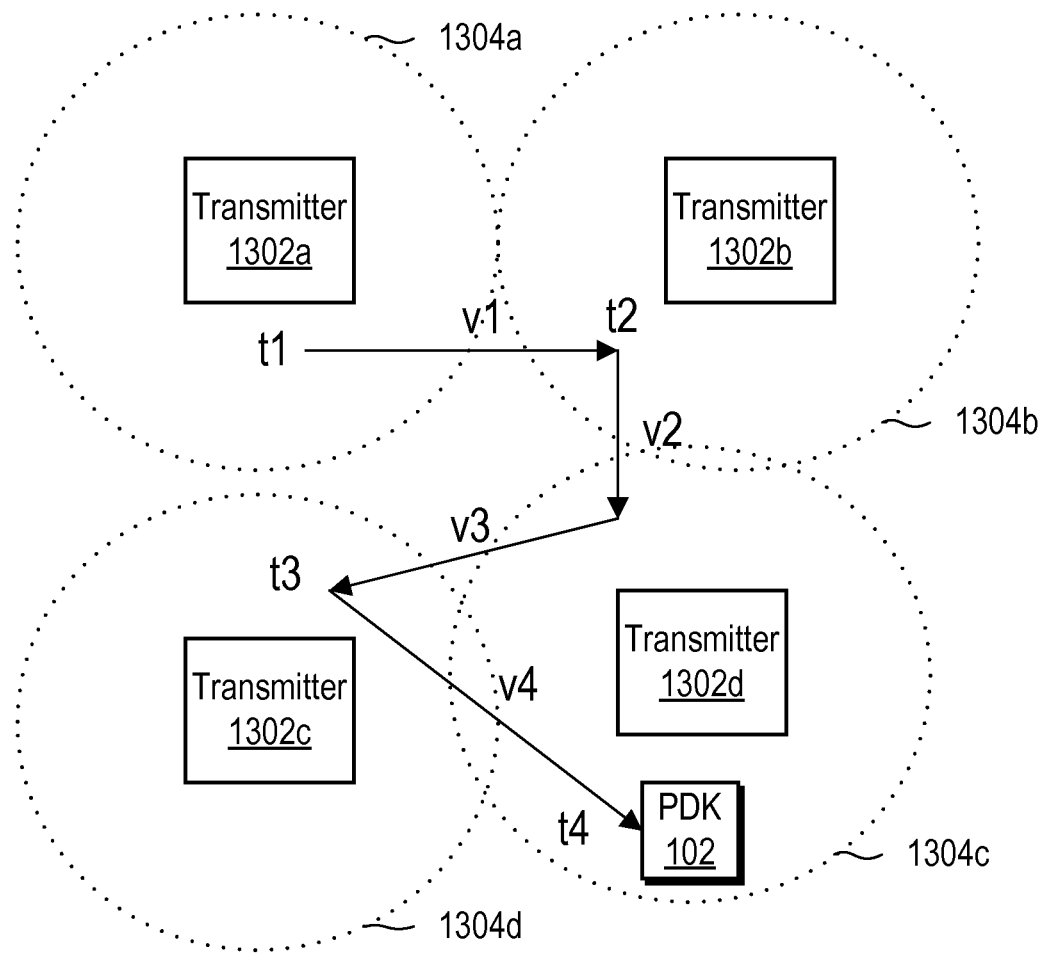
FIG. 13 is a block diagram illustrating an embodiment of a system for location tracking of a PDK.

Another embodiment of location tracking is illustrated in FIG. 13. Here, transmitters 1302 having ranges 1304 are distributed throughout an area. The ranges 1304 can vary and can be overlapping or non-overlapping. In this embodiment, each transmitter 1302 can detect when a PDK 102 enters or exists its range boundaries 1304. By time-stamping the boundary crossings, a location vector can be determined to track the PDK's movement. For example, at a first time, t1, the PDK 102 is detected within the range of transmitter 1302a. At a second time, t2, the PDK 102 is detected within the range of transmitter 1302b. At a third time, t3, the PDK 102 is within the range of transmitter 1302c and at a fourth time, t4, the PDK 102 is within the range of transmitter 1302d. Using the location and time information, approximate motion vectors, v1, v2, v3, and v4 can be computed to track the motion of the PDK 102 without necessarily computing exact distance measurements.

Figure 14:
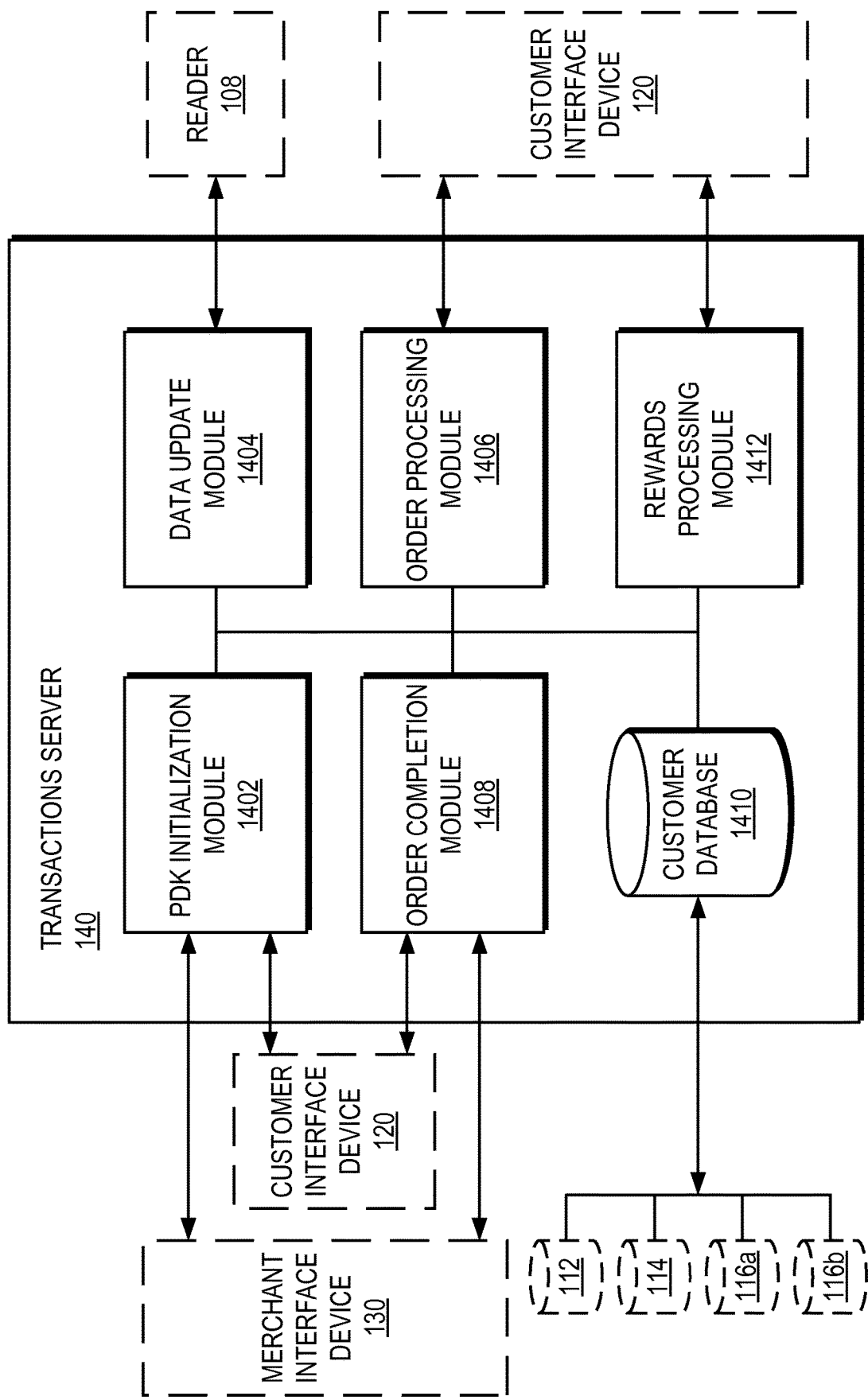
FIG. 14 is a block diagram illustrating a transactions server according to one embodiment of the invention.

FIG. 14 is a block diagram illustrating a transactions server 140 according to one embodiment of the invention. The transactions server 140 includes software or routines for automating the process of entering and fulfilling an order. The transactions server 140 facilitates automating order processing and payment procedures. The transaction server 140 is a hardware device, such as a computer designed to run applications for the aforementioned functions and processes. The transactions server 140 is adapted to communicate with the reader 108, the customer interface device 120 and the merchant interface device 130. The transactions server 140 includes a PDK initialization module 1402, a data update module 1404, an order processing module 1406, an order completion module 1408, a rewards processing module 1412 and a customer database 1410.

The PDK initialization module 1402 includes software or routines for initializing a PDK for use in the system 100. In one embodiment, the PDK initialization module 1402 is adapted to communicate with the customer interface device 150 via the network 110. In another embodiment, the PDK initialization module 1402 is adapted to communicate with the merchant interface device 130 via the network 110. The PDK initialization module 1402 facilitates the uploading of new customer information, such as biometric information and profile information, including payment information, to a new PDK. The PDK initialization module 1402 sends verification data to the merchant interface device 130. The PDK initialization module 1402 is also coupled to the customer database 1410 and sends some of the new customer information, such as profile information and payment information to the customer database 1410 for storage therein. More details describing the process performed by the PDK initialization module 1402 is provided below with reference to FIG. 16.

The data update module 1404 includes software or routines for updating PDK 102 data to the customer database 1410. The data update module 1404 is adapted to communicate with the reader 108 via the network 110 and is coupled to the customer database 1410. The data update module 1404 receives PDK 102 information, including customer information, from the reader 108 and uploads new PDK 102 information to the customer database 1410. The data update module 1404 facilitates the maintenance of current PDK information within the system 100. More details describing the process performed by the data update module 1404 is provided below with reference to FIG. 17.

The order processing module 1406 includes software or routines for automating the process of entering customer orders in system 100. The order processing module 1406 is adapted to communicate with the customer interface device 120 via the network 110 and is coupled to the order completion module 1408, customer database 1410 and rewards processing module 1412. The order processing module 1406 processes data received from the customer interface device 120 and obtains data from the customer's PDK in order to process the orders. In some embodiments, the order processing module 1406 obtains data from the customer database 1410 in order to process the orders. The order processing module 1406 also sends order information to the rewards processing module 1412 in order to enable the determination of customer rewards based on order activity. The order processing module 1406 also sends order information to the order completion module 1408 in order to complete such orders. More details describing the process performed by the order processing module 1406 is provided below with reference to FIGS. 18 and 19.

The order completion module 1408 includes software or routines for automating the process of completing customer orders in system 100. The order completion module 1408 is adapted to communicate with the merchant interface device 130 via the network 110 and is coupled to the order processing module 1406 and customer database 1408. In some embodiments, the order completion module 1408 is adapted to communicate with the customer interface device 120. In one embodiment, the order completion module 1408 is also coupled to the rewards processing module 1412. The order completion module 1406 receives confirmed order information from the order processing module 1406 and sends completed order information to be displayed in the merchant interface device 130. In one embodiment, the order completion module 1406 receives confirmed order information from the order processing module 1406 and sends completed order information to be displayed in the customer interface device 120. In one embodiment, the order completion module 1408 sends order information to the rewards processing module 1412 in order to enable the determination of customer rewards based on order completion activity. More details describing the process performed by the order completion module 1408 is provided below with reference to FIGS. 20 and 21.

The customer database 1410 is coupled to and adapted to communicate with the PDK initialization module 1402, the data update module 1404, the order processing module 1406, the order completion module 1408 and the rewards processing module 1412. The customer database 1410 stores PDK 102 information as well as customer information associated with the PDKs 102. In one embodiment, the customer database 1410 is adapted to communicate with the validation database 112 and registries 114, 116*a*, 116*b*. In such embodiments, data from the customer database 1410 is replicated to the validation database 112 and registries 114, 116*a*, 116*b* to ensure maintenance of current customer information within the system 1 00.

The rewards processing module 1412 includes software or routines for processing and recording customer activity for the purposes of determining customer rewards. The rewards processing module 1412 is coupled to the order processing module 1406, the order completion module 1408 and the customer database 1410. The rewards processing module 1412 receives order information from the order processing module 1406 and determines customer rewards based on order activity. In one embodiment, the rewards processing module 1412 receives order information from the order completion module 1408 and determines customer rewards based on order completion activity. The rewards processing module 1412 sends reward information to the customer database 1014 to be stored therein. More details describing the process performed by the rewards processing module 1412 is provided below with reference to FIG. 22.

Figure 15:
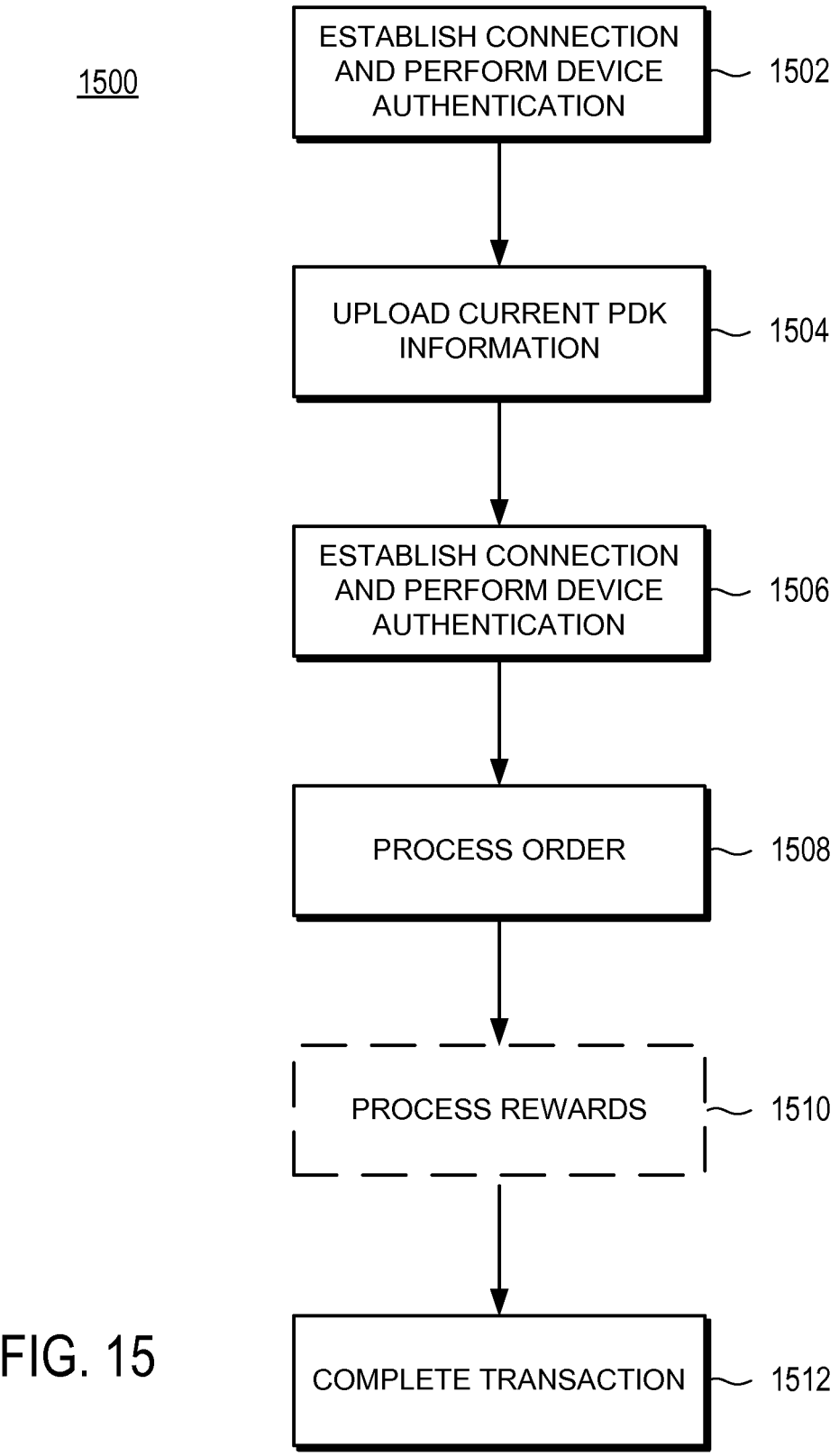
FIG. 15 is a flowchart illustrating a process for automated order processing according to one embodiment of the invention.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience FIG. 15 is a flowchart illustrating a general process 1500 for automated order processing according to one embodiment of the invention. The process 1500 is performed by the various modules 1404, 1406, 1408, 1412 of the transactions server 140. When a customer with an associated PDK 102 walks into a store, the connection is established 1502 between the customer's PDK 102 and the reader 108 and the customer's PDK 102 is authenticated 1502 by the reader 108. An example embodiment of a method for establishing 1502 connection and performing device authentication is illustrated in FIGS. 6 and 7.

The reader 108 then reads the customer's information from the PDK 102, such as customer name and favorite orders, and sends it to the transactions server 140. The data update module 1404 of the transaction server 140 uploads 1504 current PDK information received from the reader 108 to the customer database 1410 of the transactions server 140. Connection is then established 1506 between the reader 420 of the customer interface device 120 and the customer's PDK 102 and the customer's PDK 102 is authenticated 1506 be the reader 420. The order processing module 1406 obtains the customer information from the customer's PDK and processes 1508 the customer's order. In some embodiments, the rewards processing module 1412 processes 1510 rewards based on the customer's order. The processed order is sent to the order completion module 1408 and the transaction is completed 1512. In some embodiments, the customer's PDK establishes another connection between the reader 520 of the merchant interface device 130 in order to complete the order. More details describing the specific steps of this general process 1500 is provided below with reference to FIGS. 16-22.

Figure 16:
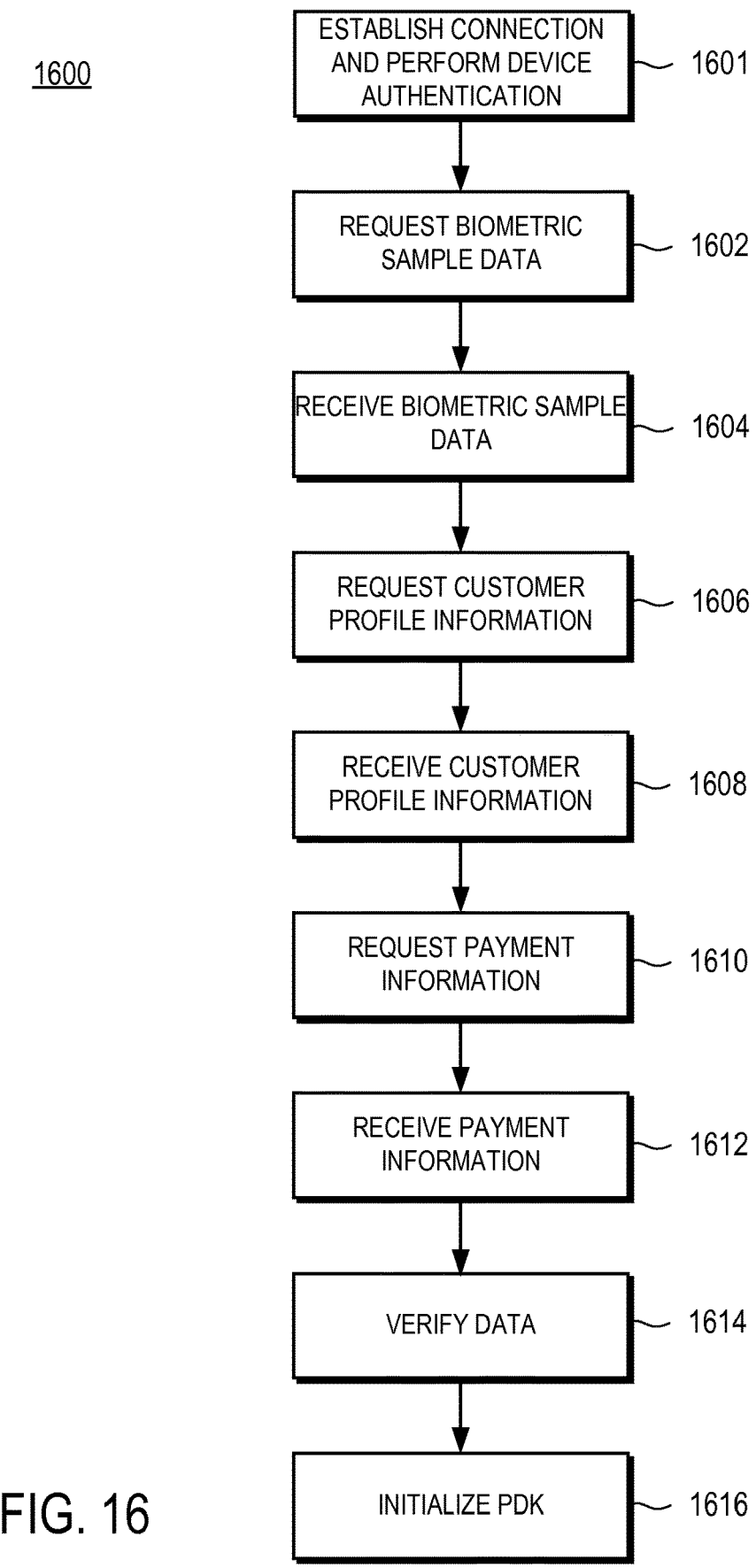
FIG. 16 is a flowchart illustrating a process for initializing a PDK according to one embodiment of the invention.

FIG. 16 is a flowchart illustrating a process 1600 for initializing a PDK according to one embodiment of the invention. In one embodiment, the process is performed by the customer interface device 120C. In other embodiments, the process is performed by the merchant interface device 130A. For purposes of illustration, the flow chart will be described as being performed by the customer interface device 120C. Connection is established 1601 between the reader 420 and the customer's PDK 102 and the customer's PDK 102 is authenticated. The customer interface device 120C requests 1602 a biometric sample. In one embodiment, this request is displayed on the display 418 of the customer interface device 120C. A sample is received via the reader 420 of the customer interface device 120C. The biometric sample can be acquired by, for example, a fingerprint scan, iris scan, retinal scan, palm scan, face scan, DNA analysis, signature analysis, voice analysis or any other input mechanism that provides physical or behavioral characteristics uniquely associated with the individual. The customer interface device 120C then requests 1606 customer profile information. In one embodiment, the customer's profile information includes the customer's name, address, picture, list of frequently visited merchants, favorite orders associated with the merchants, birthday, telephone numbers, and email address. In one embodiment, this request is displayed on the display 418 of the customer interface device 120C. The customer interface device 120C receives 1608 the customer profile information via the input devices of the customer interface device 120C, such as the keyboard 410, pointing device 414 and/or display 418. Next, the customer interface device 120C requests 1610 payment information, such as a credit card number, debit card number, or gift card authorization number, along with other identifying and authorization information of the customer's payment method. The customer interface device 120C receives 1612 the payment information via the reader 420, keyboard 410, pointing device 414 and/or display 418 of the customer interface device 120C. Once all the data is received, the information update application 450 verifies 1614 the data and uploads the information to the customer's PDK 102. In some embodiments, some of the data, such as the customer profile information, is sent to the transactions server 140 to be saved in the customer database 1410. In one embodiment, verification of the data includes storing the customer information and associating the customer information with a particular PDK 102. Finally, the PDK 102 is initialized 1616 and ready to be used. In one embodiment initialization of the PDK 102 includes activating the PDK 102 for initial use.

In some embodiments, a customer can add or edit information with the process described above. For example, if a customer receives a gift card for a particular merchant, the customer can add the information detailing the merchant associated with the gift card and the amount of the gift card and that information is loaded onto the customer's PDK 102 for later use at the merchant's establishment. Connection is established 1601 between the reader 420 and the customer's PDK 102 and the customer's PDK 102 is authenticated. Optionally, biometric sample is requested 1602. A sample is received via the reader 420 of the customer interface device 120C. The customer interface device 120C then requests 1606 customer profile information. During this step 1606, the customer can edit already-existing information. The customer interface device 120C receives 1608 the customer profile information via the input devices of the customer interface device 120C, such as the keyboard 410, pointing device 414 and/or display 418. Next, the customer interface device 120C requests 1610 payment information, such as a credit card number, debit card number, or gift card authorization number, along with other identifying and authorization information of the customer's payment method. During this step 1610, the gift card information is entered. The customer interface device 120C receives 1612 the payment information via the reader 420, keyboard 410, pointing device 414 and/or display 418 of the customer interface device 120C. Once all the data is received, the information update application 450 verifies 1614 the data and uploads the information, including the gift card information, to the customer's PDK 102. The PDK 102 is re-initialized 1616 with current information and ready to be used.

Figure 17:
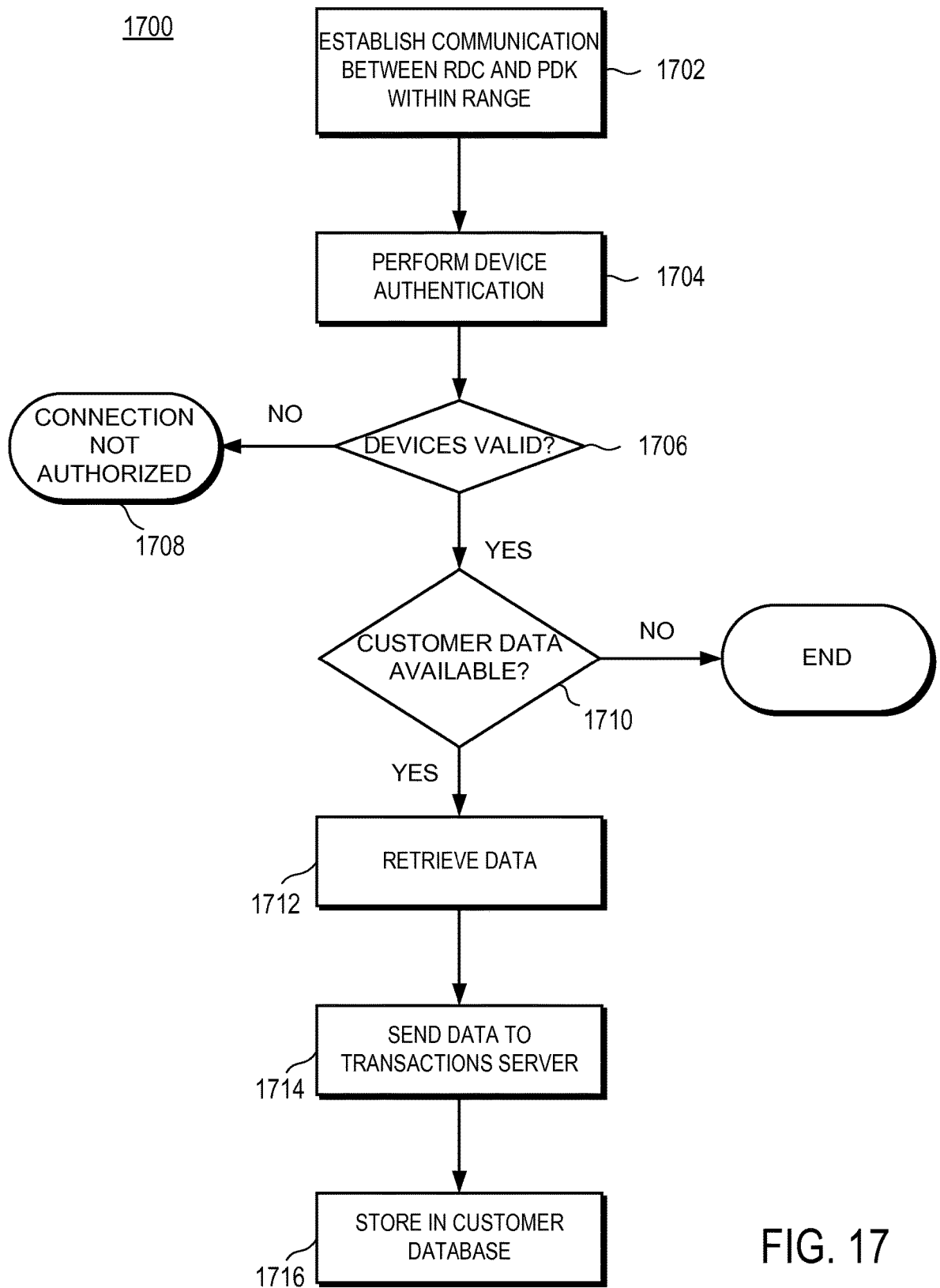
FIG. 17 is a flowchart illustrating a process for uploading PDK data according to one embodiment of the invention.

FIG. 17 is a flowchart illustrating a process 1700 for uploading PDK data according to one embodiment of the invention. When a PDK 102 comes within range of a Reader 108, communication is automatically established 1702 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 1704, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108. An example embodiment of a method for performing 604 device authentication is illustrated in FIG. 7. If either the PDK 102 or RDC 304 is not found valid (1706-No) during device authentication 1704, the transaction is not authorized 1708 and the process ends. If the devices are valid (1706-Yes), a determination 1710 is made as to whether customer data is available. If customer data is not available (1710-No), the process ends. However, if customer data is available (1710-Yes), the customer data is retrieved 1712 and the data is sent to the to the customer database 1410 of the transactions server 140. If the customer's information already exists, the already-existing data is updated with the new data received by the customer database 1410. If the customer's information does not yet exists, the data is sent 1714 to the transactions server 140 and stored 1716 in the customer database 1410 of the transactions server 140 for future use.

Figure 18:
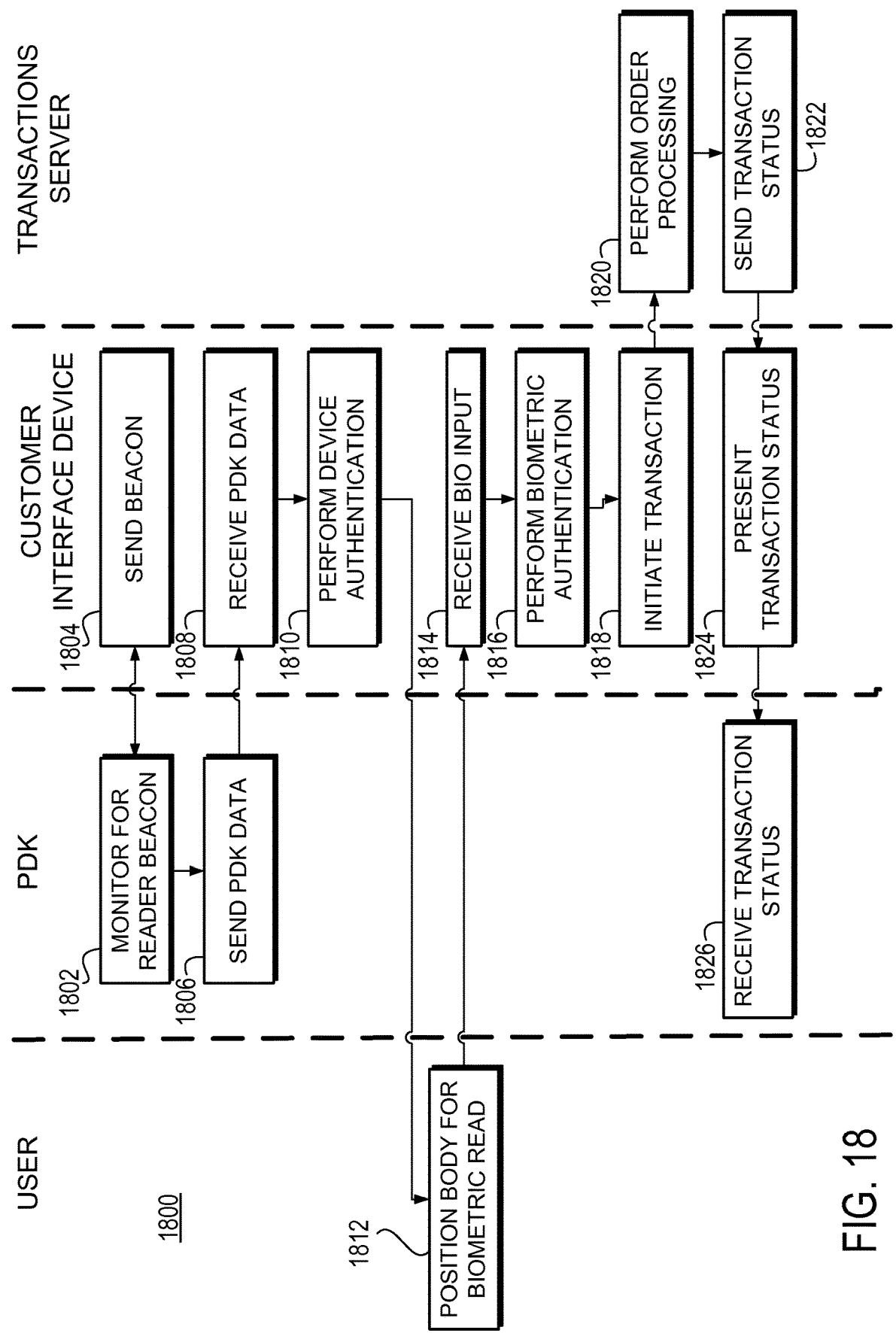
FIG. 18 is a flowchart illustrating interaction between devices of the system for automated service-based order processing according to one embodiment of the invention.

Turning now to FIG. 18, a flowchart illustrating interaction between devices 102, 120 and 140 of the system for automated service-based order processing according to one embodiment of the invention is shown. This figure illustrates more directly the specific device or entity performing the steps of this embodiment of the present invention. FIG. 18 is divided into four vertical sections with each section depicting portions of the process that are performed by that device or entity. The first and left most section shows the steps performed by the user, the second section and the next to the right show the steps performed by the PDK 102, the third section shows the steps performed by the customer interface device 120 and the right most section show the steps performed by the transactions server 140. As is readily apparent from FIG. 18, the method of the present invention requires minimal but sufficient involvement from the user, namely the positioning of the user's body for biometric reading. This advantageously requires the user do almost nothing to initiate the processing of an order, yet achieves user authentication by capturing biometric information sufficient to ensure that the user is authorizing and initiating the transaction.

The process begins with the Reader 420 of the customer interface device 120 sending 1804 out a beacon signal to start the proximity authentication process. The beacon signal is preferably repeatedly sent such as at a periodic interval. The PDK 102 monitors 1802 for a beacon signal from any Reader 420 in range. If there is no such signal then the PDK 102 is outside the proximity range of any Reader 420. Once the PDK 102 detects a beacon, the PDK 102 responds by sending information to set up a secure communication channel. This process has been described above with reference to FIGS. 6-9D. Any of the embodiments disclosed above may be used here. Once the secure communication channel has been established, the PDK 102 sends 1806 PDK data and biometric data to the Reader 420. Then the Reader 420 receives 1808 the PDK data and biometric data, and temporarily store the data in working memory of the Reader 420. The reader 420 then authenticates 1810 the PDK 102 using the PDK data. For example, the PDK data may include a profile 220. The reader 420 validates the PDK 102 according to reader's requirements and the requirements specified in the profile 200. This may be any number of types or combinations of authentication as has been described above with reference to FIGS. 8 and 9. In one alternate embodiment (not shown), the Reader 420 may communicate with a third party system such as a registry 112, 114, 116 to validate the PDK 102 and/or the Reader 420. After step 1810, the method continues with the user positioning 1812 his body for a biometric read. In one embodiment, this is swiping his finger over a reader 108. For the other type of biometric scanning, the user need only perform the affirmative act of allowing his body to be scanned such as for a retinal, face, palm, DNA analysis etc. Once the user has performed then inputting step 1812, the Reader 420 receives 1814 the biometric input. In this embodiment, the biometric reader is part of Reader 420 so receipt is automatic. However, where the biometric reader is on the PDK 102, the PDK 102 wirelessly transmits the biometric input to the Reader 420 that in turn receives it. Biometric authentication is then performed 1816 according to the various embodiments illustrated in FIGS. 9A-9D.

It should be noted that the biometric authentication described above is performed without the requirement of an external database containing biometric data to be searched. The security of maintaining all biometric data to be searched within the user-owned and carried PDK 102 is apparent, as is the vastly improved speed in searching only those immediately surrounding PDK's for a match. Additionally, it will be noticed that in order to complete the transaction, the person possessing the PDK 102 containing the secure data must provide the Reader 420 with a scan (or sample) of biologically identifying material. The importance of the foregoing to the tracking and apprehension of anyone fraudulently attempting to use another person's PDK will be understood by those skilled in the art, as well as extensions of this technology to act as an aid in law enforcement in the detection, tracking and retrieval of lost, stolen or fraudulently obtained PDK's.

Figure 19:
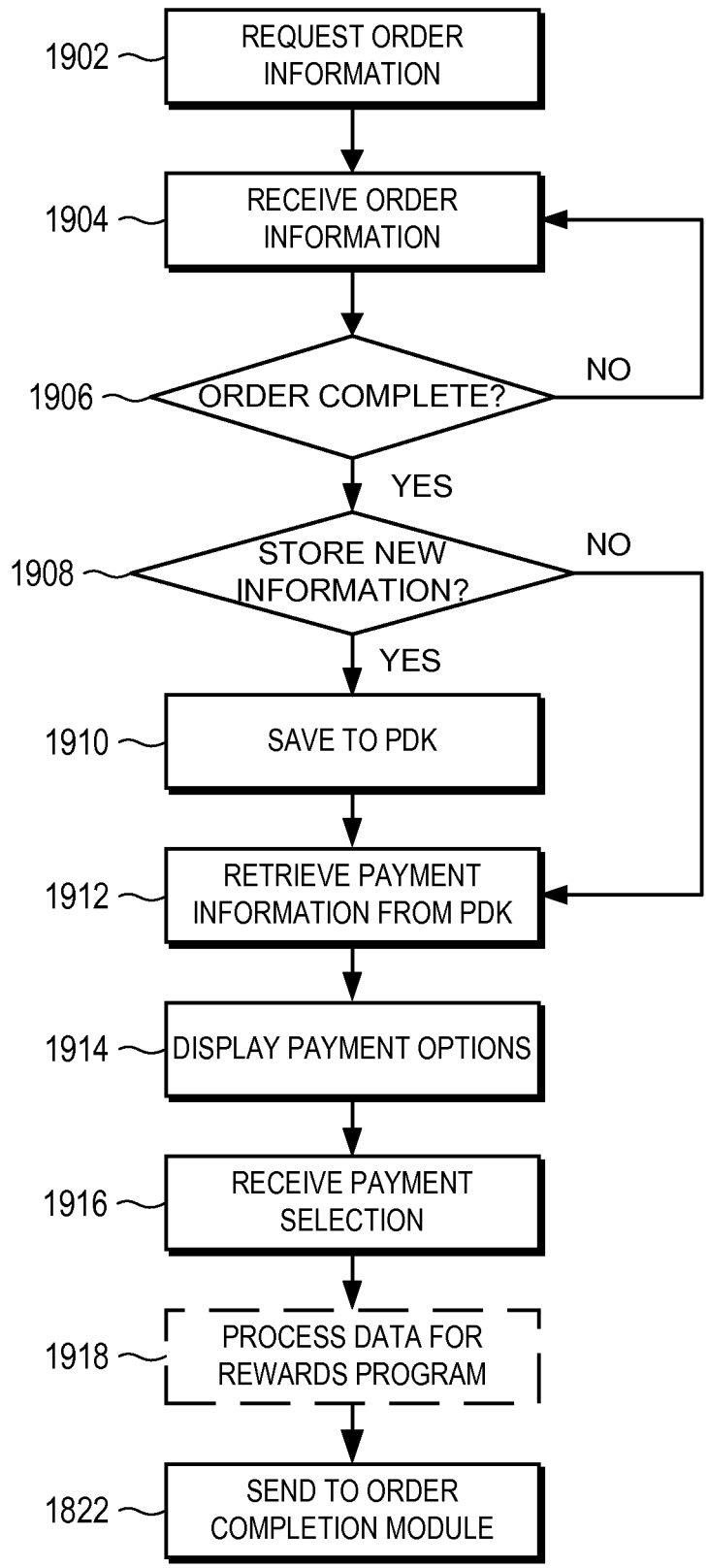
FIG. 19 is a flowchart illustrating a process for processing an order according to one embodiment of the invention.

Next, once biometric authentication is established, the transaction is initiated 1818 and order processing is performed 1820. Turning now to FIG. 19, a flowchart illustrating a process for performing 1820 the order processing according to one embodiment of the invention is shown. The order processing module 1406 requests 1902 order information. In one embodiment, the order processing module 1406 can retrieve information identifying the order that the customer typically purchases when the customer visits the merchants. For example, the order processing module 1406 directs the customer interface device 120 to display "Do you want your Favorite drink?" with the options of "Yes" and "No" to select. The information is received 1904 and a determination is made as to whether the order is complete. For example, in one embodiment, the order processing module 1406 directs the customer interface device 120 to display "Would you like to place another order?" with the options of "Yes" and "No" to select, and if the order processing module 1406 receives a "No" selection, the order processing module continues to receive order information. If the order is complete (1906-Yes), a determination 1908 is made as to whether any new information should be saved and associated with the customer's information in the customer database 1410. If the new information needs to be stored (1908-Yes), then the information is sent to the customer's PDK 102. In one embodiment, the new information is sent to the customer database 1410 for update and storage. If the new information does not need to be saved, or no new information exists (1908-No), the process proceeds to step 1912 and the payment information is retrieved 1912 from the customer's PDK. Existing payment options are displayed 1914. For example, if the customer has more than one method of payment stored on their PDK 102, the existing methods of payments are displayed for selection. Next, the payment selection is received 1916 and payment is processed. Optionally, the processed order and payment information is sent to the rewards processing module 1412 and the data is processed 1918 for eligibility for rewards. A detailed description outlining the steps involved in the processing of data for rewards is provided below with reference to FIG. 22. Finally, the order is sent 1822 to the order completion module 1408 for completion.

Turning back to FIG. 18, once the transaction status is sent 1822 to the order completion module 1408, the customer interface device 120 presents 1824 the transaction status on the display 418 of the customer interface device 120. For example, the display 418 of the customer interface device 120 may display "Order Complete. Thank you," or "Order Complete. Please Proceed to Register," indicating that the order entry process has been completed and the customer can proceed to the next step of completing and receiving their order. Finally, the customer's PDK 102 receives 1826 and stored that transaction status.

Figure 20:
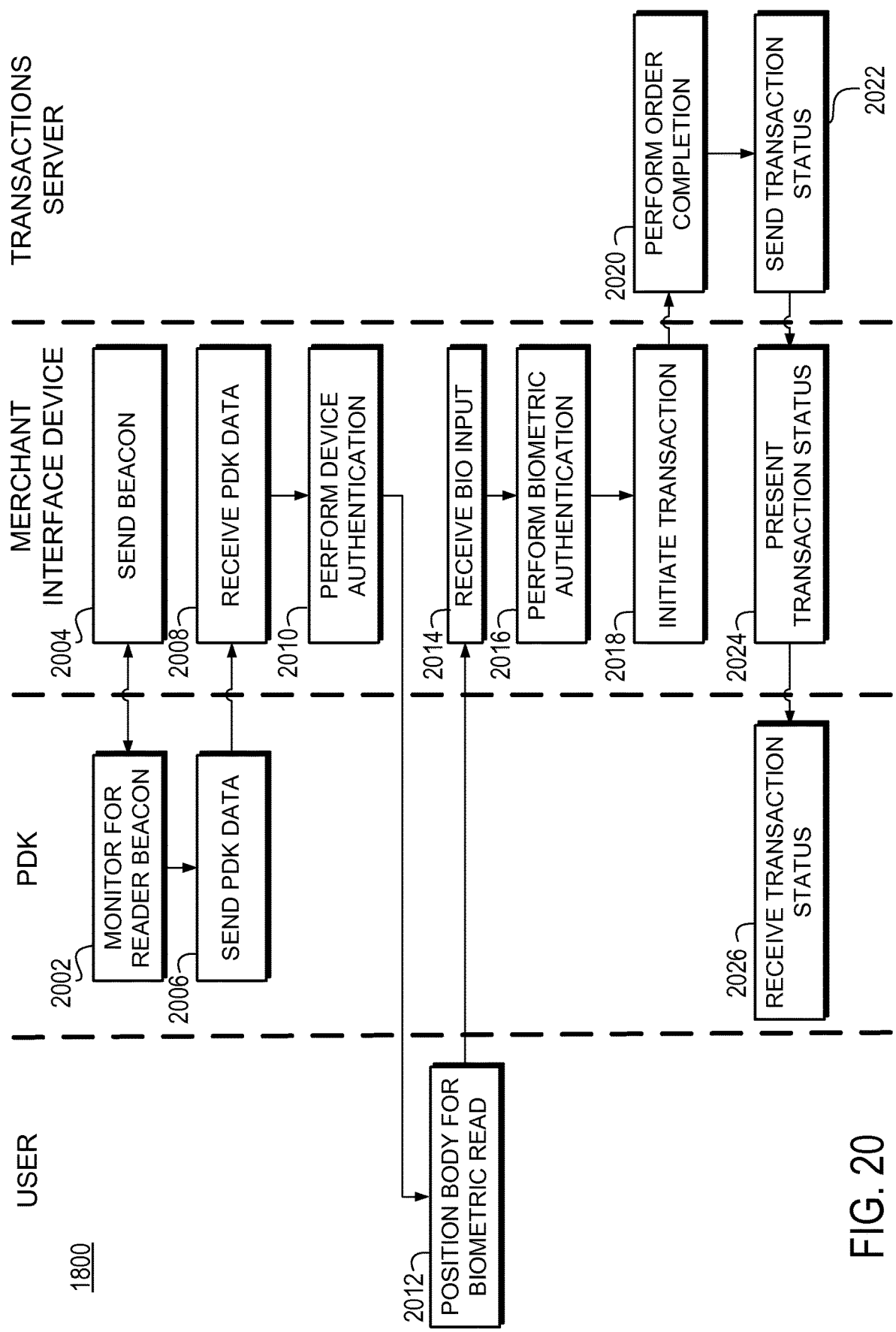
FIG. 20 is a flowchart illustrating interaction between devices of the system for automated service-based order processing according to another embodiment of the invention.

FIG. 20 is a flowchart illustrating interaction between devices 102, 130 and 140 of the system for automated service-based order processing according to another embodiment of the invention. Similar to FIG. 18, this figure also illustrates more directly the specific device or entity performing the steps of this embodiment of the present invention. Like FIG. 18, FIG. 20 is divided into four vertical sections with each section depicting portions of the process that are performed by that device or entity. The first and left most section shows the steps performed by the user, the second section and the next to the right show the steps performed by the PDK 102, the third section shows the steps performed by the merchant interface device 130 and the right most section show the steps performed by the transactions server 140. As is readily apparent from FIG. 20, the method of the present invention requires minimal but sufficient involvement from the user, namely the positioning of the user's body for biometric reading. This advantageously requires the user do almost nothing to initiate the processing of an order, yet achieves user authentication by capturing biometric information sufficient to ensure that the user is authorizing and completing the transaction.

The process begins with the reader 520 of the merchant interface device 130 sending 2004 out a beacon signal to start the proximity authentication process. The beacon signal is preferably repeatedly sent such as at a periodic interval. The PDK 102 monitors 2002 for a beacon signal from any reader 520 in range. If there is no such signal then the PDK 102 is outside the proximity range of any reader 520. Once the PDK 102 detects a beacon, the PDK 102 responds by sending information to set up a secure communication channel. This process has been described above with reference to FIGS. 6-8. Any of the embodiments disclosed above may be used here. Once the secure communication channel has been established, the PDK 102 sends 2006 PDK data and biometric data to the reader 520. Then the reader 520 receives 2008 the PDK data and biometric data, and temporarily stores the data in working memory of the reader 520. The reader 520 then authenticates 2010 the PDK 102 using the PDK data. For example, the PDK data may include a profile 220. The reader 520 validates the PDK 102 according to reader's requirements and the requirements specified in the profile 200. This may be any number of types or combinations of authentication as has been described above with reference to FIGS. 8 and 9. In one alternate embodiment (not shown), the reader 520 may communicate with a third party system such as a registry 112, 114, 116 to validate the PDK 102 and/or the reader 520.

After step 2010, the method continues with the user positioning 2012 his body for a biometric read. In one embodiment, this is swiping his finger over a reader 108. For the other type of biometric scanning, the user need only perform the affirmative act of allowing his body to be scanned such as for a retinal, face, palm, DNA analysis etc. Once the user has performed then inputting step 2012, the Reader 520 receives 2014 the biometric input. In this embodiment, the biometric reader is part of Reader 520 so receipt is automatic. However, where the biometric reader is on the PDK 102, the PDK 102 wirelessly transmits the biometric input to the Reader 520 that in turn receives it. Biometric authentication is then performed 2016 according to the various embodiments illustrated in FIGS. 9A-9D.

It should be noted that the biometric authentication described above is performed without the requirement of an external database containing biometric data to be searched. The security of maintaining all biometric data to be searched within the user-owned and carried PDK 102 is apparent, as is the vastly improved speed in searching only those immediately surrounding PDK's for a match. Additionally, it will be noticed that in order to complete the transaction, the person possessing the PDK 102 containing the secure data must provide the Reader 420 with a scan (or sample) of biologically identifying material. The importance of the foregoing to the tracking and apprehension of anyone fraudulently attempting to use another person's PDK will be understood by those skilled in the art, as well as extensions of this technology to act as an aid in law enforcement in the detection, tracking and retrieval of lost, stolen or fraudulently obtained PDK's. Next, once biometric authentication is established, the order completion may be performed 2020 by the order completion module 1408 of the transactions server 140.

Once the transaction is completed 2020 the order completion module 1408 of the transactions server 140 sends 2022 the transaction status to the merchant interface device 130 and the merchant interface device 130 presents 2024 the transaction status on the display 518 of the merchant interface device 130. For example, the display 518 of the merchant interface device 130 may display "Order Complete. Thank you," or "Order Approved. Thank you." indicating that the order completion process has been approved and completed and the customer can receive their order. Finally, the customer's PDK 102 receives 2026 and stores that transaction status.

According to one embodiment, order processing and order completion is performed by the customer interface device 120. In such embodiments, steps 1802 to 1820 remain the same. After step 1820, since connection is already established and authentication is already performed, the order completed by the order completion module 1408 of the transactions server 140 sends 2022 the transaction status to the customer interface device 120 and the transaction status is displayed 2024 on the display 418 of the customer interface device 120. The customer's PDK receives 2026 and stores the transaction status.

In some embodiments, biometric input is not required. In such embodiments, another form of confirmation may be required, such as selecting "Yes" to continue to process the order or asking a merchant to "confirm" that the identity of the customer.

Figure 21:
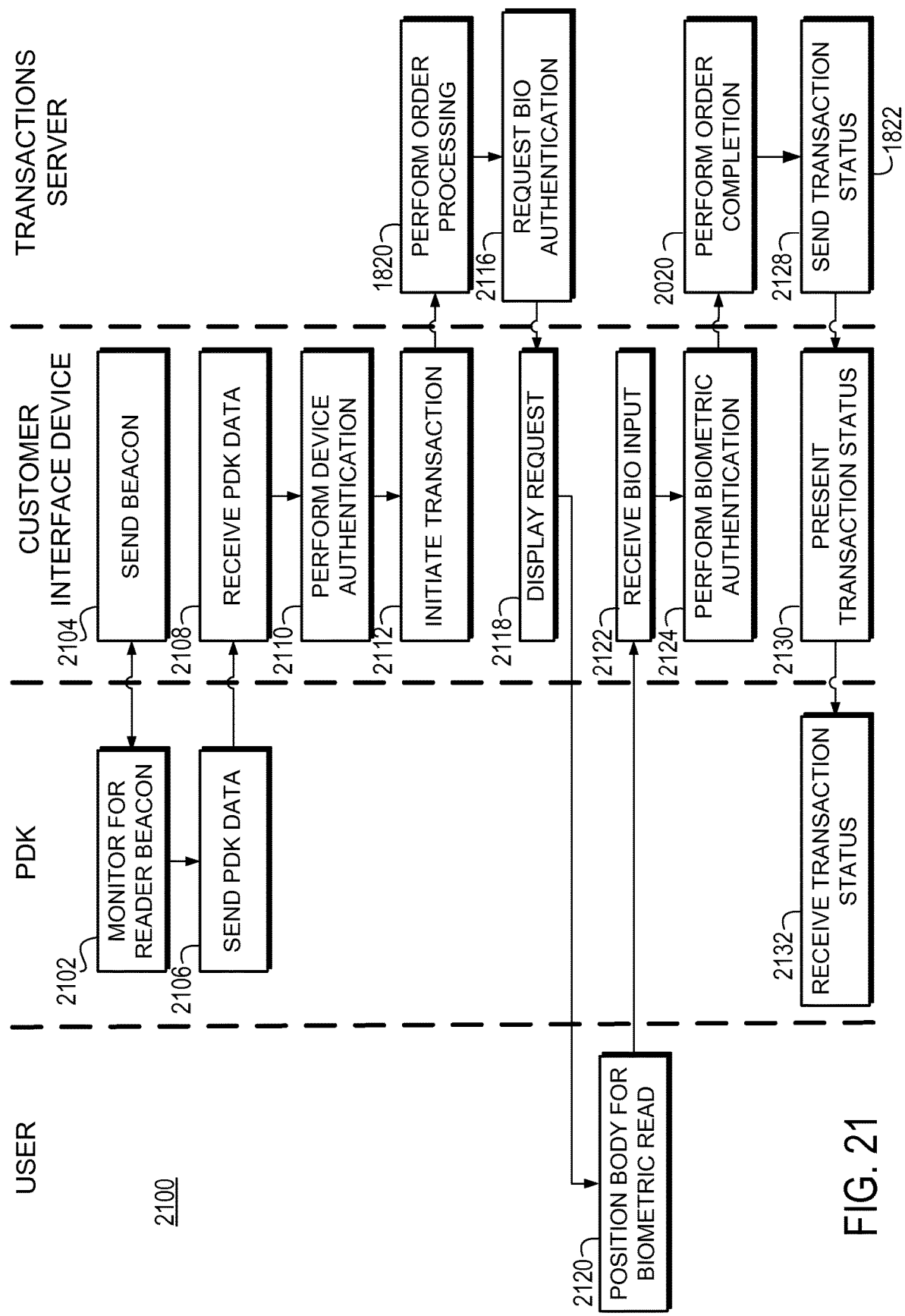
FIG. 21 is a flowchart illustrating interaction between devices of the system for automated service-based order processing according to yet another embodiment of the invention.

Turning to FIG. 21 a flowchart illustrating interaction between devices 102, 120 and 140 of the system for automated service-based order processing according to yet another embodiment of the invention is shown. In this embodiment, a customer need only interact with the customer interface device 120 in order to initiate and complete an order. Additionally, the customer needs to only provide a biometric sample once in order to initiate and complete the order. The process begins with the Reader 420 of the customer interface device 120 sending 2104 out a beacon signal to start the proximity authentication process. The beacon signal is preferably repeatedly sent such as at a periodic interval. The PDK 102 monitors 2102 for a beacon signal from any Reader 420 in range. If there is no such signal then the PDK 102 is outside the proximity range of any Reader 420. Once the PDK 102 detects a beacon, the PDK 102 responds by sending information to set up a secure communication channel. This process has been described above with reference to FIGS. 6-9D. Any of the embodiments disclosed above may be used here. Once the secure communication channel has been established, the PDK 102 sends 2106 PDK data and biometric data to the Reader 420. Then the Reader 420 receives 2108 the PDK data and biometric data, and temporarily store the data in working memory of the Reader 420. The reader 420 then authenticates 2110 the PDK 102 using the PDK data. For example, the PDK data may include a profile 220. The reader 420 validates the PDK 102 according to reader's requirements and the requirements specified in the profile 200. This may be any number of types or combinations of authentication as has been described above with reference to FIGS. 8 and 9. In one alternate embodiment (not shown), the Reader 420 may communicate with a third party system such as a registry 112, 114, 116 to validate the PDK 102 and/or the Reader 420. After step 2110, the transaction is initiated 2112 and order processing is performed 1820. FIG. 19, described above, shows a flowchart illustrating a process for performing 1820 the order processing. In order to complete the processed order, a the transaction server 140 requests 2116 a biometric sample and the request is displayed 2118 on the display 418 of the customer interface device 120.

The method continues with the user positioning 2120 his body for a biometric read. In one embodiment, this is swiping his finger over a reader 108. In an embodiment where biometric input is not required, the transaction server 140 requests confirmation and the request is displayed on the customer interface device 120. Once the user has performed then inputting step 2021, the Reader 420 receives 2122 the biometric input. In this embodiment, the biometric reader is part of Reader 420 so receipt is automatic. However, where the biometric reader is on the PDK 102, the PDK 102 wirelessly transmits the biometric input to the Reader 420 that in turn receives it. Biometric authentication is then performed 1816 according to the various embodiments illustrated in FIGS. 9A-9D.

Next, once biometric authentication is established, order completion is performed 2020 and the transaction status is sent 2128 to the customer interface device 120. Once the transaction status is sent 2128, the customer interface device 120 presents 2130 the transaction status on the display 418 of the customer interface device 120. For example, the display 418 of the customer interface device 120 may display "Order Complete. Thank you," or "Order Complete. Please Proceed to Register," indicating that the order entry process has been completed and the customer can proceed to the next step of completing and receiving their order. Finally, the customer's PDK 102 receives 2132 and stored that transaction status.

Figure 22:
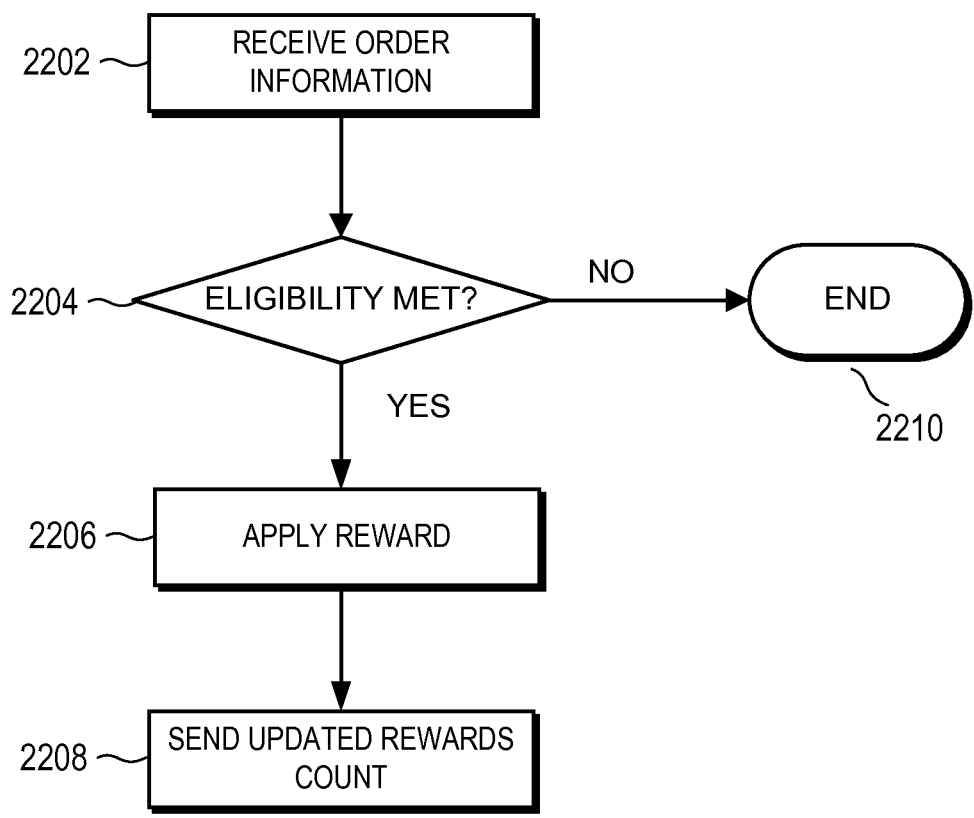
FIG. 22 is a flowchart illustrating a process for rewards processing according to one embodiment of the invention.

FIG. 22 is a flowchart illustrating a process 2200 for rewards processing according to one embodiment of the invention. The rewards processing module 1412 receives 2102 order information. In one embodiment, the rewards processing module 1412 receives the order information from the order processing module 1406. In another embodiment, the rewards processing module 1412 receives the order information from the order completion module 1408 after the order has been completed. Next, the rewards processing module 1412 determines 2104 if the order is eligible for a reward. For example, the requirement for reward eligibility may be that the purchase must exceed a certain amount. As another example, the requirement for reward eligibility may be that the purchase must be paid for with a credit card. If the transaction is eligible for a reward (2104-Yes), the appropriate reward is applied 2206 and associated with the customer's information. If the transaction is not eligible for a reward (2104-No), the process ends 2210. Once the reward is applied 2206, an updated rewards count is sent 2208 to the customer database 1410 for update and storage. In one embodiment, the rewards count is also sent to the customer's PDK and stored in the purchase log 290. In another embodiment, the rewards count is sent to the customer interface device 120 for display by the rewards presentation application 436. In yet another embodiment, the rewards count is sent to the merchant interface device 130 for display by the rewards presentation application 532.

In one embodiment, the rewards processing module 1412 determines the appropriate reward to apply by referring to a look-up table (not shown). For example, the look-up table may have a list of items eligible for specific rewards and if the customer has purchased a certain item on the table, that specific reward is applied.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention.

Upon reading this disclosure, those of skill in the art will appreciate still additional alternative structural and functional designs for a system and a process for automating order processing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method executable by at least one processor of at least one computer for electronic order processing, the method comprising:
    receiving an input that a personal digital key is within a predetermined range, the predetermined range associated with a physical location of a merchant, the personal digital key associated with a first user and integrated into a mobile computing and communication device;
    wirelessly receiving a set of data including biometric data of the first user from the personal digital key;
    authenticating the personal digital key based on the received set of data;
    authenticating a first biometric sample provided by the first user against the received set of data;
    responsive to authenticating the first biometric sample provided by the first user against the received set of data, receiving, from the personal digital key within the predetermined range associated with the physical location of the merchant, a favorite order associated with the merchant, the favorite order stored on the personal digital key;
    determining an initial order based on the favorite order;
    causing presentation, on a display of the mobile computing and communication device, of the initial order;
    causing presentation, on the display of the mobile computing and communication device, of a prompt to confirm the initial order;
    authenticating a second biometric sample provided by the first user against the received set of data;
    responsive to authenticating the second biometric sample provided by the first user against the received set of data, receiving, from the mobile computing and communication device, a communication confirming intent to complete an order of the initial order; and
    subsequent to receiving the communication confirming intent to complete the order of the initial order, fulfilling the order.

2. The method of claim 1, comprising processing rewards based on the order.

3. The method of claim 2, wherein processing the rewards further comprises maintaining a rewards count.

4. The method of claim 1, comprising sending the order for display.

5. The method of claim 1, further comprising:
    subsequent to authenticating the second biometric sample against the received set of data, receiving payment information.

6. The method of claim 1, comprising sending the order for display on a merchant interface device.

7. The method of claim 1, wherein fulfilling the order includes receiving a payment selection.

8. The method of claim 1, comprising storing the favorite order from the personal digital key, including customer information in a customer database.

9. The method of claim 1, wherein the first biometric sample provided by the first user comprises at least one of a fingerprint scan, a retinal scan, an iris scan, a facial scan, a palm scan, a DNA analysis, a signature analysis, and a voice analysis.

10. The method of claim 1, comprising establishing a secure communication channel between the personal digital key and a reader, and wherein a profile is sent from the personal digital key to the reader.

11. The method of claim 1, wherein the second biometric sample provided by the first user comprises at least one of a fingerprint scan, a retinal scan, an iris scan, a facial scan, a palm scan, a DNA analysis, a signature analysis, and a voice analysis.

12. The method of claim 1, further comprising:
    displaying a request for the second biometric sample on a customer interface device.

13. The method of claim 1, further comprising:
    displaying a request for the first biometric sample on the mobile computing and communication device.

14. The method of claim 1, wherein the first biometric sample is received and authenticated at the personal digital key.

15. The method of claim 1, further comprising:
displaying a request for the second biometric sample on the mobile computing and communication device.

16. The method of claim 1, wherein receiving the communication confirming the intent to complete the order comprises:
accumulating one or more metrics while the personal digital key is within the predetermined range, the one or more metrics describing a location of the personal digital key within the predetermined range over time;
determining a path of the personal digital key within the predetermined range based on the one or more metrics accumulated; and
determining based on the path of the personal digital key that the first user intends to complete the order.

17. A system for electronic order processing, the system comprising:
one or more processors;
a memory including instructions that, when executed by the one or more processors, causes the system to:
receive an input that a personal digital key is within a predetermined range, the predetermined range associated with a physical location of a merchant, the personal digital key associated with a first user and integrated into a mobile computing and communication device;
wirelessly receive a set of data including biometric data of the first user from the personal digital key;
authenticate the personal digital key based on the received set of data;
authenticate a first biometric sample provided by the first user against the received set of data;
responsive to authenticating the first biometric sample provided by the first user against the received set of data, receive, from the personal digital key within the predetermined range associated with the physical location of the merchant, a favorite order associated with the merchant, the favorite order stored on the personal digital key;
determine an initial order based on the favorite order;
cause presentation, on a display of the mobile computing and communication device, of the initial order;
cause presentation, on the display of the mobile computing and communication device, of a prompt to confirm the initial order;
authenticate a second biometric sample provided by the first user against the received set of data;
responsive to authenticating the second biometric sample provided by the first user against the received set of data, receive, from the mobile computing and communication device, a communication confirming intent to complete an order of the initial order; and
subsequent to receiving the communication confirming intent to complete the order of the initial order, fulfill the order.

18. The system of claim 17, wherein the instructions, when executed by the one or more processors, further cause the system to process rewards based on the order.

19. The system of claim 18, wherein to process the rewards, the instructions, when executed by the one or more processors, further cause the system to maintain a rewards count.

20. The system of claim 17, wherein the instructions, when executed by the one or more processors, further cause the system to send the order for display on a merchant interface device.

* * * * *